(12) United States Patent
Kushibiki et al.

(10) Patent No.: US 7,790,328 B2
(45) Date of Patent: Sep. 7, 2010

(54) SINGLE CELL FOR FUEL CELL AND SOLID OXIDE FUEL CELL

(75) Inventors: Keiko Kushibiki, Kanagawa-ken (JP); Fuminori Sato, Kanagawa-ken (JP); Naoki Hara, Kanagawa-ken (JP); Mitsugu Yamanaka, Kanagawa-ken (JP); Masaharu Hatano, Kanagawa-ken (JP); Makoto Uchiyama, Kanagawa-ken (JP); Itaru Shibata, Kanagawa-ken (JP); Tatsuhiro Fukuzawa, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 598 days.

(21) Appl. No.: 11/523,689

(22) Filed: Sep. 20, 2006

(65) Prior Publication Data

US 2007/0015033 A1    Jan. 18, 2007

Related U.S. Application Data

(62) Division of application No. 10/181,258, filed as application No. PCT/JP01/10219 on Nov. 22, 2001, now Pat. No. 7,122,265.

(30) Foreign Application Priority Data

Nov. 27, 2000   (JP)   ............................ P2000-360353
Apr. 10, 2001   (JP)   ............................ P2001-111102

(51) Int. Cl.
*H01M 8/10*   (2006.01)
*H01M 8/12*   (2006.01)
*H01M 8/02*   (2006.01)

(52) U.S. Cl. ........................ 429/479; 429/514; 429/516; 429/457; 429/469; 429/481

(58) Field of Classification Search .................. None
See application file for complete search history.

(56) References Cited

U.S. PATENT DOCUMENTS 6,677,070 B2    1/2004   Kearl
2003/0012995 A1    1/2003   Hara et al.

FOREIGN PATENT DOCUMENTS

EP    1 284 520 A2    2/2003

(Continued)

OTHER PUBLICATIONS

J.S. Lee et al., "Fabrication of a micro catalytic gas sensor using thin film process and Si anisotropic etching techniques," Sensors and Actuators B, vol. 45, No. 3, Dec. 15, 1997, pp. 265-269, XP004119173.

(Continued)

*Primary Examiner*—Dah-Wei Yuan
*Assistant Examiner*—Angela J. Martin
(74) *Attorney, Agent, or Firm*—McDermott Will & Emery LLP

(57) ABSTRACT

A single cell for a solid oxide fuel cell, in which a solid electrolyte layer is sandwiched by an upper electrode layer and a lower electrode layer. This single cell includes a substrate having openings and an insulating and stress absorbing layer stacked on an upper surface of this substrate. The solid electrolyte layer is formed on an upper surface of the insulating and stress absorbing layer so as to cover the openings, the upper electrode layer is stacked on an upper surface of the solid electrolyte layer, and the lower electrode layer is coated on a lower surface of the solid electrolyte layer via the openings from a lower surface of the substrate. A cell plate, in which these single cells are disposed two-dimensionally on a common substrate. Furthermore, a solid oxide fuel cell, in which these cell plates and plate-shaped separators including gas passages on both surfaces thereof are alternately stacked.

20 Claims, 43 Drawing Sheets

FOREIGN PATENT DOCUMENTS

| JP | 8-64216 | | 3/1996 |
|---|---|---|---|
| WO | WO 00/45457 | * | 8/2000 |
| WO | WO 00/69007 | | 11/2000 |
| WO | WO 02/35628 A1 | | 5/2002 |
| WO | WO 03/075382 A2 | | 9/2003 |

OTHER PUBLICATIONS

European Search Report issued in European Patent Application No. EP 09 01 3524.5 dated Jan. 25, 2010.

J. Morse, et al, "*A Novel Thin Film Solid Oxide Fuel Cell for Microscale Energy Conversion*" Part of the SPIE Conference on Micromached Devices and Components V, SPIE vol. 3876, Sep. 1999, pp. 223-226.

A. Jankowski, et al, "*Thin Film Synthesis of Novel Electrode Materials for Solid-Oxide Fuel Cells*" Material Research Society Symp. Proc. vol. 496, 1998, pp. 155-158.

Deutsches Zentrum für Lult-und Raumtahrt (DLR), Institut für Technische Thernodynamik, pp. 597-600.

G. Schiller, et al, "*Plasma Sprayed Thin-Film SOFC for Reduced Operating Temperature*" Deutsches Zentrum für Lult-und Raumtahrt (DLR), Institut für Technische Thernodynamik, 1 page.

P. Batfalsky, et al, "*Operation and Analysis of Planar SOFC Stacks*", pp. 349-352.

Piotto M et al.: "technology of integrable free-standing yttria-stabilized zirconia membranes" Thin Solid Films, Elsevier-Sequoia S.A. Lausanne, CH, vol. 346, No. 1-2, Jun. 1, 1999, pp. 251-254, XP004177689.

Morse J D et al.: "A Novel Thin Film Solid Oxide Fuel Cell for Microscale Energy Conversion" Proceeding of the SPIE, SPIE, Bellingham, VA, US, vol. 3876, Sep. 20, 1999, Pates 223-226, XP001023875.

European Office Action issued in European Patent Application No. 01 997 862, dated Jul. 16, 2009.

* cited by examiner

FIG.6

| Example.No | insulating-stress absorbing layer | | | pattern of electrolyte layer | state of electrolyte layer after heat treatment |
|---|---|---|---|---|---|
| | material | method | thickness | | |
| example 2-1 | Si3N4 | CVD | 2000Å | FIG.5A | ○ |
| example 2-2 | PSG | CVD | 2000Å | FIG.5B | ○ |
| example 2-3 | BPSG | CVD | 2000Å | FIG.5B | ○ |
| example 2-4 | Aℓ2O3 | sputtering | 1500Å | FIG.1A | ○ |
| example 2-5 | TiO2/SiO2 | sol-gel | 1000Å | FIG.1A | ○ |
| example 2-6 | MgO/SiO2 | sputtering | 2000Å | FIG.1A | ○ |
| example 2-6 | ZrO2/SiO2 | sputtering | 1500Å | FIG.1A | ○ |
| comparative example 2-1 | --- | | | FIG.5C | × |

FIG.9

| Example.No | reinforcement layer | | | state of electrolyte layer after heat treatment |
|---|---|---|---|---|
| | material | method | thickness | |
| 4-1 | SiO+TiO2+CrOx | sputtering | 1500Å | ○ |
| 4-2 | YSZ+Si | sputtering | 500Å | ○ |
| 4-3 | W+Ti | vacuum evaporation | 1000Å | ○ |
| 4-4 | Aℓ2O3+Mo | sputtering | 200Å | ○ |
| 4-5 | Aℓ2O3+Ta | sputtering | 300Å | ○ |
| 4-6 | Zr+Ni+YSZ | sputtering | 1000Å | ○ |
| 4-7 | Cr+Fe+CeO2 | sputtering | 1000Å | ○ |
| 4-8 | MgO+Co | sputtering | 1000Å | ○ |
| 4-9 | ZrO2+Si | sputtering | 700Å | ○ |
| 4-10 | Si | vacuum evaporation | 100Å | ○ |
| 4-11 | Ti+Ni | vacuum evaporation | 700Å | ○ |

FIG.17A
FIG.18A
FIG.17B
FIG.18B
FIG.17C
FIG.18C
FIG.17D
FIG.18D
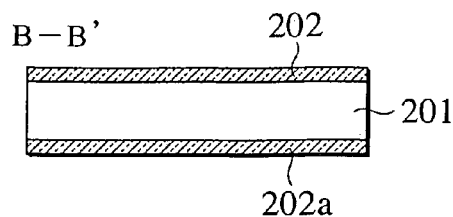
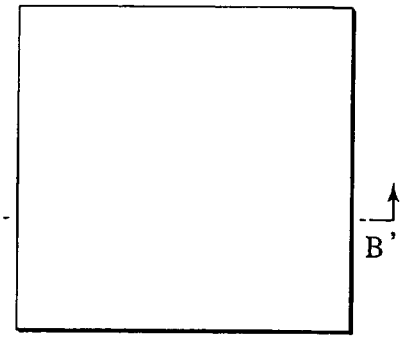
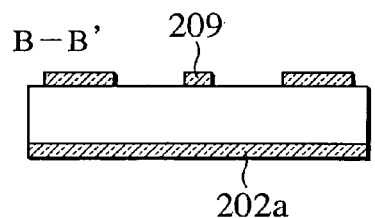
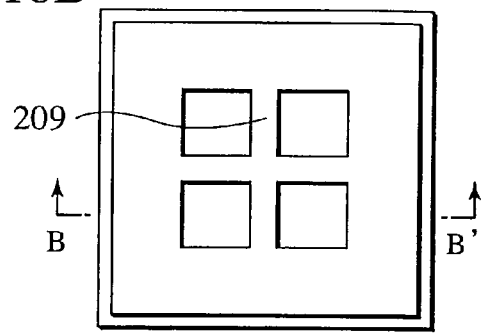
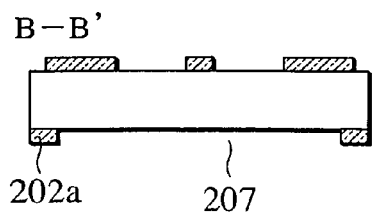
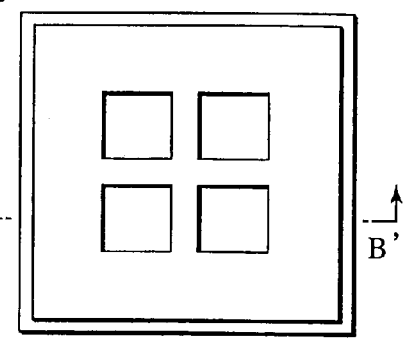
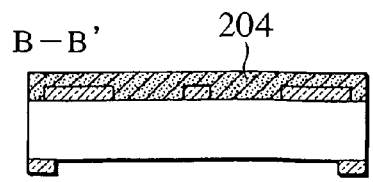
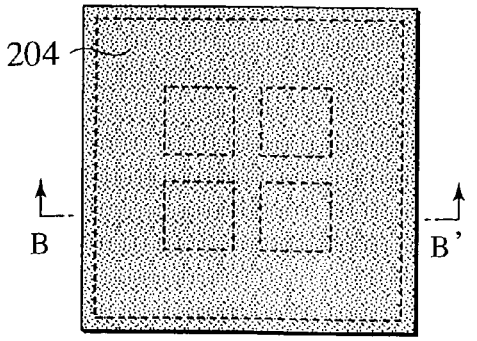

FIG.17E  FIG.18E  FIG.18EB
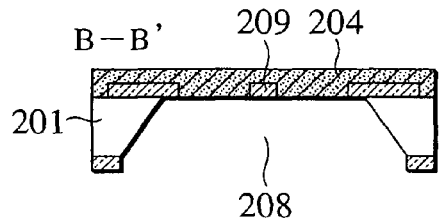 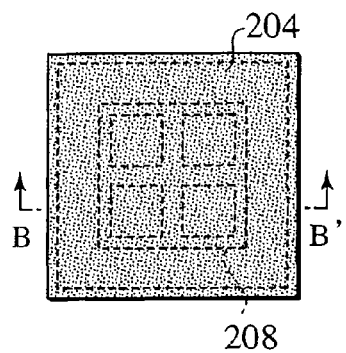 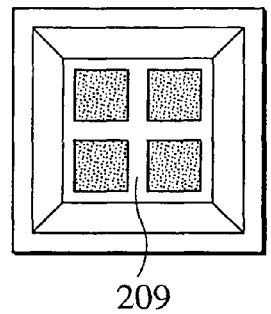
FIG.17F  FIG.18F
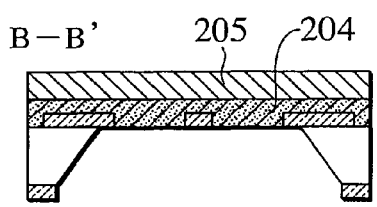 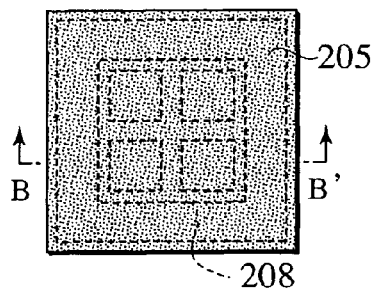
FIG.17G  FIG.18G
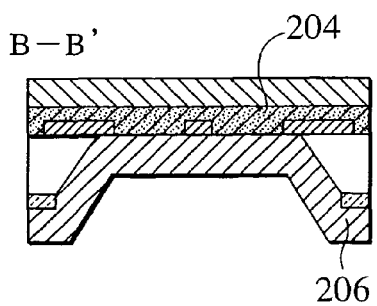 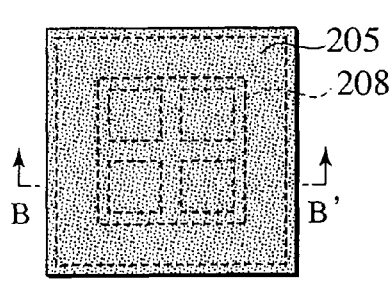

FIG.19A
FIG.20A
FIG.19B
FIG.20B
FIG.19C
FIG.20C
FIG.19D
FIG.20D
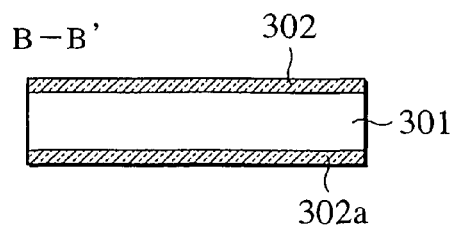
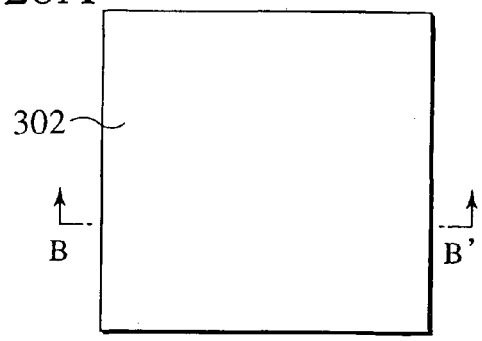
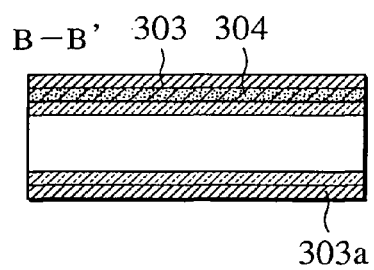
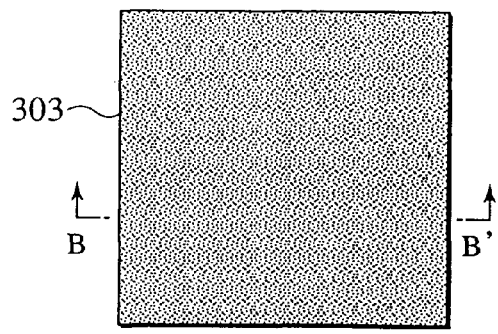
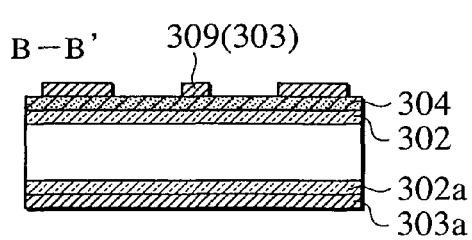
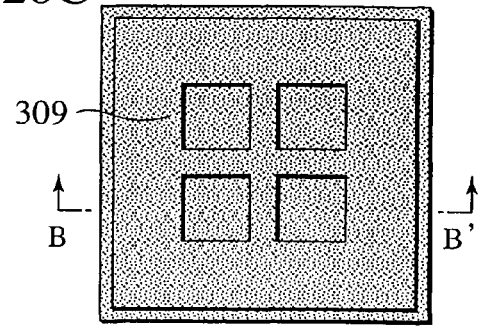
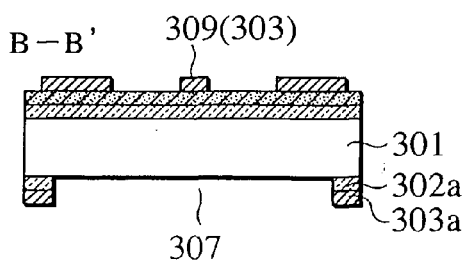
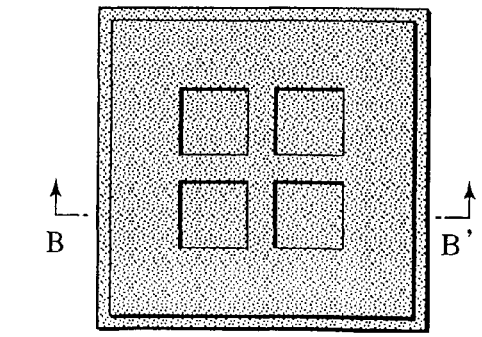

SINGLE CELL FOR FUEL CELL AND SOLID OXIDE FUEL CELL

RELATED APPLICATIONS

This application is a divisional of application Ser. No. 10/181,258, filed Jul. 16, 2002, now U.S. Pat. No. 7,122,265 which is a 371 Application PCT/JP2001/10219, filed Nov. 22, 2001, based on Japanese Patent application No. P2000-360353, filed Nov. 27, 2000 and P2001-111102, Apr. 10, 2001, and the contents of which are herewith incorporated by reference.

TECHNICAL FIELD

The present invention relates to a solid oxide fuel cell (SOFC) using solid electrolyte and obtaining electric energy by an electrochemical reaction, more specifically, to a single cell having electrodes and the solid electrolyte between the electrodes and a method of manufacturing the same, and to a solid oxide fuel cell including this single cell.

BACKGROUND ART

Recent years, as a clean energy source capable of highly efficient energy conversion and friendly to the global environment, a fuel cell has attracted an attention. Among a variety of the fuel cells, a solid oxide fuel cell is the one, in which oxide ion conductive solid electrolyte such as yttria stabilized zirconia is used as electrolyte, and porous electrodes are attached onto both surfaces (back and front surfaces) thereof. The solid oxide fuel cell is a cell in a form, in which the solid electrolyte is used as a partition, fuel gas such as hydrogen and hydrocarbon is supplied to a surface of the partition on one electrode side, and air or oxygen gas is supplied to the other surface thereof on the other electrode side. In general, the solid oxide fuel cell is operated at a high temperature of about 1000° C. or higher.

It is known that conductivity of the solid electrolyte is about one-tenth conductivity of electrolyte of a phosphoric acid fuel cell or a fused carbonate fuel cell. Generally, since electric resistance of the electrolyte portion becomes a loss of power generation, it is important to reduce film resistance as much as possible by thinning a film of the solid electrolyte in order to enhance a power generation output density. However, since an area of a certain extent or more is required for the electrolyte portion in order to secure a function as a cell, for the solid oxide fuel cell, a cell structure (single cell structure) is adopted, in which a solid electrolyte film is formed on a support having mechanical strength. As specific structures of the solid oxide fuel cell, structures as below are proposed.

(1) Cylinder Type SOFC

A cylinder type is the one, in which a cylindrical and porous base tube is used as a support, and a cell structure having a fuel electrode layer, an electrolyte layer and an air electrode layer stacked therein is formed on a surface of the base tube.

There are a cylindrical cross-stripe type in which a plurality of single cell structures are arrayed in one base tube and a cylindrical pinstripe type in which one single cell is formed in one base tube. In any of the types, a plurality of cylinders are electrically connected from one to another by interconnectors to constitute a cell, any one of the fuel gas or the air is introduced in the inside of the base tube, and the other thereof is introduced in the outside of the base tube, thus generating power. In the cylinder type solid oxide fuel cell as described above, since one of the fuel gas and the air is flown into the base tube, there is a feature in that a seal is not particularly required between the fuel gas and the air.

(2) Flat Plate Type SOFC

A flat plate type basically has a structure equivalent to that of the phosphoric acid or fused carbonate fuel cell. Specifically, the flat plate type has a structure, in which separator plates and plane-shaped cell plates are alternately adhered. Each separator plate has fuel electrode plates where fuel gas passages are formed and air electrode plates where air passages are formed, which are adhered to both surfaces of interconnector flat plates; and each plane-shaped cell plate has fuel electrode layers and air electrode layers stacked on both surfaces of a sheet-shaped electrolyte layer.

In order to thin the electrolyte layer, a cell structure is proposed, in which any one electrode layer of the porous fuel electrode and air electrode is taken as a support, and the electrolyte film and the other electrode layer are formed thereon. For example, a constitution is disclosed, in which an electrolyte layer having a film thickness of 15 µm is formed on a fuel electrode layer made of Ni cermet having a thickness of 1.5 mm by a vacuum slip casting method (Proceedings of The $3^{rd}$ International Fuel Cell Conference, P349).

(3) Monolith Type

The monolith type has a structure analogous to that of the flat plate type. The monolith type has a structure, in which separator plates having fuel electrode layers where the gas passages are not formed and the air electrode layers formed on the both surfaces of the interconnector flat plates, and a three-layered structure of cell films having waveplate-shaped fuel electrode layers, electrolyte layers and air electrode layers, are alternately adhered. There is a feature in that the passages are formed by use of the waveform shape of the cell film and the area of the electrolyte is enlarged, thus resistance of the electrolyte film is reduced.

(4) Thin Film Type

As a structure of a fuel cell having a film thickness of the electrolyte further thinned (herein, referred to as a "thin film type"), a structure is proposed, in which a large number of micro-openings are formed on a substrate, and cell plates and the separator plates having the passages formed thereon are alternately stacked, each cell plate being constituted by adhering three-layered films of the fuel electrode layer, the electrolyte layer and the air electrode layer onto these micro-openings (Japanese Patent Laid-Open Publication No. H8-64216 (published in 1996). It is described that, with this structure, a nonporous silicon (Si) wafer is used as a support substrate, and films are formed thereon, thus making it possible to set the film thickness of the electrolyte at about 2 µm. Specifically, on either a Si substrate or an oriented cerium oxide ($CeO_2$) layer formed on the Si layer, an electrolyte layer made of stabilized zirconia in a single crystal film is formed.

Moreover, similarly, a cell structure is proposed, in which micro-openings are formed on a single crystal Si substrate insulated and coated with a silicon nitride film, and the three-layered films of the fuel electrode layers, the electrolyte layers and the air electrode layers are formed on these openings (Mat. Res. Soc. Symp. Proc. Vol. 496, p155).

DISCLOSURE OF INVENTION

As described above, in the solid oxide fuel cell, it is important to reduce the conductivity of the electrolyte layer by thinning the solid electrolyte layer in order to enhance the generation power output. Meanwhile, since the fuel gas and the air have the electrolyte layer as a partition, compactness of the electrolyte film also becomes important. If there is a pinhole in the electrolyte film and a leak occurs even a little from the pinhole, the fuel gas and the air react directly, leading to the loss of the generation power output.

In such a viewpoint, in the (1) cylindrical type, a manufacturing method becomes important, in which a compact electrolyte film is formed on a porous support substrate. With this regard, for example, an electrochemical vapor deposition (EVD) method is proposed, in which the porous support substrate is sealed in a first step, and compacted and subjected to deposition in a second step.

However, a film thickness of the electrolyte obtained by the EVD method is several hundred µm, which is thick, and the electrolyte is high in film resistance.

Meanwhile, it is desirable to lower an operational temperature of the solid oxide fuel cell. The reason is as follows. If the operational temperature is lowered, heat stresses applied to a joint of the cell plate and the separator and to a joint of a gas introduction tube and the fuel cell can be lowered, durability of the cell can be improved, and time and energy required for start/stop can be reduced.

The (2) flat plate type has an advantage in that the thickness of the electrolyte layer can be set at several ten µm. However, the film resistance of the electrolyte is radically increased in proportion to the lowering of the operational temperature. Therefore, if, in general, the solid oxide fuel cell having the operational temperature of 1000° C. is intended to be operated at a low temperature from 600° C. to 800° C. in the above-described viewpoint, a film resistance ratio is increased by about ten times. Accordingly, even the above-described film thinning is not sufficient.

Furthermore, the (3) monolith type has an advantage in that the film resistance of the entire electrolyte can be lowered by increasing the area of the electrolyte layer.

However, since the shape of the cell film or the like is complicated, there is a subject that a manufacturing cost becomes expensive in forming the thinned electrolyte. Moreover, in the case of operating the fuel cell at a temperature from 600° C. to 800° C., it cannot be said yet that the film resistance of the electrolyte layer is sufficiently lowered.

Moreover, the (4) thin film type has an advantage in that a compact thin film having a thickness of several µm or less can be formed since the electrolyte film is formed on the nonporous substrate excellent in planarity. The cell structure disclosed in the Japanese Patent Laid-Open Publication H8-64216 (published in 1996) is characterized in that it has a structure in which the electrolyte layer and the electrode layer are entirely formed on a substrate having a large number of openings, and that a single crystal film is formed by directly forming the electrolyte film on the Si substrate subjected to no insulating treatment.

Incidentally, the generation power output of the cell is generally varied depending on a flowing fashion of the gas or temperature distribution thereof. Particularly, in a fuel cell mounted on a mobile body such as an automobile, in comparison with the case of a general stationary type fuel cell system, the start/stop are frequently carried out, and temperature rising time by the beginning of the start is required to be short. Therefore, high heat impact resistance and high heat stress resistance are required also for the cell portion.

On the contrary to this, in the cell structure described in the Japanese Patent Laid-Open Publication H8-64216, since thermal expansion coefficients of the Si substrate and the stabilized zirconia are different from each other by about 3 to 6 times, a separation or a crack occurs due to the difference in the thermal expansion coefficients between the Si substrate and the single crystal stabilized zirconia film as electrolyte. As above, there has been a subject that the heat impact resistance becomes insufficient.

Note that, in the cell structure as the (4) thin film type, since the opening portions educe a power generation function, the larger the total area of the openings in a single substrate is, the larger the generation power output density is. Therefore, large openings can improve the output density rather than small openings. Moreover, a cell plate having large openings facilitates the control of the gas flow of the fuel gas and the air. Accordingly, local temperature rising depending on bias of the gas flow is not caused, thus a fuel cell unlikely to be broken and having a stable generation power output can be manufactured.

However, as a result of a study by the inventors of the present invention, since the size of the openings depends on film strength of the electrolyte layer, it was found out that the openings could not be designed to be limitlessly large.

Moreover, when the film resistance is lowered as a result of thinning the electrolyte layer, a rate of a cell reaction for generating electricity is limited by a decomposition/ionization reaction of oxygen molecules on the surface of the electrode or an oxidation reaction of fuel gas molecules, instead of being limited by conduction of oxygen ions in the electrolyte layer. Therefore, in order to increase the generation power output, an electrode reaction area is required to be sufficiently secured by making the electrode layer porous.

In the thin film type having a structure in which three layers of a lower electrode layer, an electrolyte layer and an upper electrode layer are formed on the substrate, the electrolyte layer is formed on the lower electrode layer. Therefore, if a lower electrode layer having a high porosity is formed in order to increase the reaction area of the electrode, it becomes difficult to form thereon a thin electrolyte film having sufficient compactness. The direct reaction of the gases, which is caused by the leak of the gas via the electrolyte layer, is in danger of losing some generation power output. Meanwhile, when a lower electrode layer having high planarity is formed, though it is made possible to form a good electrolyte film, there has been a problem that the electrode reaction area of the lower electrode cannot be sufficiently secured due to its insufficient porous property.

An object of the present invention is to provide a single cell and a cell plate for a solid oxide fuel cell, in which the film resistance of the electrolyte layer is small, the electrode reaction area can be sufficiently secured, and the reliability on the use frequently performing the start/stop, and a method of manufacturing the same, moreover, to provide a solid oxide fuel cell using the single cell.

Moreover, another object of the present invention is to provide a single cell and a cell plate for a solid oxide fuel cell, in which the area of the substrate openings educing the power generation function is large, the generation power output density is high, breakage due to local heating is hardly occurred, and the reliability is high, and a method of manufacturing the same, moreover, to provide a solid oxide fuel cell using the cell plate.

The inventors of the present invention found out that the objects could be achieved by employing a layered structure and so on, in which a specified substrate is used and a particular insulating and stress absorbing layer and a specified reinforcement layer are formed thereon, the insulating and stress absorbing layer having insulation property and a stress absorption function.

A single cell for a fuel cell according to a fist aspect of the present invention (hereinafter, referred to as a "first single cell") is a single cell for a solid oxide fuel cell having a layered structure, in which a solid electrolyte layer is put between an upper electrode layer and a lower electrode layer. The single cell includes a substrate having openings penetrating from an upper surface thereof to a lower surface thereof, and an insulating and stress absorbing layer formed on at least the upper surface of this substrate and coated on a region of this upper surface other than the openings or on this region and a part of the openings. The solid electrolyte layer covers at least the openings or the rest portion of the openings coated with the insulating and stress absorbing layer on the entire or a part of an upper surface of this insulating and stress absorbing layer, and the upper electrode layer is formed on the entire or a part of an upper surface of the solid electrolyte layer. Moreover, the lower electrode layer covers the entire or a part of the lower surface of the substrate and a lower surface of the solid, electrolyte layer, which is exposed to the openings.

Note that, in the first single cell of the present invention, the insulating and stress absorbing layer may have a frame-shaped pattern covering frames of the openings on the openings of the substrate. Alternatively, the insulating and stress absorbing layer may have a beam-shaped pattern crossing the openings.

Note that, the insulating and stress absorbing layer is not necessarily a single layer, and may be constituted of plural-layered one. Moreover, the insulating and stress absorbing layer may be layered with a stress absorption portion (layer) and an insulation portion (layer). Furthermore, this insulating and stress absorbing layer may be formed also on an inner side than the frames of the openings of the substrate. A frame-shaped or beam-shaped pattern of a reinforcement layer to be described later and the insulating and stress absorbing layer may be integrated with each other.

Furthermore, in the first single cell, the reinforcement layer may be interposed in the entire or a part of a region between the insulating and stress absorbing layer and the solid electrolyte layer. This reinforcement layer may be made of a solid electrolyte material or an electrode material and disposed so as to cover at least the openings, and a lower surface thereof may contact the lower electrode layer. In the case where the reinforcement layer is made of the solid electrolyte material, the reinforcement layer can function also as the solid electrolyte layer, and in the case where the reinforcement layer is made of the electrode material, the reinforcement layer can function also as the lower electrode layer.

Note that, here the "solid electrolyte material" implies a conductive material mainly exhibiting oxygen ion conductivity, and the "electrode material" implies a conductive material having electron conductivity or electron conductivity and oxygen ion conductivity.

Moreover, the reinforcement layer has at least any one pattern of a frame-shaped pattern covering the frames of the openings of the substrate and a beam-shaped pattern crossing the openings, and can be disposed at any position of the following (1) to (4).
(1) the entire or a part of a region between the insulating and stress absorbing layer and the solid electrolyte layer
(2) the entire or a part of a region between the solid electrolyte layer and the upper electrode layer
(3) the entire or a part of a region on the upper electrode layer
(4) the entire or a part of a region between the substrate and insulating and stress absorbing layer A single cell for a fuel cell according to a second aspect of the present invention (hereinafter, referred to as a second cell) is a single cell for a solid oxide fuel cell having a layered structure, in which a solid electrolyte layer is sandwiched by an upper electrode layer and a lower electrode layer. The single cell includes a substrate having openings penetrating from an upper surface thereof to a lower surface thereof, an insulating and stress absorbing layer formed at least on the upper surface of this substrate and coated on a region of this upper surface other than the openings, and a reinforcement layer formed on the entire or a part of a region on or above the substrate. And, the reinforcement layer is frame-shaped and/or beam-shaped over the opening. Furthermore, the lower electrode layer is formed on the entire or a part of a region on the insulating and stress absorbing layer, and covers the openings.

Moreover, in the second single cell of the present invention, the reinforcement layer may be disposed at any position of the following (1) to (5).
(1) the entire or a part of a region between the substrate and the insulating and stress absorbing layer
(2) the entire or a part of a region between the insulating and stress absorbing layer and the lower electrode layer
(3) the entire or a part of a region between the lower electrode layer and the solid electrolyte layer
(4) the entire or a part of a region between the solid electrolyte layer and the upper electrode layer
(5) the entire or a part of a region on the upper electrode layer Furthermore, a cell plate for a fuel cell according to a third aspect of the present invention (hereinafter, referred to as a first cell plate) is formed by arraying the first single cells on a common substrate two-dimensionally. Moreover, a cell plate for a fuel cell according to a fourth aspect of the present invention (hereinafter, referred to as a second cell plate) is formed by arraying the second single cells on a common substrate two-dimensionally.

Moreover, in the first and second cell plates, a forming region of the solid electrolyte layer, a forming region of the upper electrode layer, or a forming region of the lower electrode layer may be divided into two or more regions. Moreover, on the entire surface of the cell plate, the reinforcement layer may be divided into two or more regions.

A solid oxide fuel cell according to a fifth aspect of the present invention (first solid oxide fuel cell) is the one formed by alternately stacking the first cell plates and plate-shaped separators, each separator having a fuel gas passage on one surface thereof and an oxygen containing gas passage on the other surface thereof.

A solid oxide fuel cell according to a sixth aspect of the present invention (second solid oxide fuel cell) is the one formed by alternately stacking the second cell plates and plate-shaped separators, each separator having a fuel gas passage on one surface thereof and an oxygen containing gas passage on the other surface thereof.

Moreover, a method of manufacturing a single cell for a fuel cell according to a seventh aspect of the present invention includes the following steps of (a) to (g).
(a) forming an insulating and stress absorbing layer on an upper surface of a substrate;
(b) forming a mask layer on a lower surface of the substrate in order to form openings on the substrate;
(c) forming the openings on the substrate by use of the mask layer as an etching mask;
(d) forming a solid electrolyte layer on the insulating and stress absorbing layer;
(e) etching the insulating and stress absorbing layer of a portion covering the openings of the substrate;
(f) forming an upper electrode layer on the solid electrolyte layer;
(g) forming a lower electrode layer;

Furthermore, in the method of manufacturing a single cell of the present invention, a step of forming a reinforcement layer in a desired shape may be added before or after any of the steps.

A single cell for a fuel cell according to an eighth aspect of the present invention (hereinafter, referred to as a third single cell) is a single cell for a solid oxide fuel cell having a layered structure, in which a solid electrolyte layer is sandwiched by an upper electrode layer and a lower electrode layer. The single cell comprises a substrate having first openings penetrating from an upper surface thereof to a lower surface thereof, an insulating and stress absorbing layer formed at least on outer peripheries of the first openings and a part of a region of the first openings on the upper surface of the substrate and having second openings smaller than the first openings in the region of the first openings, and a solid electrolyte layer formed on the insulating and stress absorbing layer and covering the second openings. The solid electrolyte is smaller than the first openings in area. Furthermore, the single cell comprises an upper electrode layer formed on the solid electrolyte layer and a lower electrode layer formed on a lower surface of the solid electrolyte layer exposed to the lower surface of the substrate and the first openings.

Note that, in the third single cell, the lower electrode layer may be formed on the upper surface of the substrate, alternatively, on the insulating and stress absorbing layer.

Moreover, in the third single cell, the insulating and stress absorbing layer may have a plurality of the second openings in the first openings of the substrate.

The first single cell and cell plate of the present invention has a structure, in which the solid electrolyte layer and the upper electrode layer are formed on the substrate having the openings with the insulating and stress absorbing layer interposed therebetween, and the lower electrode layer contacts the solid electrolyte layer on the openings of the substrate. Therefore, a thin-film cell structure can be realized, in which a thickness of the solid electrolyte layer is thinned to about several μm. Moreover, the insulating and stress absorbing layer electrically insulates the substrate and the cell and absorbs occurrence of a heat stress between the substrate and the solid electrolyte layer, which are different from each other in thermal expansion coefficients. Accordingly, also against a temperature change of the fuel cell, which is caused at the time of start/stop of the fuel cell, the solid electrolyte layer is not exfoliated or broken due to the heat stress originating from the difference in the thermal expansion coefficients between the solid electrolyte layer and the substrate, and thus a highly reliable cell can be provided.

Moreover, by the above factor, a fuel cell capable of quick start/stop operations can be supplied. Since the cell structure is tougher against the temperature change, as causes of the temperature change, a control system for flow amounts and passages of the fuel gas, air and exhaust, a control system for a fuel gas component and a control system for a humidification degree of the fuel gas can be simplified.

Furthermore, according to the first single cell, since the solid electrolyte layer can be formed on a compact insulating and stress absorbing layer excellent in smoothness, it is made possible to form a thin and compact solid electrolyte layer. Moreover, since the lower electrode layer can be deposited from the lower surface side of the substrate and formed on the lower surface of the solid electrolyte layer exposed to the openings, a porous lower electrode layer having a large electrode reaction area can be obtained. Moreover, since the lower electrode layer is formed on the lower surface of the substrate, the lower electrode layer is drawn out for electrical connection readily.

Moreover, in the first and second single cell and cell plate, plane patterns of the solid electrolyte layer, the upper electrode layer and the lower electrode layer are formed in shapes capable of absorbing the stress, alternatively, in one cell plate, the forming regions thereof are appropriately divided, thus it is made possible to provide a cell plate tough against the heat stress and highly reliable.

Furthermore, in the first single cell and cell plate, if the frame-shaped or beam-shaped pattern of the insulating and stress absorbing layer is formed on the openings of the substrate, the occurrence of the stress can be suppressed more effectively. Moreover, if such a pattern is formed on the insulating and stress absorbing layer in advance, it is made possible to reinforce the solid electrolyte layer from an initial stage of the manufacturing steps. A variety of stresses applied to the cell in manufacturing steps such as chemicals and cleaning treatments can be reduced. Therefore, this cell structure is extremely suitable for mass production.

Moreover, the first single cell and cell plate added with the reinforcement layers and the second single cell and cell plate having the reinforcement layers can avoid the occurrence of the stress more securely owing to the reinforcement layers having the frame-shaped and beam-shaped patterns, which are formed on a specified position. Moreover, since it is made possible to enlarge the area of the openings of the substrate, a ratio of the openings where power is generated in a single cell and a cell plate per unit size can be increased. Accordingly, the generation power output density can be improved.

Specifically, in the case where the reinforcement layer is formed between the solid electrolyte layer and the lower electrode layer, it is made possible to reinforce the solid electrolyte layer from the initial stage of the manufacturing steps, and a variety of loads applied to the cell in the manufacturing steps such as chemicals and cleaning treatments are reduced, thus the productivity can be increased.

Moreover, in the case where the reinforcement layer is formed between the solid electrolyte layer and the upper electrode layer, since the reinforcement layer pattern is formed after the formation of the solid electrolyte layer, the solid electrolyte layer can be formed on a plane surface. Hence, a highly reliable solid electrolyte layer without any step difference can be obtained. Moreover, also in this case, it is made possible to reinforce the solid electrolyte layer from a relatively initial stage of the manufacturing steps, and the stress applied to the cell can be reduced.

Furthermore, in the case where the reinforcement layer is formed between the solid electrolyte layer and the upper electrode layer and functions as the upper electrode layer or has a property not hindering this function, a substantial reduction of the opening area due to the formation of the reinforcement layer can be prevented.

Moreover, in the case where the reinforcement layer is formed on the upper electrode layer, the reinforcement is made possible without reducing an interface area between the solid electrolyte layer and the upper electrode layer, which affects a power generation efficiency of the cell. Furthermore, in the case where this reinforcement layer functions as the upper electrode layer or does not hinder this function, the upper electrode layer can be thinned to facilitate permeation of the fuel gas and the air to a reaction interface, thus enabling the improvement of the power generation characteristic. Moreover, in the case where the reinforcement layer has a function of the upper electrode layer, since the reinforcement layer can be used as a current path, an electric loss in the current path can be suppressed.

Furthermore, in the second single cell and cell plate, if the reinforcement layer is formed between the lower electrode layer and the insulating and stress absorbing layer, it is made possible to reinforce the solid electrolyte from the initial stage of the manufacturing process, the stress to the cell during manufacturing is reduced, and the productivity is increased. Moreover, since the reinforcement layer is not formed in a three-layered structure consisting of the upper electrode layer, the solid electrolyte layer and the lower electrode layer, it is made possible to reinforce the cell without reducing the interface area affecting the power generation efficiency of the cell. Moreover, in this case, when the reinforcement layer has a function as the lower electrode layer or does not hinder this function, the reduction of the opening area due to the formation of the reinforcement layer can be prevented.

Note that, in the first single cell and cell plate, if the reinforcement layer is formed between the insulating and stress absorbing layer and the solid electrolyte layer so as to cover the openings, breakage resistance against the heat stress can be increased, and an effect of reinforcing film strength of the solid electrolyte layer is also obtained. For example, the solid electrolyte layer as a partition can be effectively prevented from breakage by a pressure difference originating from a flow difference between any one of the fuel gas and the air flowing on the upper electrode layer side and the other thereof flowing on the lower electrode layer side, the fuel gas and the air being separated by the solid electrolyte layer.

Moreover, in the case where the reinforcement layer has a frame-shaped pattern and/or a beam-shaped pattern as covering the frames of the openings of the substrate, reinforced is a portion of the solid electrolyte layer in the vicinity of the openings of the substrate, where the stress is apt to be concentrated, and thus the breakage resistance against the heat stress is increased.

Furthermore, in the case where the opening of the substrate is divided into two or more regions by the beam-shaped pattern of the reinforcement layer as described above, the breakage resistance against the heat stress is further increased.

Note that, also in the case where the insulating and stress absorbing layer has the frame-shaped pattern and/or the beam-shaped pattern as covering the frames of the openings of the substrate, it exerts an effect similar to that of the reinforcement layer.

Still further, in the single cell and the cell plate of the present invention, a silicon wafer can be suitably used as the substrate, thus, it is made possible to form compact thin films less defective including the solid electrolyte layer, the insulating layer, the electrode layer and the like by use of a semiconductor mass production technology. Thus, it is made possible to manufacture the single cell and the cell plate by a process suitable for the mass production.

Furthermore, according to the manufacturing method of the present invention, to which the semiconductor mass production technology as described above is applied, a desired single cell and cell plate can be manufactured efficiently while absorbing the heat stress.

Note that, if the thickness of the above-described reinforcement layer is set at 100 nm to 100 µm, mass production technologies as represented by the semiconductor technology can be applied more readily.

In the third single cell for the fuel cell of the present invention, the area of the electrolyte layer is smaller than that of the openings (first openings) of the substrate, and the electrolyte layer is held on the openings of the substrate by interposition of the insulating and stress absorbing layer therebetween. Accordingly, a distance between the electrolyte layer (first openings) and the opening frames of the substrate exhibits favorably an effect of absorbing the stress due to the difference in the thermal expansion coefficients similarly to that when the insulating and stress absorbing layer is thickened. Even in comparison with a structure, in which three layers of the electrolyte layer, the insulating and stress absorbing layer and the substrate are layered in a longitudinal direction, partial exfoliation and breakage of the electrolyte layer, which are caused by the heat stress originating from the difference in the thermal expansion coefficients between the substrate and the electrolyte layer, can be reduced more favorably.

Moreover, in the third single cell and cell plate of the present invention, a silicon wafer can be suitably used as the substrate, thus, it is made possible to form compact thin films less defective including solid electrolyte, an insulator, an electrode and the like by use of the semiconductor mass production technology. Thus, it is made possible to manufacture the single cell and the cell plate by a process suitable for the mass production.

Furthermore, according to the manufacturing method of the present invention, to which the semiconductor mass production technology as described above is applied, a desired single cell and cell plate can be manufactured efficiently while absorbing the heat stress.

Note that, if the thickness of the above-described reinforcement layer is set at 100 nm to 100 µm, mass production technologies as represented by the semiconductor technology can be applied used more readily.

BRIEF DESCRIPTION OF DRAWINGS

FIG. 6 is a table showing fabrication conditions of insulating and stress absorbing layers and electrolyte layers of the respective cell plates of example 2 and states of the electrolyte layers after heat treatment under the respective conditions.

FIG. 9 is a table showing fabrication conditions of insulating and stress absorbing layers and electrolyte layers of the respective cell plates of example 4 and states of the electrolyte layers after heat treatment under the respective conditions.

FIGS. 17A to 17G are sectional views of a cell of example 8 in the respective manufacturing steps, FIGS. 18A to 18G are plan views of the cell of example 8 in the respective manufacturing steps, and FIG. 18 EB is a bottom view thereof.

FIGS. 19A to 19H are sectional views of a cell of example 9 in the respective manufacturing steps, and FIGS. 20A to 20H are plan views of the cell of example 9 in the respective manufacturing steps.

BEST MODE FOR CARRYING OUT THE INVENTION

Hereinafter, description will be made for an embodiment of a single cell and a cell plate for a solid oxide fuel cell of the present invention.

Moreover, for convenience of explanation, one surface of each layer such as a substrate and an electrode layer is described as a "front surface" and an "upper surface", the other surface thereof is described as a "back surface" and a "lower surface", and in response to these, the electrode layer is described as an "upper electrode layer" and a "lower electrode layer". However, it is needless to say that these are equivalent elements and that a constitution in which these are mutually substituted is also included in the scope of the present invention.

The single cell for the fuel cell of the embodiment of the present invention is roughly divided into first, second and third single cells. Moreover, the cell plate for the fuel cell of the embodiment of the present invention is also divided roughly into first to third cell plates, corresponding to the respective single cells.

Figure 1A:
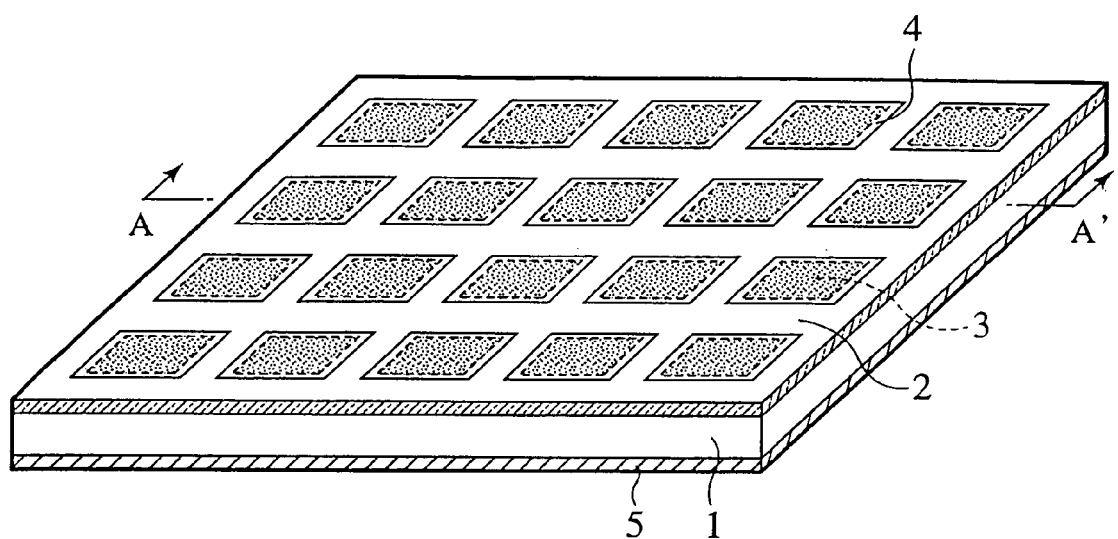
FIG. 1A is a perspective view of a cell plate of example 1.
Figure 1B:
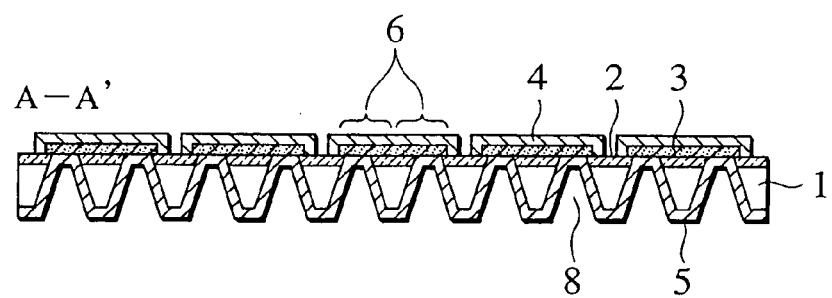
FIG. 1B is a sectional view thereof.

For example, as shown in FIGS. 1A and 1B, the first single cell includes a substrate 1 having openings 8 penetrating from an upper surface thereof to a lower surface thereof, and an insulating and stress absorbing layer 2 formed on at least the upper surface of this substrate 1 and coated on a region of this upper surface other than the openings 8 or on the region and a part of the openings 8. And, on the entire or a part of the upper surface of this insulating and stress absorbing layer 2, a solid electrolyte layer 3 covers at least the openings 8 or the rest portion of the openings coated with the insulating and stress absorbing layer 2. An upper electrode layer 4 is formed on the entire or a part of an upper surface of the solid electrolyte layer 3, and a lower electrode layer 5 covers the entire or a part of the lower surface of the substrate 1 and a lower surface of the solid electrolyte layer 3, which is exposed to the openings 8 (see examples 1 to 10).

As shown in FIGS. 1A and 1B, the first cell plate is the one, in which the first single cells 6 are arrayed two-dimensionally on the substrate 1 common thereto.

The first single cell and cell plate include, as essential constituent components, the substrate having the openings, the insulating and stress absorbing layer, the lower electrode layer, the solid electrolyte layer and the upper electrode layer. However, for the first single cell, a reinforcement layer is an optional constituent component.

Figure 23A:
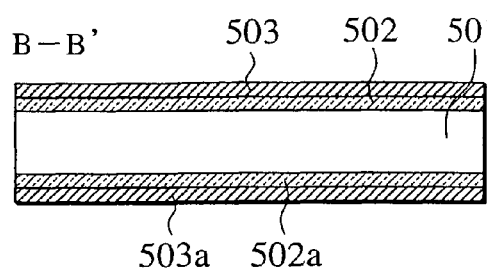
FIGS. 23A to 23G are sectional views of a cell of example 11 in the respective manufacturing steps.
Figure 24A:
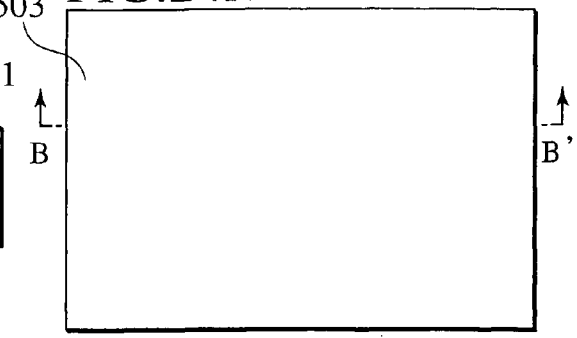
FIGS. 24A to 24G are plan views of the cell of example 11 in the respective manufacturing steps.
Figure 23B:
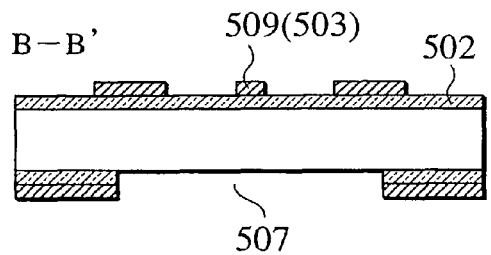
Figure 24B:
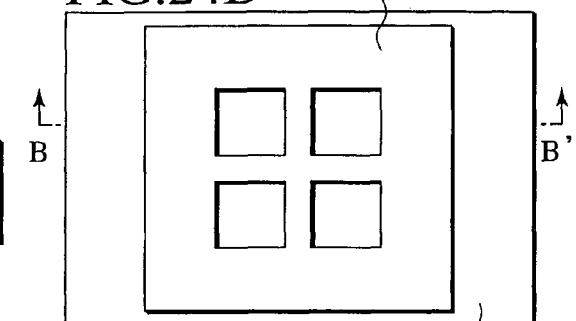
Figure 23C:
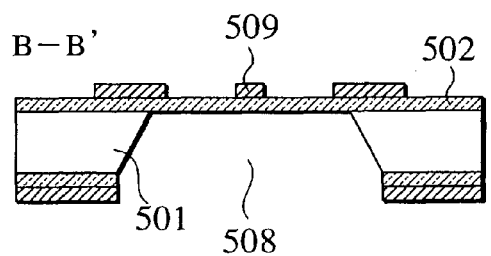
Figure 24C:
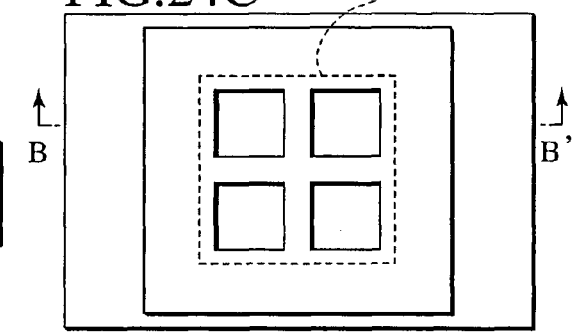
Figure 23D:
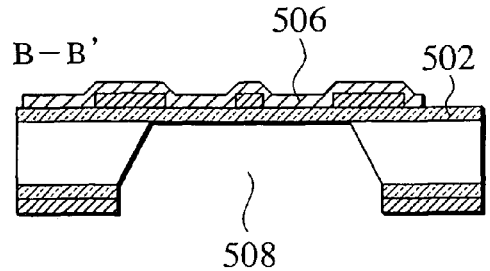
Figure 24D:
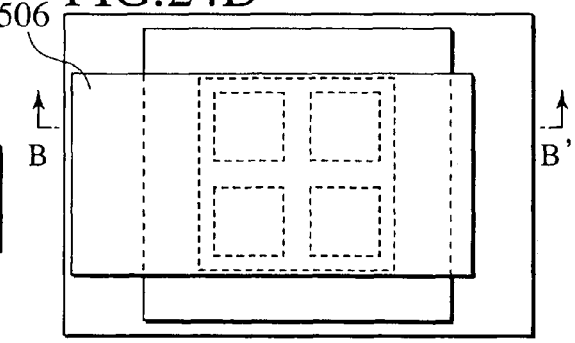
Figure 23E:
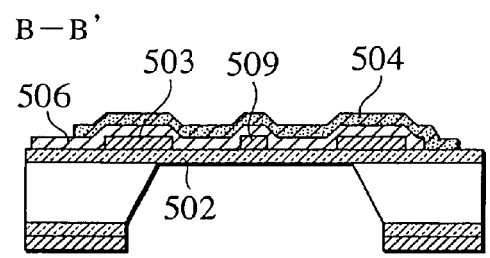
Figure 24E:
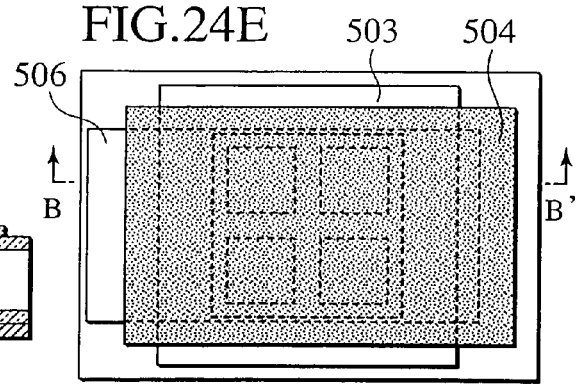
Figure 23F:
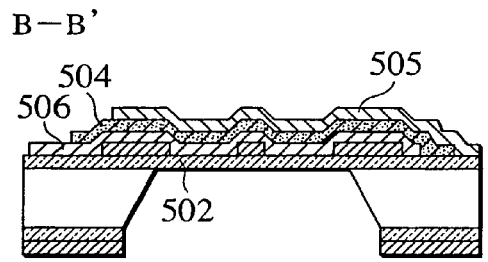
Figure 24F:
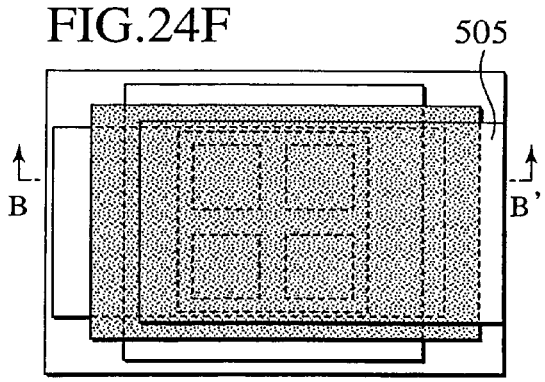
Figure 23G:
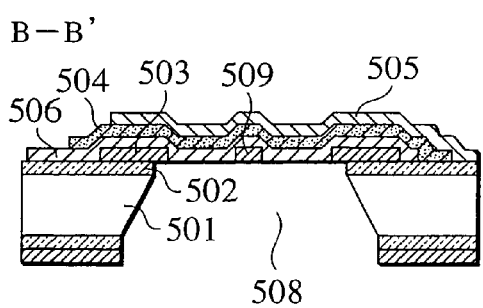
Figure 24G:
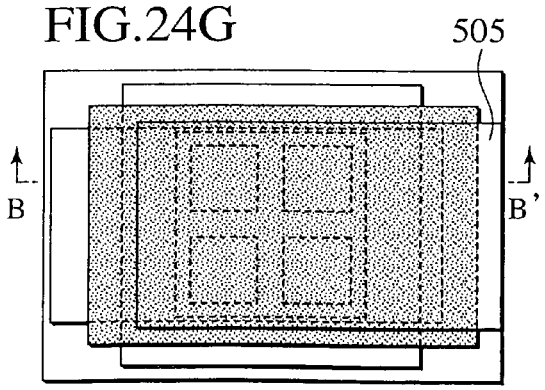

Meanwhile, as shown in FIGS. 23G and 24G, for example, the second single cell includes a substrate 501 having an opening 508 penetrating from an upper surface thereof to a lower surface thereof, an insulating and stress absorbing layer 502 formed on at least the upper surface of this substrate 501 and coated on a region of this upper surface other than the opening 508, and frame-shaped and/or beam-shaped reinforcement layers 503 (509) for the opening 508. Furthermore, a lower electrode layer 506 is formed on the entire or a part of the insulating and stress absorbing layer 502 and covers the opening 508 (see example 11).

The second cell plate is the one, in which the second single cells are arrayed two-dimensionally on the substrate 501 common thereto.

For the second single cell and cell plate, the reinforcement layer is also an essential constituent component together with the substrate having the opening, the insulating and stress absorbing layer, the lower electrode layer, the solid electrolyte layer and the upper electrode layer.

Note that, since the cell plate is formed by integrating the single cells, it is a practical product form for achieving a high output of the fuel cell. However, a mechanical stress and a heat stress applied to the cell plate become larger than those applied to the single cell. The insulating and stress absorbing layer and the reinforcement layer are for suppressing the occurrence of the mechanical stress and the heat stress as described above, and become more important in the cell plate than in the single cell.

Moreover, a greatly different point between the first single cell and the second single cell is that, while the lower electrode layer is formed from the lower surface side of the substrate in the first single cell, the lower electrode layer is formed from the upper surface side of the substrate in the second cell.

Figure 4A:
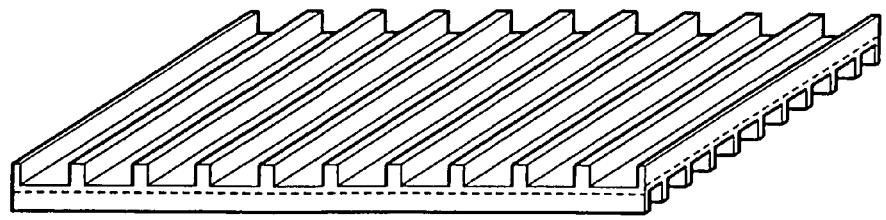
FIG. 4A is a perspective view of a separator.
Figure 4B:
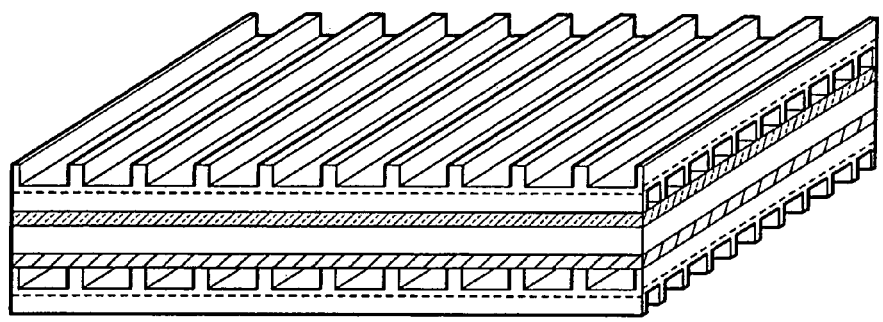
FIG. 4B is a perspective view of a fuel cell having two separators and the cell plate of example 1 stacked.
Figure 4C:
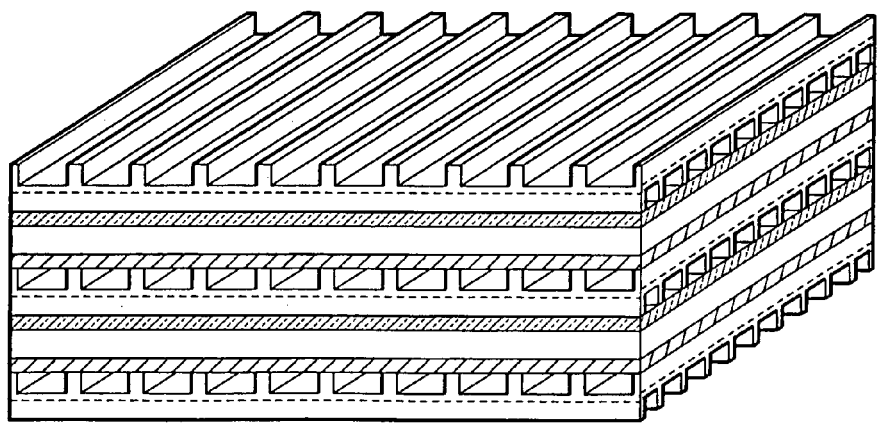
FIG. 4C is a perspective view of a fuel cell having the fuel cells of FIG. 4B stacked.

Note that, as shown in FIG. 4C, the solid oxide fuel cell according to this embodiment is the one, in which the first or second cell plates and plate-shaped separators, each separator having fuel gas flow paths on one surface thereof and oxygen gas flow paths on the other surface thereof, are alternately stacked.

Hereinafter, description will be made for the respective constituent components of the first and second single cells (first and second cell plates) of this embodiment.

First, the substrate includes the openings penetrating between the upper and lower surfaces thereof, and stably maintains a layered structure of the solid electrolyte layer necessary to exert a power generation function and the upper electrode layer and the lower electrode layer, which sandwich the solid electrolyte layer. The substrate has a function of facilitating the formation and the integration of the layered structure, and has a function of facilitating an electric connection in forming the fuel cell with the single cell or cell plate obtained. Note that, as the substrate for the cell plate, the one having a plurality of the openings formed therein is used.

In consideration of the above-described functions, the one excellent in smoothness and processability of forming the openings are preferably used. For example, a silicon wafer, a magnesia (MgO) substrate, an alumina substrate, a heat-resistant glass substrate, a metal alloy substrate containing nickel or iron as a main component, a substrate made of SUS or the like can be used.

Next, the insulating and stress absorbing layer is a layer having an insulation property and a stress absorbing (reducing) function (particularly a stress applied to the solid electrolyte layer). On both of the upper and lower surfaces of the substrate, the insulating and stress absorbing layers may be coated. However, the insulating and stress absorbing layer must be formed at least on the surface of the substrate, on which the solid electrolyte layer is formed.

Although this insulating and stress absorbing layer can be coated on the entire or a part of the substrate surface, it is desirable that in the case of the cell plate, the insulating and stress absorbing layer be appropriately divided and coat a part of the substrate surface. These structures increase the stress absorbing effect of the insulating and stress absorbing layer and facilitate the electric connection thereof.

Moreover, the insulating and stress absorbing layer does not basically cover the openings of the substrate completely, however, it is possible to form the insulating and stress absorbing layer in such a form as to coat a part of the openings, for example, in a frame-shaped pattern where the layer somewhat protrudes from the peripheral portions of the openings, in a beam-shaped pattern where the layer crosses the openings, in a beam-added frame-shaped pattern formed by combining the both and the like. In this case, the stress absorption effect can be further improved.

In the case where the insulating and stress absorbing layer forms the frame shape, the beam shape or the beam-added frame shape as described above, where an original area of the opening is S0, an occupation area of the insulating and stress absorbing layer on the opening is S, and a substantial area of the opening is S0-S, desirably, the following expression is satisfied:

$$S/(S0-S) \leq 5$$

When the ratio exceeds 5, a cell area relative to the entire area of the cell plate having the plurality of cells formed thereon is reduced, thus bringing a tendency of lowering the generation power output. Note that, in the present invention, it is more preferable that the ratio as described above be set at 1/20 to 5.

Moreover, it is preferable that the beam-shaped pattern of the insulating and stress absorbing layer passes through an approximate center of the opening of the substrate. Furthermore, it is desirable that the opening of the substrate be divided into opening portions approximately equally by this beam-shaped pattern. With such a constitution, it is made possible to disperse the stress evenly, and the absorption action for the stress can be further improved.

A thickness of the insulating and stress absorbing layer can be changed appropriately in accordance with a dimension and performance of the fuel cell to be manufactured, types of materials to be used and the like, however, the thickness is preferably set in a range of about 100 nm to 100 μm.

If the thickness is 100 nm or more, the effect of absorbing the stress and the insulating function are fully exerted. Moreover, if the thickness is 100 μm or less, surface roughness of the insulating and stress absorbing layer becomes smooth, and a compact and thin solid electrolyte layer is formed easily. Moreover, also in the manufacturing process, since a process analogous to a semiconductor manufacturing process is readily employed, the process is simplified effectively.

Furthermore, the insulating and stress absorbing layer has a function of improving adhesiveness of the solid electrolyte layer. Since the solid electrolyte layer as a compact thin film high in smoothness is formed on the insulating and stress absorbing layer, it is desirable that the insulating and stress absorbing layer itself be excellent in smoothness. Moreover, in the step of etching the substrate for forming the openings thereon, it is desirable that the insulating and stress absorbing layer have etching resistance in order to protect the solid electrolyte layer.

Specifically, as the insulating and stress absorbing layer, mentioned is a material containing, preferably as a main component, silicon oxide, silicon nitride, phosphosilicate glass (PSG), borophosphosilicate glass (BPSG), alumina, titania, zirconia, MgO or any mixture thereof.

Particularly in order to suppress the occurrence of the heat stress originating from a difference in thermal expansion coefficients between the substrate and the solid electrolyte layer, it is preferable that a thermal expansion coefficient of the insulating and stress absorbing layer be set at an intermediate value between the substrate and the solid electrolyte layer. However, the thermal expansion coefficient of the insulating and stress absorbing layer is not necessarily limited and may be any value allowing the stress absorption function to be resultantly exerted in consideration of the shape, the thickness and the like of the insulating and stress absorbing layer.

Next, the solid electrolyte layer is basically formed on the entire or a part of the above-described insulating and stress absorbing layer so as to entirely cover at least the openings of the substrate or the opening portions (rest portion not coated with the beam-shaped absorption layer).

For a plane pattern of this solid electrolyte layer, it is preferable to employ a shape capable of absorbing the heat stress, and the shape, for example, can be square, rectangular, polygonal, circular or the like.

The plane pattern of the solid electrolyte layer depends on sizes of the substrate and the openings and materials and thicknesses of the solid electrolyte layer, the electrode layer, the substrate and the like. Furthermore, the plane pattern depends on using conditions of the cell plate, that is, an operation mode, the generation power output and the like of the fuel cell. Accordingly, the solid electrolyte layer may be a broad continuous film as covering entirely the plurality of openings formed in the common substrate of the cell plate, or may be a film, for example, in patterns separately independent for each opening or for each of some openings.

Note that, surface shapes and division specifications, which are separate from one to another, can be applied to the solid electrolyte layer, the upper electrode layer, the lower electrode layer, the insulating and stress absorbing layer and a reinforcement layer to be described later.

Moreover, in the first single cell and the first cell plate, the lower surface of the solid electrolyte layer is formed so as to be approximately the same surface (on the same plane) as the upper surface of the insulating and stress absorbing layer coated on the substrate. Therefore, on the region above the substrate other than the openings, the insulating and stress absorbing layer, the solid electrolyte layer and the upper electrode layer are sequentially layered on the substrate, and the lower electrode layer is coated on the lower surface of the substrate. Meanwhile, in the openings of the substrate, the lower surface of the electrolyte layer is formed on approximately the same plane position as the upper surface of the insulating and stress absorbing layer. However, the substrate and the insulating and stress absorbing layer are not present in the openings, and the lower surface of the electrolyte layer is constituted to contact the upper surface of the lower electrode layer.

Note that, in this embodiment, the region in which the upper electrode layer and the lower electrode layer are adhered onto the continuous solid electrolyte layer can be set as the single cell. Therefore, the single cell can be formed over one or plural openings of the substrate.

For the solid electrolyte layer as described above, a material having oxygen ion conductivity, for example, stabilized zirconia in which neodium oxide ($Nd_2O_3$), samarium oxide ($Sm_2O_3$), yttria ($Y_2O_3$), gadolinium oxide ($Gd_2O_3$) or the like is contained as solid-solution, ceria ($CeO_2$) based solid-solution, bismuth oxide and $LaGaO_3$ based provskite type oxide and the like can be used, but the material is not limited to these.

Next, with regard to the upper electrode layer and the lower electrode layer, any one of these can be used as a so-called fuel electrode layer, the other can be used as an air electrode layer, and depending on the case, it is also possible to form the both electrode layers of the same material.

Typically, as a fuel electrode material, nickel, nickel cermet, platinum or the like can be used, and as an air electrode material, for example, perovskite type oxide such as $La_{1-x}Sr_xMnO_3$ and $La_{1-x}Sr_xCoO_3$ can be used. However, the materials are not limited to these.

The reinforcement layer achieves a function of reinforcing the single cell structure and the cell plate structure by absorbing the heat stress and the mechanical stress, which are applied to the solid electrolyte layer and the like.

In the first single cell and the first cell plate, the reinforcement layer is an optional constituent component and can be interposed between the insulating and stress absorbing layer and the solid electrolyte, between the solid electrolyte layer and the upper electrode layer, on the upper electrode layer, or between the substrate and the insulating and stress absorbing layer.

Meanwhile, in the second single cell and the second cell plate, the reinforcement layer is an essential constituent component and can be formed between the substrate and the insulating and stress absorbing layer, between the insulating and stress absorbing layer and the lower electrode layer, between the lower electrode layer and the solid electrolyte layer, between the solid electrolyte layer and the upper electrode layer, or on the upper electrode layer.

Not only one layer but also two or more layers of the reinforcement layers can be disposed on the region on or above the openings of the substrate as long as the reinforcement layers do not damage the power generation function of the single cell and the cell plate. However, the characteristic required somewhat differs in response to the position where the reinforcement layer is disposed.

Typically, the reinforcement layer as described above can have a frame-shaped, beam-shaped or beam-added frame-shaped pattern on the region of the openings of the substrate similarly to the above-described insulating and stress absorbing layer. Thus, the stress can be sufficiently: absorbed. However, in the case where the reinforcement layer has at least one conductivity of oxygen ion conductivity and electron conductivity, the reinforcement layer can be set as a part of the solid electrolyte layer or a part of the lower electrode layer. Therefore, a pattern as covering entirely the openings of the substrate can be also employed.

Particularly, in the first single cell and the first cell plate, in the case where the reinforcement layer is formed between the insulating and stress absorbing layer and the solid electrolyte layer, the insulating and stress absorbing layer mainly exerts a function of electrical insulation, a function of absorbing the stress of the solid electrolyte layer and a function of protecting the solid electrolyte layer formed on the insulating and stress absorbing layer in the step of forming the openings of the substrate. And the reinforcement layer is required a function of further absorbing the stress, a function of improving adhesiveness of the solid electrolyte layer, and smoothness. When the reinforcement layer satisfies such requirements, it exerts a function of forming a compact thin film high in smoothness in the step of forming a solid electrolyte layer.

In this case, when the reinforcement layer is excellent in the heat stress absorption function and is made of a material having the electron conductivity or the ion conductivity, the reinforcement layer may be formed in a pattern where it does not directly contact the electrode layer. Furthermore, when the reinforcement layer has ion conductivity and does not significantly damage the power generation function like the one not hindering the function of the electrolyte, the reinforcement layer can be formed between the solid electrolyte layer and the lower electrode layer.

Next, mentioned are the functions required in response to the position of the reinforcement layer and usable materials in this case.

First, in the first single cell and cell plate, when the reinforcement layer is disposed between the insulating and stress absorbing layer and the solid electrolyte layer, the reinforcement layer is required to have an insulation property, to have a function as the lower electrode layer or not to hinder the function thereof.

Specifically, as the one having the insulation property (insulating material), exemplified can be silicon nitride, phosphosilicate glass, borophosphosilicate glass, alumina, titania, zirconia, magnesia and any mixture thereof; glass having silicon, titanium, chrome, iron, cobalt, nickel, zirconium, molybdenum, tungsten, tantalum or any mixed metal thereof dispersed therein (hereinafter, abbreviated as "A group material"). Meanwhile, as the one not hindering the function of the lower electrode layer, from the viewpoint of improving the electrode function, mentioned can be electrode materials such as metal containing, as main components, titanium, chrome, iron, cobalt, nickel, zirconium, molybdenum, tungsten, tantalum and any mixed metal thereof (hereinafter, abbreviated as "B group material").

Moreover, when the reinforcement layer is disposed between the solid electrolyte layer and the upper electrode layer, the reinforcement layer is required not to hinder the function as the electrolyte, to have a function as the upper electrode, or not to hinder the function thereof.

Specifically, as the one not hindering the function as the electrolyte, from the viewpoint of improving the electrolyte function, used is a solid electrolyte material such as stabilized zirconia and cerium oxide based solid solution containing silicon, titanium, chrome, iron, cobalt, nickel, zirconium, molybdenum, tungsten and tantalum and any mixed metal thereof (hereinafter, abbreviated as "C group material"). Meanwhile, as the one having the function as the upper electrode, the above-described B group material is used.

Furthermore, on the upper electrode layer, the reinforcement layer is required to have the function as the upper electrode or not to hinder the function thereof, and specifically, the foregoing B group material or the like is used.

Still further, when the reinforcement layer is disposed between the substrate and the insulating and stress absorbing layer, the reinforcement layer is required to have the insulation property, and specifically, the foregoing A group material or the like is used.

Meanwhile, in the second single cell and cell plate, when the reinforcement layer is disposed between the substrate and the insulating and stress absorbing layer, the insulation property is required, and specifically, the foregoing A group material or the like is used.

Moreover, when the reinforcement layer is disposed between the insulating and stress absorbing layer and the lower electrode layer, the reinforcement layer is required to have the insulation property, to have the function as the lower electrode or not to hinder the function thereof, and specifically, the foregoing A group material, B group material or the like is used.

Furthermore, when the reinforcement layer is disposed between the lower electrode layer and the solid electrolyte layer, the reinforcement layer is required not to hinder the function as the electrolyte, to have the function as the lower electrode or not to hinder the function thereof, and specifically, the foregoing C group material, B group material or the like is used.

Moreover, when the reinforcement layer is disposed between the solid electrolyte layer and the upper electrode layer, the reinforcement layer is required not to hinder the function as the electrolyte, to have the function as the upper electrode or not to hinder the function thereof, and specifically, the foregoing C group material, B group material or the like is used.

Furthermore, when the reinforcement layer is disposed on the upper electrode layer, the reinforcement layer is required to have the function as the upper electrode or not to hinder the function thereof, and specifically, the foregoing B group material or the like is used.

Next, description will be made for the manufacturing method of the single cell and the cell plate of this embodiment.

For example, as shown in FIGS. 2A to 2G, the manufacturing method of the single cell of this embodiment includes the following steps (a) to (g).

Figure 2A:
FIGS. 2A to 2G are sectional views of the cell of example 1 in the respective manufacturing steps.

(a) forming an insulating and stress absorbing layer on one surface of a substrate, typically, on an upper surface thereof (FIG. 2A)

Figure 2B:
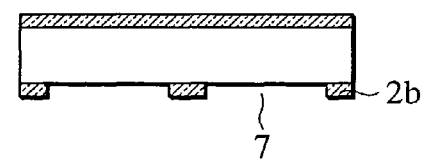

(b) forming a mask layer for forming openings on at least one surface of the substrate, typically, on a lower surface thereof (FIG. 2B)

Figure 2C:
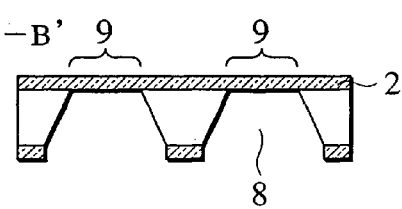

(c) etching the substrate from the lower surface by use of the mask layer as an etching mask to form the openings on the substrate (FIG. 2C)

Figure 2D:
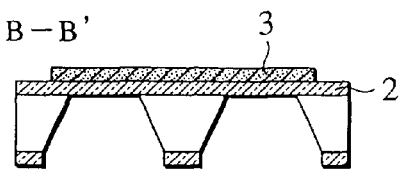

(d) forming a solid electrolyte layer on the insulating and stress absorbing layer (FIG. 2D)

Figure 2E:
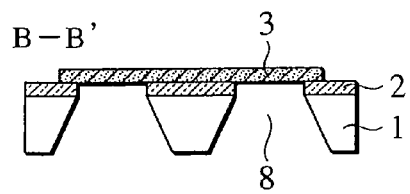

(e) etching and removing the insulating and stress absorbing layer covering the openings of the substrate to expose the solid electrolyte layer (FIG. 2E)

Figure 2F:
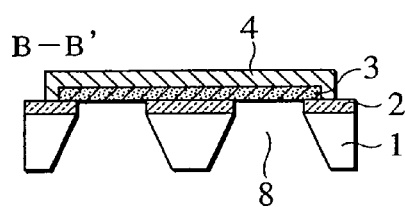

(f) forming an upper electrode layer on the solid electrolyte layer (FIG. 2F)

Figure 2G:
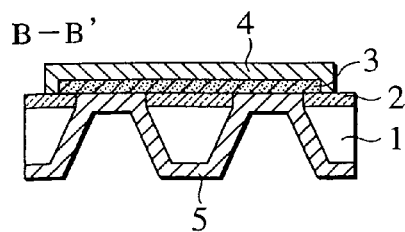

(g) forming a lower electrode layer on the lower surface of the substrate and the lower surfaces of the openings (FIG. 2G)

Here, either the step (a) or the step (b) may be executed first, and when the mask material and the material of the insulating and stress absorbing layer are the same, these steps can be carried out simultaneously.

Moreover, the step (c) is executed after the step (a) and before the step (e). The step (d) is executed after the step (a). The step (f) is executed after the step (d). The step (e) is executed after the step (d). The step (g) is executed after the step (e).

Note that, since the foregoing manufacturing method has a feature in that the solid electrolyte layer is formed on the insulating and stress absorbing layer, either the step of forming openings on the substrate (step (c)) or the step of forming a solid electrolyte layer (step (d)) may be carried out first.

Furthermore, with regard to the step of forming an upper electrode layer on the solid electrolyte layer (step (f)) and the step of etching the insulating and stress absorbing layer under the solid electrolyte layer from the lower surface of the substrate (step (e)), either of them may be carried out first.

Note that, the following reinforcement layer forming steps (h) and (i) may be added to the foregoing manufacturing method.

(h) forming a reinforcement layer in a shape of a desired film-forming surface (i) etching a portion of the reinforcement layer, which covers the openings of the substrate Moreover, the step (h) as an additional step can be executed at any timing. Furthermore, the step (i) as an additional step can be executed at any timing after the step (h).

When description is made for specific treatment methods in the respective steps, in the steps (a) and (b), the mask layer and the insulating and stress absorbing layer are formed by a thermal oxidation method and the like, and can be formed in desired patterns by a photolithography method. Moreover, the desired patterned layers can be provided also by an LPCVD method, a sol-gel method, a coating method and the like.

Moreover, for example, in the case of using a Si substrate, the formation of the openings in the step (c) can be carried out by forming the openings in a desired pattern by publicly known wet anisotropic etching using a solution containing potassium hydroxide as a main component or a solution containing hydrazine as a main component. Besides the above, a dry etching method, a laser processing method and the like can be also applied thereto.

As a method of forming a solid electrolyte layer in the step (d), an EVD method, a laser abrasion method, an evaporation method, a sputtering method, an ion plating method and the like can be used, by which a desired pattern can be formed.

In the upper electrode layer forming step (step (f)) and the lower electrode layer forming step (step (g)), the electrode in a desired pattern can be formed by a publicly known evaporation method, for example, a sputtering method, a flame-spray coating method, a spray method and a coating method.

Furthermore, also in the reinforcement layer forming step (step (i)), it is possible to form the reinforcement layer in a desired pattern by the evaporation method, the sputtering method, the flame-spray coating method and the coating method. Moreover, in the case of forming, for example, a stabilized zirconia layer having specified metal dispersed therein as the reinforcement layer described above, the specified metal and the stabilized zirconia may be deposited simultaneously by use of a two-source evaporation method or a sputtering method.

Figure 30C:
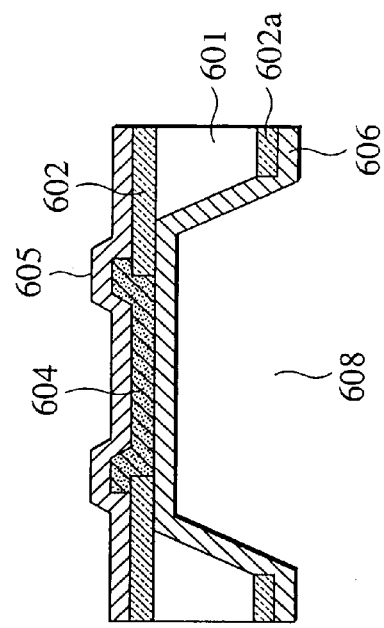
FIG. 30C is a partially enlarged view of the section.
Figure 30A:
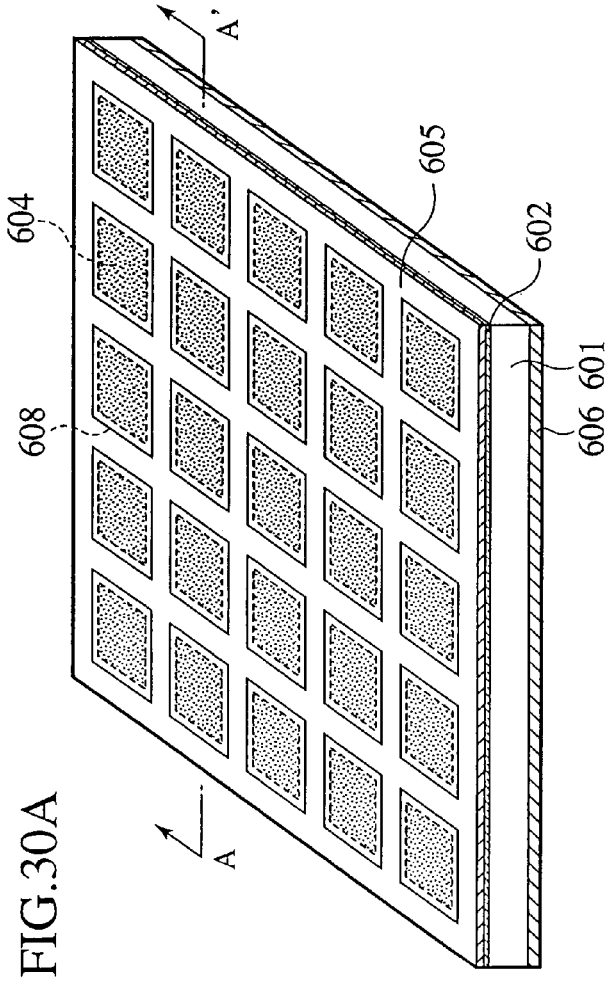
FIG. 30A is a perspective view of a cell plate of example 12.
Figure 30B:
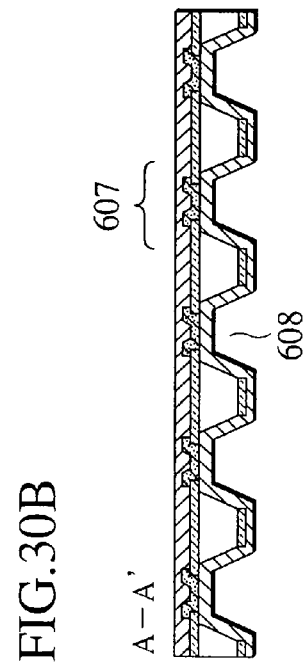
FIG. 30B is a sectional view thereof.

For example, as shown in FIGS. 30A to 30C, the third single cell of this embodiment includes a substrate 601 having a first opening 608 penetrating from an upper surface thereof to a lower surface thereof, an insulating and stress absorbing layer 602 formed on at least an outer periphery of the first opening 608 and a part of a region of the first opening 608 on the upper surface of the substrate 601. The insulating and stress absorbing layer 602 has a second opening smaller than the first opening 608. Also the third single cell has a solid electrolyte layer 604 smaller than the first opening in area, the solid electrolyte layer 604 being formed on the insulating and stress absorbing layer 602 and covering the second opening. Further, the third single cell has an upper electrode layer 605 formed on the solid electrolyte layer 604, and a lower electrode layer 606 formed on the lower surface of the substrate 601 and on a lower surface of the solid electrolyte layer 604 of which the surface is exposed to the first opening (see example 12).

Figure 33C:
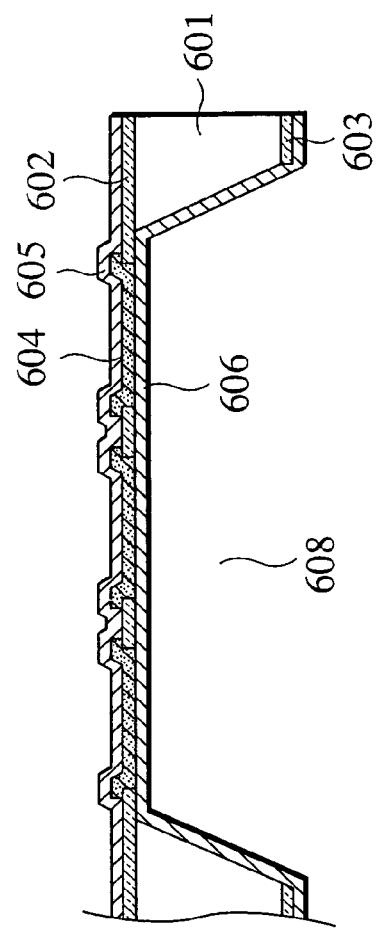
FIG. 33C is a partially enlarged view of the section.
Figure 33A:
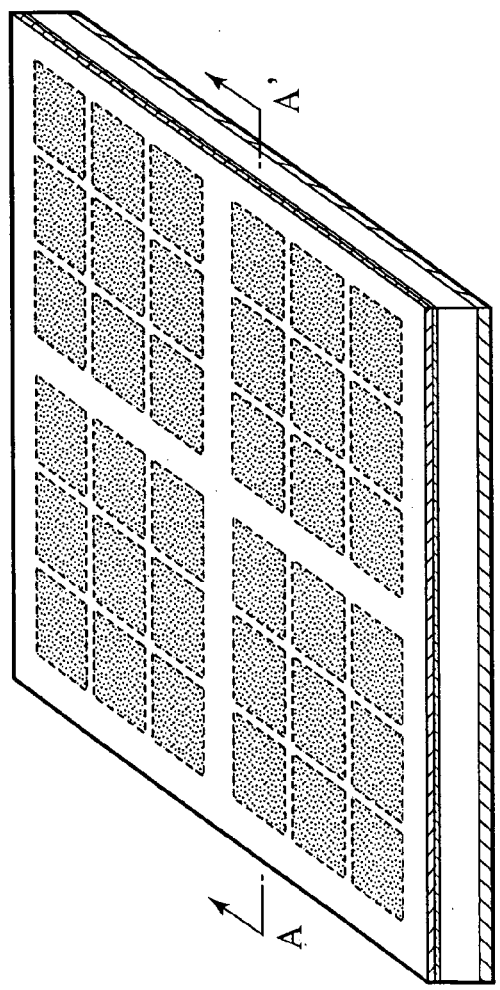
FIG. 33A is a perspective view of a cell plate of example 13.
Figure 33B:
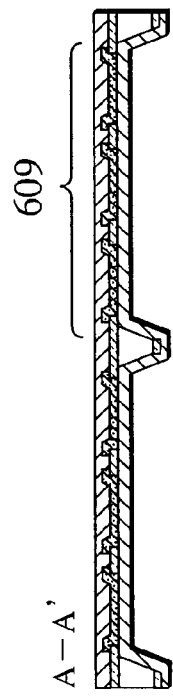
FIG. 33B is a sectional view thereof.

Moreover, for example, as shown in FIGS. 33A to 33C, in the third single cell, the insulating and stress absorbing layer 602 may include a plurality of the second openings in the first opening 608 (see examples 13 to 16, 19 and 20).

Figure 44A:
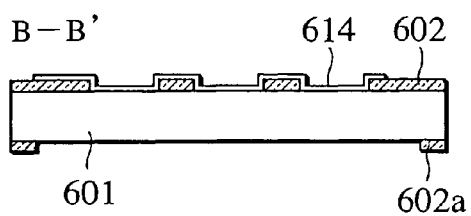
FIGS. 44A and 44B are sectionals views of a cell of example 18 in a manufacturing process and on completion, respectively.
Figure 44B:
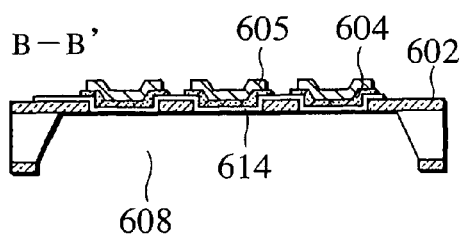

Furthermore, for example, as shown in FIG. 44B, in the third single cell, a lower electrode layer 614 may be formed on the upper surface of the substrate 601 (see examples 17 and 18).

With regard to the conditions for the respective constituent components of the third single cell, conditions similar to those for the above-described first and second single cells can be used.

EXAMPLES

Example 1

FIG. 1A is a perspective view of a cell plate of example 1, and FIG. 1B is a sectional view of this cell plate along a section line A-A' of FIG. 1A.

10 times 10 pieces of cells 6 are formed on a Si substrate 1 of 10 cm square. Each cell 6 has a rectangular opening 8 of about 2 mm square.

On one surface of the Si substrate 1 (hereinafter, referred to as a "upper surface"), on which a plurality of the openings 8 are formed, an insulating and stress absorbing layer 2 is formed. Moreover, on the upper surface of the substrate, on which the insulating and stress absorbing layer 2 is formed, electrolyte layers 3 and upper electrode layers 4 are formed so as to cover the openings 8. The other surface of the substrate (hereinafter, referred to as a "lower surface") is coated with a lower electrode layer 5, and on the openings 8, the lower electrode layer 5 is exposed to the upper surface of the Si substrate 1 and directly contacts the electrolyte layers 3.

Hereinafter, description will be made for a fabrication process for the cell plate with reference to FIGS. 2A to 2G and FIGS. 3A to 3G. FIGS. 2A to 2G are partial sectional views of the cell plate in the respective manufacturing steps, and FIGS. 3A to 3G are plan views of the cell plate in the respective manufacturing steps.

Figure 3A:
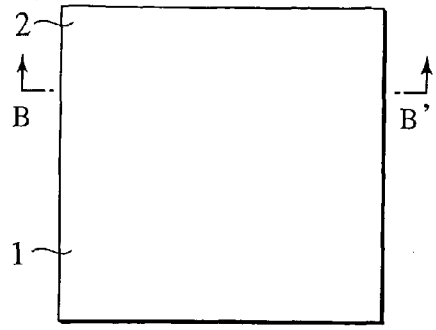
FIGS. 3A to 3G are plan views of the cell of example 1 in the respective manufacturing steps.

First, as shown in FIGS. 2A and 3A, for example, silicon nitride films as the insulating and stress absorbing layers 2 are deposited in thickness of about 200 nm on the both surfaces of the Si substrate 1 by a low pressure CVD method.

Figure 3B:
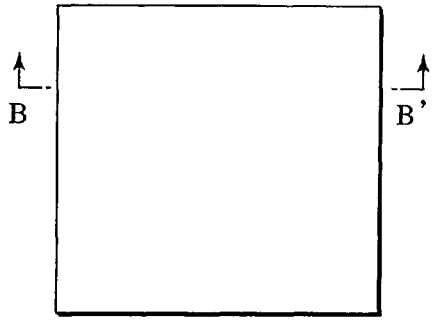

Next, a specified region of the silicon nitride film (insulating and stress absorbing layer) 2b on the lower surface of the substrate is removed by photolithography and chemical dry etching using $CF_4$ gas, thus forming Si exposure regions 7 (FIG. 2B and FIG. 3B).

Figure 3C:
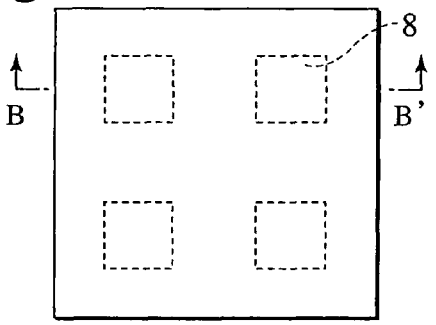

Furthermore, anisotropic etching is carried out for the Si substrate 1 at a temperature of about 80° C. by use of silicon etching liquid, for example, hydrazine, thus forming the openings 8 in the Si substrate 1. The etching progresses along the crystal plane (111), and thus the openings 8 having slant surfaces are obtained. Moreover, on each of the openings 8, the insulating and stress absorbing layer 2 remains. Such a structure is referred to as a diaphragm structure, and the insulating and stress absorbing layer 2 of a portion covering each of the openings 8 is particularly referred to as a diaphragm 9 (FIG. 2C and FIG. 3C).

Figure 3D:
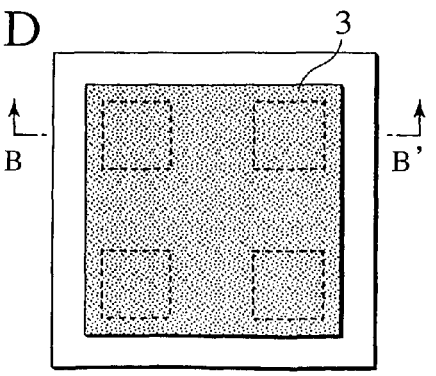

Thereafter, the electrolyte film 3 made of, for example, yttria stabilized zirconia (YSZ) is formed in thickness of about 2 μm on a region of 1.5 cm square by an RF sputtering method using an evaporation mask so as to cover the diaphragms 9 (FIG. 2D and FIG. 3D).

Figure 3E:
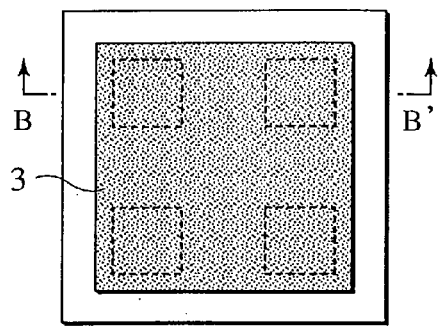

Next, the insulating and stress absorbing layers 2b and the diaphragms 9 on the lower surface of the Si substrate 1 are etched again by the chemical dry etching using $CF_4$ gas. Thus, the lower surface of the electrolyte film 3 is exposed to the openings 8. Specifically, the diaphragm structure by the electrolyte film 3 is formed (FIG. 2E and FIG. 3E).

Figure 3F:
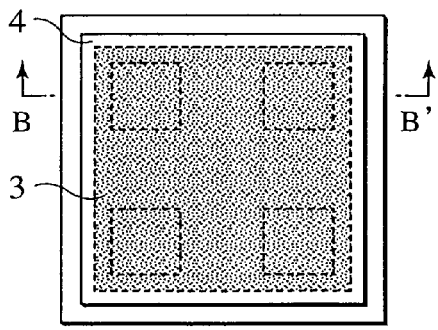

Furthermore, $La_{1-x}Sr_xMnO$ (hereinafter, referred to as "LSM") is deposited in thickness of about 500 nm on a region of 1.8 cm square on the upper surface of the Si substrate 1 by the RF sputtering method using an evaporation mask so as to cover the region on which the electrolyte film 3 is formed (FIG. 2F and FIG. 3F).

Figure 3G:
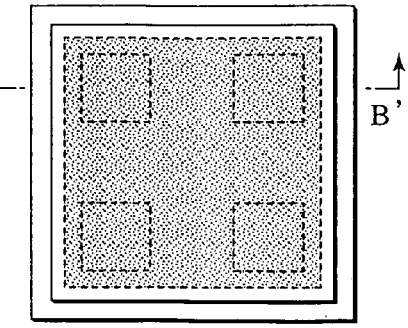

Next, on the lower surface of the Si substrate 1 including the openings 8, a Ni film is coated in thickness of about 500 nm by use of an EB evaporation method. Thus, the lower electrode layer 5 directly contacting the lower surface of the electrolyte film 3 via the openings 8 is formed (FIG. 2G and FIG. 3G).

In order to stack a plurality of Si substrate (cell plate) for fabricating a fuel cell stack, a separator 20 shown in FIG. 4A is prepared. The separator 20 is obtained by processing both surfaces of the Si substrate of 10 cm square by use of gas flow paths 22a and 22b using a dicing saw.

The fuel cell (FIG. 4B) of a structure, in which the cell plate fabricated by the above-described manufacturing method is sandwiched by two separators 20, was placed in an electric furnace. Oxygen gas was flown through the oxygen gas-flow path in the separator formed on the upper surface of the cell plate, hydrogen gas was flown through the fuel gas-flow path in the separator passage formed on the lower surface of the cell plate, and a temperature of the electric furnace was set at 700° C., then a power generation characteristic thereof was evaluated. An open-circuit voltage was 0.95 V, and a maximum output was 0.2 W/cm$^2$.

As described above, in accordance with the cell plate of example 1, even in the case of using a Si substrate of a relatively large area, since the structure is adopted, in which the electrolyte layer and the electrode layer are formed dividedly for each of the plurality of openings on the insulating and stress absorbing layer, the electrolyte layer is not broken by the stress originating from the difference in the thermal expansion coefficients between the Si substrate and the electrolyte layer.

Example 2

By use of a method similar to that in the above-described example 1, fabricated was a cell plate, on which the insulating and stress absorbing layer 2 was made of various materials. Moreover, in addition to this, also with regard to the electrolyte layer 3, cell plates of various patterns shown in FIG. 1A and FIGS. 5A to 5C were fabricated. These cell plates were placed in the electric furnace, and a heat treatment test at a temperature of 700° C. (temperature rising rate: 300° C./Hr) in the atmosphere was executed. Results obtained are shown in a table of FIG. 6.

Figure 5A:
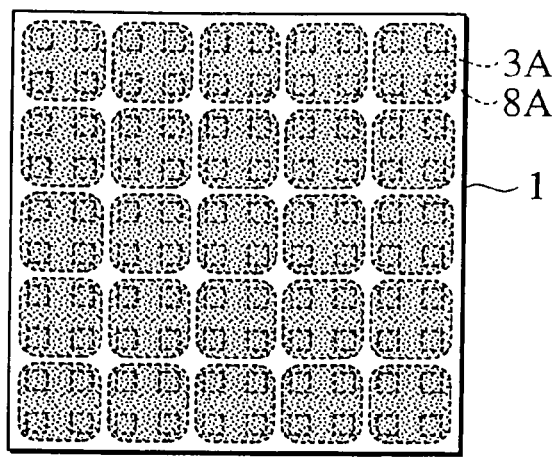
FIGS. 5A to 5C are plan views of cell plates of example 2, the cell plates having a variety of electrolyte layer patterns.
Figure 5B:
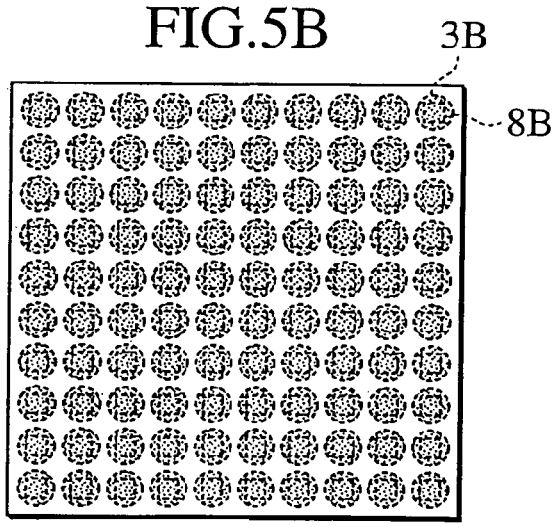
Figure 5C:
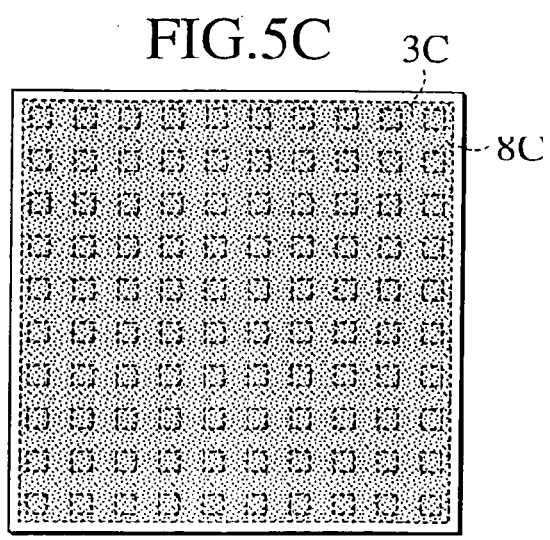

The pattern of FIG. 5A shows that the electrolyte layer pattern is separated for every four openings and corners of each separated pattern is chamfered. The pattern of FIG. 5B shows that an independent circular pattern is formed for every opening. The pattern of FIG. 5C shows that a continuous electrolyte layer pattern is formed on the entire surface of the cell plate.

Note that, ○ in the table of FIG. 6 denotes the one where breakage of the electrolyte layer was not observed by the visual or by optical microscope observation. X denotes the one where exfoliation or a crack was observed.

As shown in FIG. 6, in the case (comparative example 2-1) where there is no insulating and stress absorbing layer and one continuous electrolyte layer pattern is formed on the entire surface of the cell plate, a crack occurs in the electrolyte layer 3 after the heat treatment. However, the presence of the insulating and stress absorbing layer and the formation of the pattern on the electrolyte layer 3, which is capable of absorbing the stress, enable the crack and the exfoliation not to occur on the electrolyte layer against a radical temperature rise corresponding to the time of fuel cell starting. By use of the cell plates in examples 2-1 to 2-6, a highly reliable fuel cell quick in start/stop can be provided.

Example 3

Example 3 used a Si substrate of 10 cm square similar to that of example 1, and a cell plate manufactured in accordance with manufacturing steps shown in FIGS. 7A to 7H and FIGS. 8A to 8H. FIGS. 7A to 7H are partial sectional views of the cell plate in the respective manufacturing steps, and FIGS. 8A to 8H are partial plan views of the cell plate in the respective manufacturing steps.

Figure 7A:
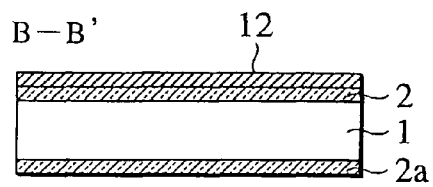
FIGS. 7A to 7H are sectional views of a cell of example 3 in the respective manufacturing steps.
Figure 8A:
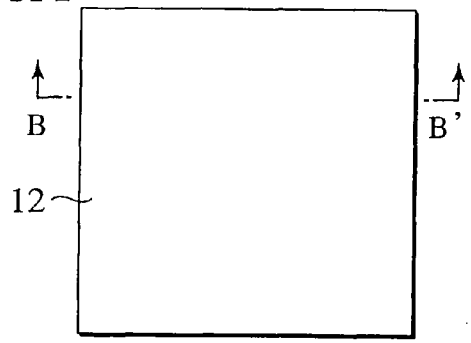
FIGS. 8A to 8H are plan views of the cell of example 3 in the respective manufacturing steps.

First, silicon nitride films as the insulating and stress absorbing layers 2 (2a) are deposited in thickness of 200 nm on the both surfaces of the Si substrate 1 by the low pressure CVD method, and a PSG layer as a reinforcement layer 12 is deposited in thickness of 100 nm on the upper surface of the substrate by a normal pressure CVD method (FIG. 7A and FIG. 8A).

Figure 7B:
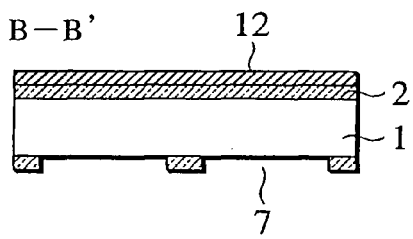
Figure 8B:
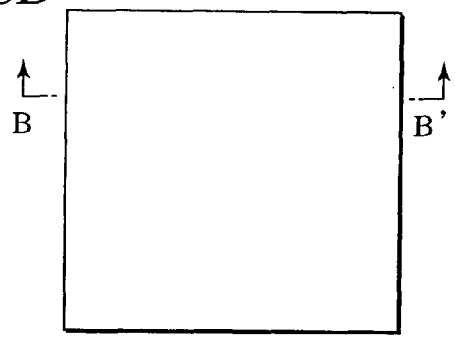

Similarly to example 1, a desired region of this silicon nitride film 2a on the lower surface of the substrate is removed by the photolithography and by the chemical dry etching using $CF_4$ gas, thus forming silicon exposure regions 7. The exposure regions 7 are formed in a pattern where 4 times 4 pieces of regions of 3 mm square are formed (FIG. 7B and FIG. 8B).

Figure 7C:
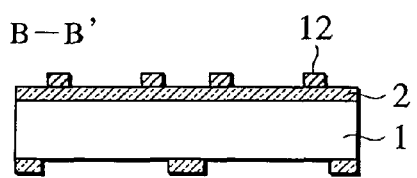
Figure 8C:
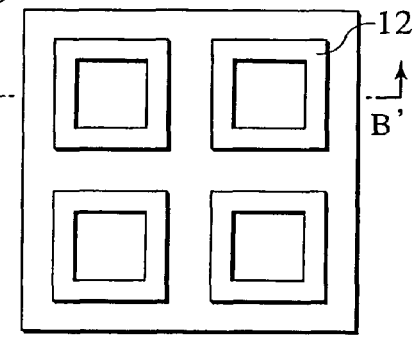

Resist is coated on the PSG layer (reinforcement layer) 12 on the upper surface of the substrate, and the resist is patterned in a desired pattern by the photolithography method. With this resist pattern taken as a mask, an unnecessary PSG layer 12 is etched in an HF solution, thus obtaining frame-shaped patterns (FIG. 7C and FIG. 8C).

Figure 7D:
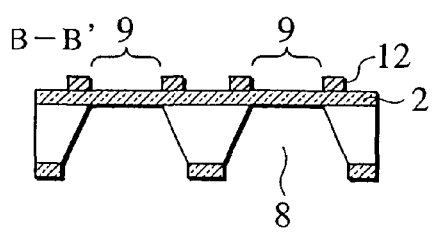
Figure 8D:
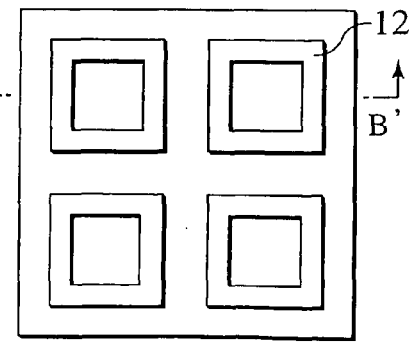

Next, the Si substrate 1 is etched at a temperature of about 80° C. by use of the silicon etching liquid, for example, hydrazine, thus forming the openings 8 on the Si substrate 1. On the openings 8, the silicon nitride film (insulating and stress absorbing layer) 2 remains, and thus diaphragms 9 made of the silicon nitride film are formed. Moreover, a structure having the frame-shaped patterns of the reinforcement layer 12 is formed on the peripheries of the openings 8 of the substrate (FIG. 7D and FIG. 8D).

Figure 7E:
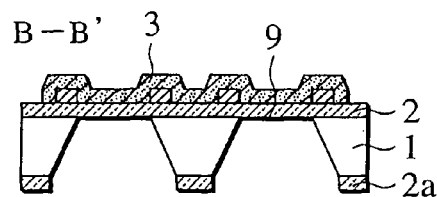
Figure 8E:
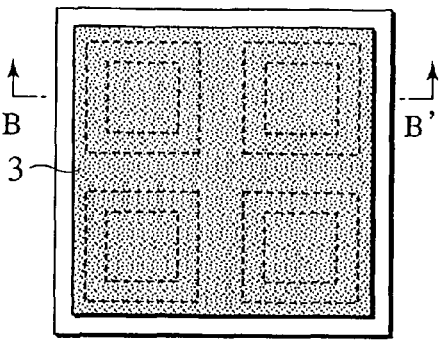

Furthermore, as shown in FIG. 7E, YSZ as the electrolyte layer 3 is deposited in thickness of about 2 μm on a region of 1.5 cm square by the RF sputtering method using an evaporation mask so as to cover the diaphragms 9 (FIG. 7E and FIG. 8E).

Figure 7F:
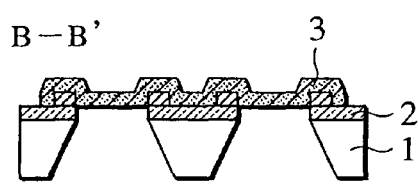
Figure 8F:
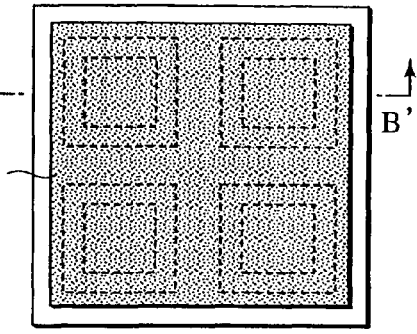

Again, etching is performed from the lower surface of the Si substrate by the chemical dry etching using $CF_4$ gas, and then the silicon nitride film diaphragms 9 contacting the lower surface of the electrolyte film 3 are removed, thus exposing the lower surface of the electrolyte layer 3. Moreover, the silicon nitride film 2a on the lower surface of the Si substrate 1 is also removed simultaneously (FIG. 7F and FIG. 8F).

Figure 7G:
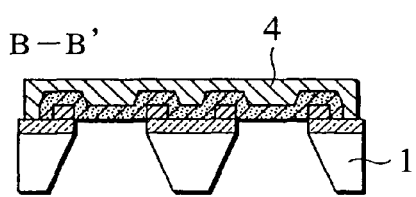
Figure 8G:
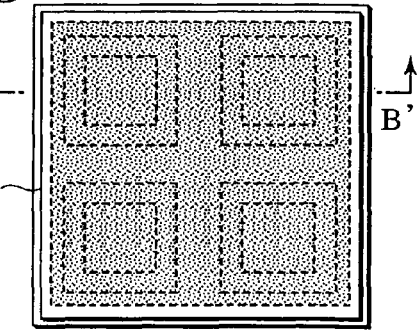

On the upper surface of the Si substrate, LSM is deposited in thickness of about 500 nm on a region of 1.8 cm square by the RF sputtering method using an evaporation mask so as to cover the region on which the electrolyte layer 3 is formed, thus forming the upper electrode layer 4 (FIG. 7G and FIG. 8G).

Figure 7H:
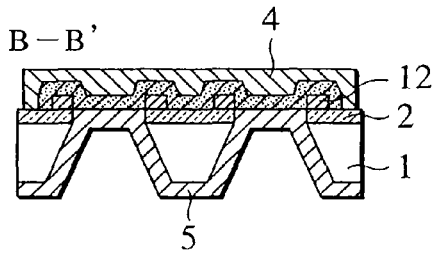
Figure 8H:
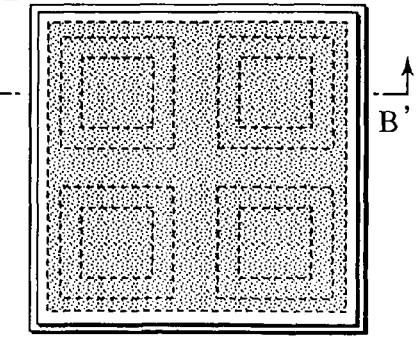

Next, on the lower surface of the Si substrate 1, a Ni film is deposited in thickness of about 500 nm by use of the EB evaporation method, thus forming the lower electrode layer 5 directly contacting the lower surface of the electrolyte layer 3 (FIG. 7H and FIG. 8H).

Similarly to example 1, the fuel cell was fabricated by sandwiching the cell plate fabricated by the above-described method with two separators, then the power generation characteristic thereof was evaluated. At a temperature of 700° C., an open-circuit voltage of 0.93 V and an output of 0.20 W/cm² were obtained. Moreover, though rises and falls of temperature from room temperature to 700° were repeated, lowering of the output was not recognized.

As described above, with the cell structure including the reinforcement layer 12, it is made possible to manufacture a fuel cell eliminating the occurrence of the breakage and the crack in the electrolyte layer 3 against the rises and falls of temperature corresponding to the time of fuel cell starting.

Example 4

Example 4 used a Si substrate similar to that of example 3. And in the structure shown in FIG. 7F and FIG. 8F, for the reinforcement layer 12, materials, forming methods and film thicknesses, shown in a table of FIG. 9, were used instead. Moreover, the reinforcement layer 12 was patterned by a two-source evaporation method or a sputtering method using a mask instead of using a photolithography process.

The heat treatment test was executed similarly to example 2, and the presence of the breakage and the crack in the electrolyte layer was evaluated. Results obtained are shown in the table of FIG. 9.

No breakage was founded in the all samples evaluated.

As described above, with the cell structure including the reinforcement layer, it is made possible to manufacture a highly reliable fuel cell eliminating the occurrence of the breakage and the crack in the electrolyte layer against the rises and falls of temperature corresponding to the time of fuel cell starting.

Example 5

Example 5 used a Si substrate of 10 cm square similar to that of example 1, a cell plate manufactured in accordance with manufacturing steps of FIGS. 10A to 10G and FIGS. 11A to 11G FIGS. 10A to 10G are partial sectional views of the cell plate in the respective manufacturing steps, and FIGS. 11A to 11G are partial plan views of the cell plate in the respective steps.

Figure 10A:
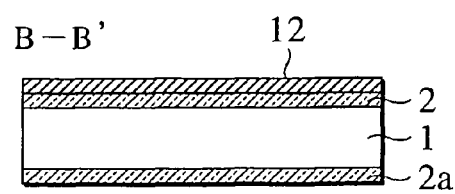
FIGS. 10A to 10G are sectional views of a cell of example 5 in the respective manufacturing steps.
Figure 11A:
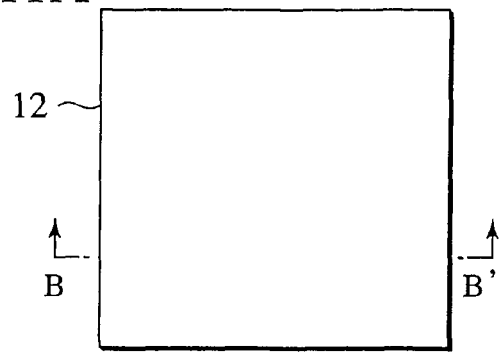
FIGS. 11A to 11G are plan views of the cell of example 5 in the respective manufacturing steps.

First, as shown in FIG. 10A, silicon nitride films as the insulating and stress absorbing layers 2 are deposited in thickness of 200 nm on the both surfaces of the Si substrate 1 by the low pressure CVD method, and a PSG layer as the reinforcement layer 12 is deposited in thickness of 100 nm on the upper surface of the substrate by the normal pressure CVD method. Moreover, as the reinforcement layer 12, a layer obtained by mixing Ni and YSZ is formed in thickness of 50 nm by a two-source sputtering method (FIG. 10A and FIG. 11A).

Figure 10B:
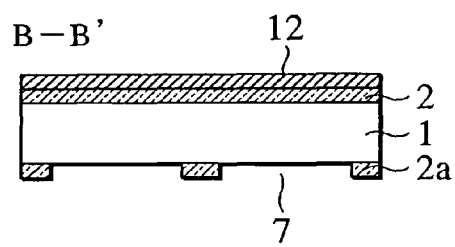
Figure 11B:
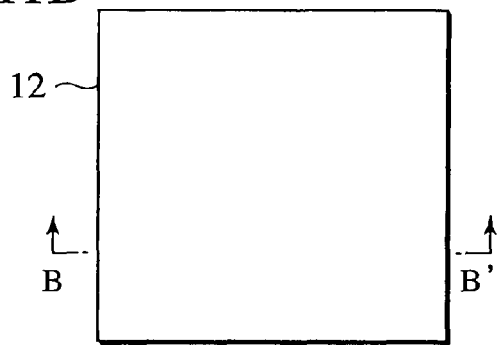

Similarly to example 1, a desired region of this silicon nitride film 2a on the lower surface of the substrate is removed by the photolithography and by the chemical dry etching using $CF_4$ gas, thus forming the silicon exposure regions 7. The silicon exposure regions 7 are formed in a pattern where 4 times 4 pieces of regions of 3 mm square are formed (FIG. 10B and FIG. 11B).

Figure 10C:
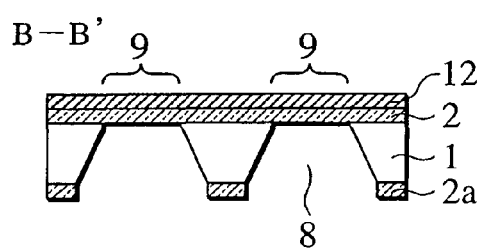
Figure 11C:
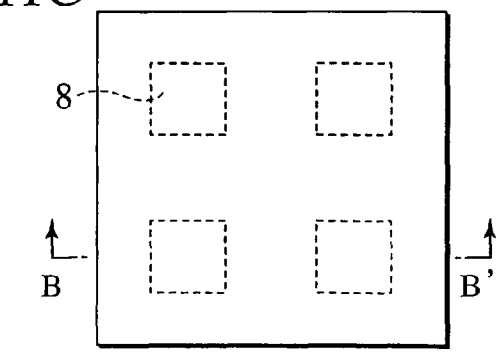

Next, anisotropic etching is performed for the Si substrate 1 at a temperature of about 80° C. by use of the silicon etching liquid, for example, hydrazine, thus forming the openings 8 in the Si substrate 1. In the openings 8, formed are diaphragms 9 consisting of the insulating and stress absorbing layer 2 and the reinforcement layer 12 (FIG. 10C and FIG. 11C).

Figure 10D:
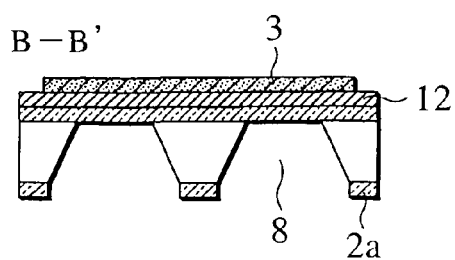
Figure 11D:
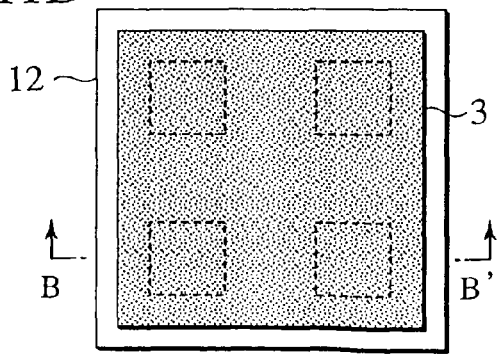

As the electrolyte layer 3, YSZ is formed in thickness of about 2 µm on a region of 1.5 cm square by the RF sputtering method using an evaporation mask so as to cover the diaphragms 9 (FIG. 10D and FIG. 11D).

Figure 10E:
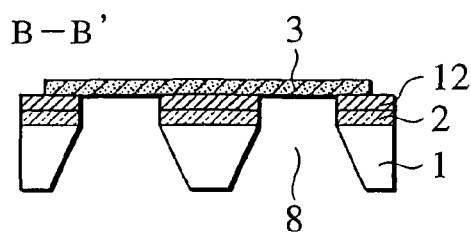
Figure 11E:
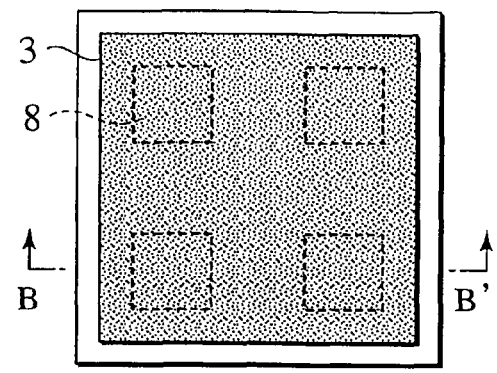

As shown in FIG. 10E and FIG. 11E, etching is again performed from the lower surface of the Si substrate by the chemical dry etching using $CF_4$ gas, and the silicon nitride film diaphragms 9 contacting the lower surface of the electrolyte layer 3 are removed, thus exposing the lower surface of the electrolyte layer 3. Simultaneously with this, the silicon nitride film 2a of the lower surface of the Si substrate 1 is also removed. Then, the exposed reinforcement layer 12 is also etched by the chemical dry using $CF_4+H_2$ gas (FIG. 10E and FIG. 11E).

Figure 10F:
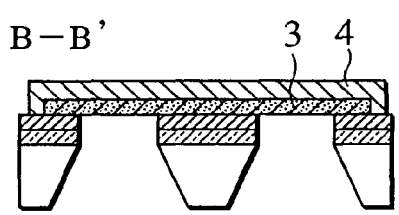
Figure 11F:
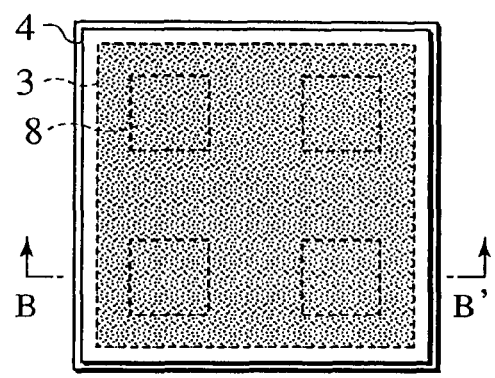

On the upper surface of the Si substrate, LSM is deposited in thickness of about 500 nm on a region of 1.8 cm square by the RF sputtering method using an evaporation mask so as to cover the electrolyte layer 3, thus forming the upper electrode layer 4 (FIG. 10F and FIG. 11F).

Figure 10G:
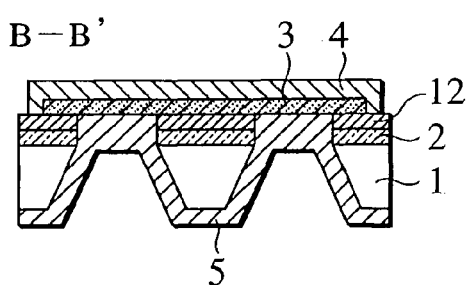
Figure 11G:
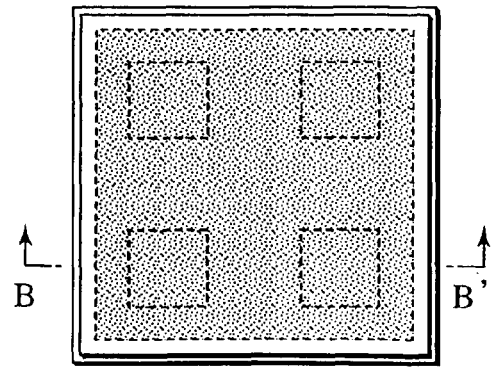

On the lower surface of the Si substrate 1, a Ni film is deposited in thickness of about 500 nm by use of the EB evaporation method, and thus the lower electrode layer 5 directly contacting the lower surface of the electrolyte layer 3 is formed (FIG. 10G and FIG. 11G).

Similarly to example 1, the fuel cell was fabricated by sandwiching the cell plate thus formed with two separators, then the power generation characteristic thereof was evaluated. At 700° C., an open-circuit voltage of 0.95 V and an output of 0.22 W/cm² were obtained. Moreover, though the rises and falls of temperature from room temperature to 700° C. were repeated, lowering of the output was not recognized.

As described above, with the cell structure including the reinforcement layer 12, it is made possible to manufacture a fuel cell eliminating the occurrence of the breakage and the crack in the electrolyte layer 3 against the rises and falls of temperature corresponding to the time of fuel cell starting.

Example 6

Figure 12C:
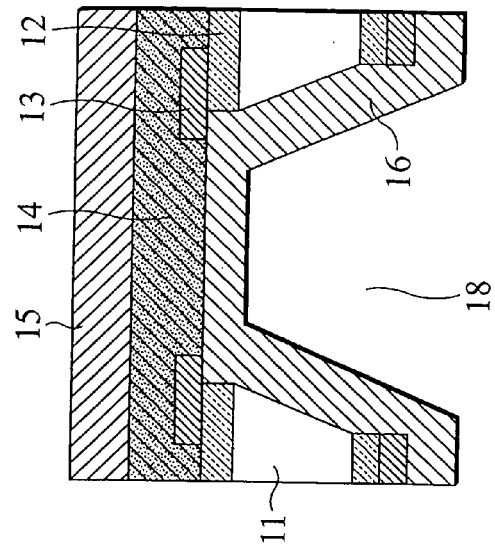
FIG. 12C is an enlarged sectional view thereof.
Figure 12A:
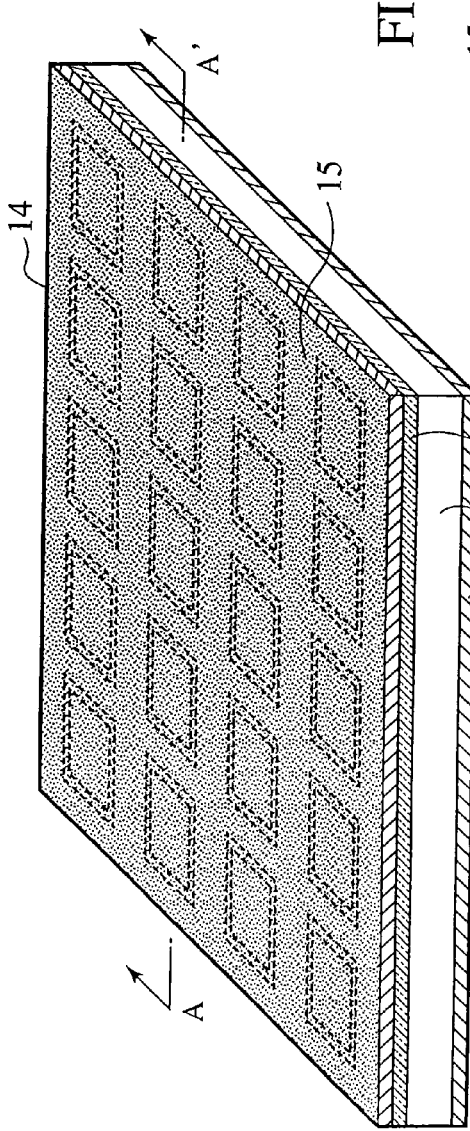
FIG. 12A is a perspective view of a cell plate of example 6.
Figure 12B:
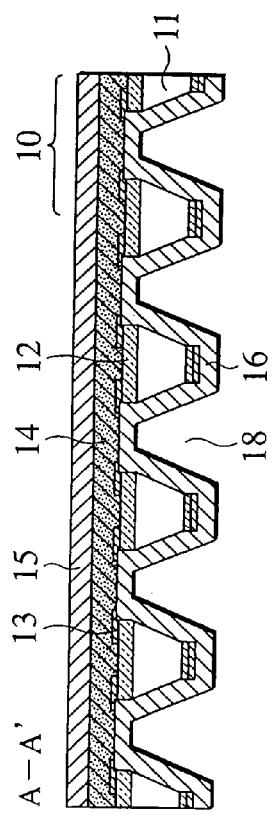
FIG. 12B is a sectional view thereof.

FIGS. 12A to 12C show a cell plate of example 6. FIG. 12A is a perspective view of the cell plate. FIG. 12B is a sectional view of the cell plate along a section line A-A' of FIG. 12A. FIG. 12C is an enlarged sectional view of a portion of a cell 10.

On a Si substrate 11 of 10 cm square, 5 times 4 pieces of the cells 10 having openings 18 of about 5 mm square are formed.

On one surface (an upper surface) of the Si substrate 11, a plurality of openings 18, an insulating and stress absorbing layer 12 are formed. Moreover, on the upper surface of the substrate on which the insulating and stress absorbing layer 12 is formed, an electrolyte layer 14 and an upper electrode layer 15 are layered. On the other surface (lower surface) of the substrate, a lower electrode layer 16 is coated, and on each of the openings 18, the lower electrode layer 16 is exposed to the upper surface of the substrate 11 and directly contacts the electrolyte layer 14. Moreover, between the electrolyte layer 14 and the lower electrode layer 16 on the peripheries of the openings 18, a reinforcement layer 13 is formed.

Hereinafter, description will be made for a manufacturing method of the cell of example 6 with reference to FIGS. 13A to 13H and FIGS. 14A to 14H. FIGS. 13A to 13H and FIGS. 14A to 14H are respectively partial sectional views and partial plan views of the cell plate in the respective steps.

Figure 13A:
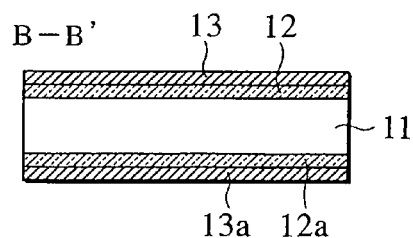
FIGS. 13A to 13H are sectional views of a cell of example 6 in the respective manufacturing steps.
Figure 14A:
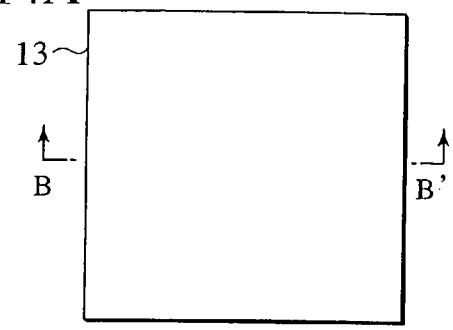
FIGS. 14A to 14H are plan views of the cell of example 6 in the respective manufacturing steps.

First, as shown in FIG. 13A, on the both surfaces of the Si substrate 11, as the insulating and stress absorbing layers 12, for example, silicon oxide films are formed in thickness of about 300 nm by subjecting the Si substrate 11 to a heat treatment in an oxidation atmosphere. Subsequently, on the insulating and stress absorbing layers 12 and 12a on the both surfaces of the Si substrate, as the reinforcement layers 13 and 13a, for example, silicon nitride films are deposited in thickness of about 200 nm by the low pressure CVD method (FIG. 13A and FIG. 14A).

Figure 13B:
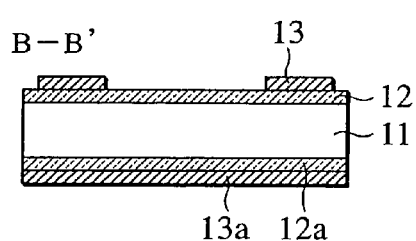
Figure 14B:
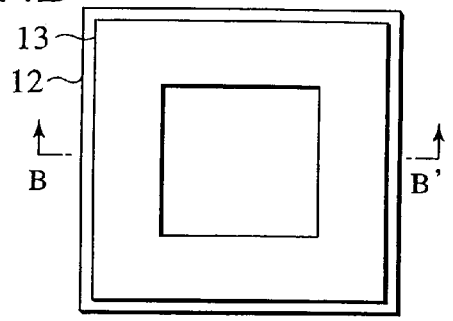

A specified region of the silicon nitride film (reinforcement layer) 13 on the upper surface is removed by the photolithography and chemical dry etching using $CF_4+O_2$ gas, thus forming frame-shaped patterns. Note that, simultaneously with this, a silicon nitride film on a portion not functioning as a reinforcement portion may be removed (FIG. 13B and FIG. 14B).

Figure 13C:
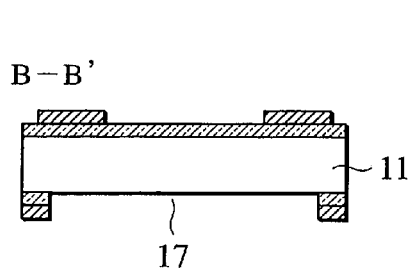
Figure 14C:
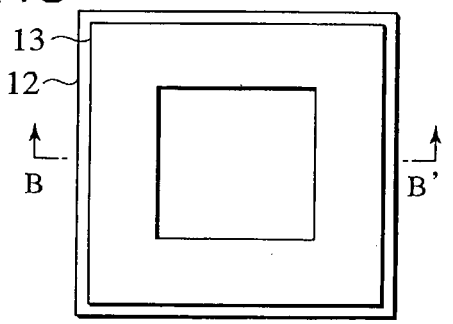

Specified regions of the silicon nitride film 13a and the silicon oxide film 12a on the lower surface of the Si substrate 11 are removed by the photolithography and chemical dry etching using $CF_4+O_2$ gas and $CH_4+H_2$ gas, thus forming a silicon exposure region 17 (FIG. 13C and FIG. 14C).

Figure 13D:
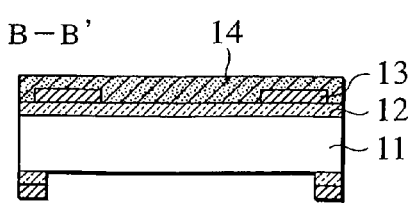
Figure 14D:
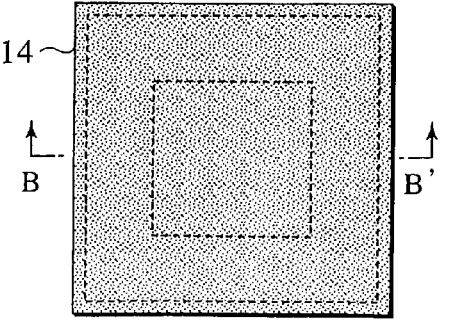

On the silicon nitride film (reinforcement layer) 13 and the insulating and stress absorbing layer 12, which are patterned, the electrolyte layer 14, for example, such as YSZ is formed in thickness of about 2 μm by the RF sputtering method using an evaporation mask (FIG. 13D and FIG. 14D).

Figure 13E:
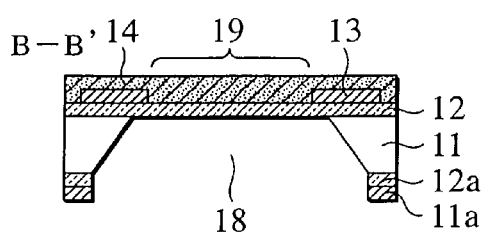
Figure 14E:
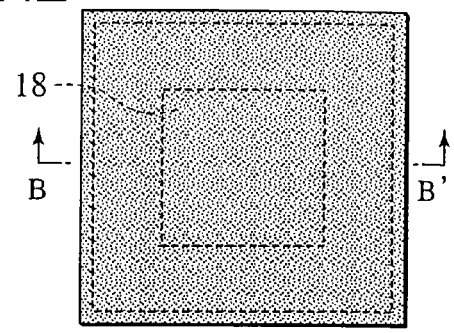

As shown in FIG. 13E and FIG. 14E, the Si substrate 11 is etched at a temperature of about 80° C. by use of the silicon etching liquid, for example, hydrazine, thus forming the opening 18 in the Si substrate 11. Thus, on the upper surface of the Si substrate 11, formed is a diaphragm 19 of the silicon oxide film (insulating and stress absorbing layer) 12 and the electrolyte layer 14, in which a peripheral portion of the opening 18 is reinforced by the silicon nitride film (reinforcement layer) 13 (FIG. 13E and FIG. 14E).

Figure 13F:
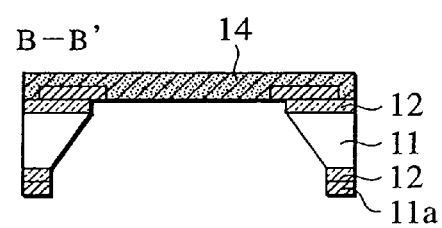
Figure 14F:
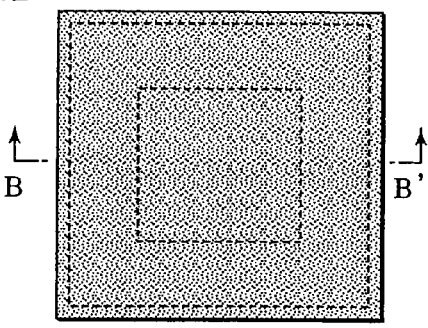

Again, etching is performed from the lower surface side of the Si substrate 11 by chemical dry etching using $CF_4+H_2$ gas, and the exposed silicon oxide film 12 is removed, thus exposing the lower surface of the electrolyte layer 14 (FIG. 13F and FIG. 14F).

Figure 13G:
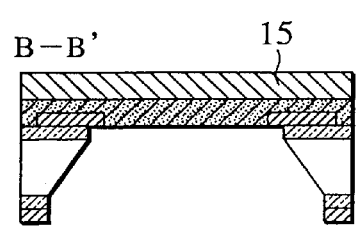
Figure 14G:
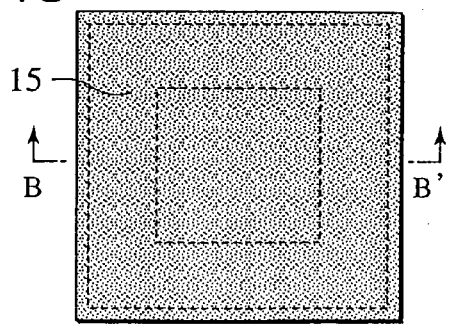

On the upper surface of the Si substrate 11, for example, LSM is deposited in thickness of about 500 nm by the RF sputtering method using an evaporation mask so as to cover the electrolyte layer 14, thus forming the upper electrode layer 15 (FIG. 13G and FIG. 14G).

Figure 13H:
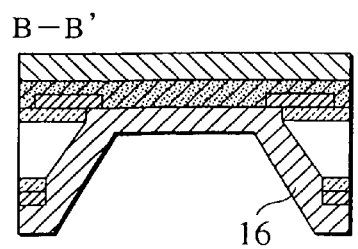
Figure 14H:
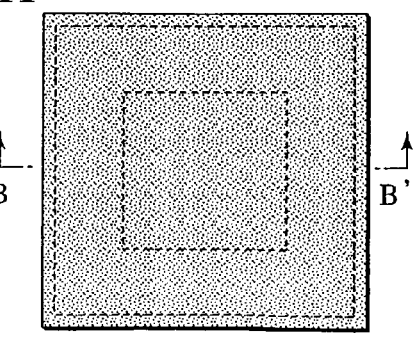

Next, on the lower surface of the Si substrate 11, a Ni film is coated in thickness of about 500 nm by use of the EB evaporation method, and thus the lower electrode layer 16 directly contacting the electrolyte layer 14 is formed (FIG. 13H and FIG. 14H).

The cell plate (Si substrate) fabricated by the above method, in which fabricated cells are formed, was sandwiched by the two separators shown in FIG. 4B, thus forming a fuel cell stack. As a result of evaluation for the power generation characteristic of the obtained fuel cell stack, which was performed similarly to example 1, an open-circuit voltage was 0.95 V, and a maximum output was 0.2 W/cm².

As described above, in example 6, the reinforcement layer 13 is formed between the electrolyte layer 14 and the lower electrode layer 16 so as to reinforce the peripheral portion of the opening 18. In the cell of a diaphragm structure, this peripheral portion of the opening 18 is a spot where the stress is concentrated to readily cause the breakage. Hence, by reinforcing the spot, a cell structure including the thin electrolyte layer 14 having a thickness of several μm can be realized. Moreover, also against the temperature change caused at the time of start/stop of the fuel cell, it is made possible to provide a highly reliable cell plate eliminating the exfoliation or the breakage of the electrolyte layer 14 due to the heat stress originating from the difference in the thermal expansion coefficients between the Si substrate 11 and the electrolyte layer 14.

Thus, a fuel cell capable of quick start/stop operations can be provided. In order to suppress the temperature change, for control of flow amounts and passages of fuel gas, air and exhaust, a fuel gas component and a humidification degree of the fuel gas, extremely high control accuracy has been required. However, control systems for these can be simplified.

Moreover, since the electrolyte layer 14 can be formed on the compact Si substrate 11 excellent in smoothness, a thin and compact electrolyte layer 14 can be obtained.

Furthermore, since the reinforcement layer 13 is formed between the electrolyte layer 14 and the lower electrode layer 15, it is made possible to reinforce the electrolyte layer 14 from an initial stage of the manufacturing process thereof. Accordingly, reduced are various loads acting on the cell portion in a step where a large stress is applied to the thin film such as a chemical treatment and a cleaning treatment on the way of manufacturing, thus realizing a structure very suitable for mass production. Furthermore, occurrence of fine defects caused by the stress in the manufacturing steps can be suppressed, and the reliability is further improved.

In example 6, as the reinforcement layer 13, the silicon nitride film is used, but not being limited to this, any material capable of physically reinforcing the electrolyte layer 14 may be used. For example, phosphosilicate glass (PSG), borophosphosilicate glass, alumina, titania, zirconia, or MgO is mentioned. Also glass containing at least one type of metal dispersed therein, the metal being selected from Si, Ti, Cr, Fe, Co, Ni, Zr, Mo, W and Ta; metal containing as a main component, at least one type of metal element selected from Ti, Cr, Fe, Co, Ni, Zr, Mo, W and Ta ; and any of stabilized zirconia and $CeO_2$ based solid solution containing at least one type of metal dispersed therein, the metal being selected from Si, Ti, Cr, Fe, Co, Ni, Zr, Mo, W and Ta are mentioned.

If the reinforcement layer 13 is made of the glass containing metal dispersed therein or the metal, the glass and the metal function also as the lower electrode layer 16. Thus, it is made possible to reinforce the cell without lowering an effective area of the electrolyte layer 14 due to the addition of the reinforcement layer 13.

Moreover, if the reinforcement layer 13 is made of the stabilized zirconia or the $CeO_2$ based solid solution, both of which containing metal dispersed therein, these function as an intermediate layer between the electrolyte layer 14 and the lower electrode layer 16. Thus, it is made possible to reinforce the cell without lowering the effective area of the electrolyte layer 14 due to the addition of the reinforcement layer 13.

Moreover, materials of the electrolyte layer 14 and the upper and lower electrode layers are not limited to the materials enumerated in the foregoing examples.

Example 7

The manufacturing method of the cell of example 7 is shown in FIGS. 15A to 15H and FIGS. 16A to 16H. FIGS. 15A to 15H and FIGS. 16A to 16H are partial sectional and plan views of the cell plate in respective manufacturing steps. The cell place of example 7 is different from the cell structure of example 6 in that a reinforcement layer is installed in a beam shape on the opening of the Si substrate.

Hereinbelow, the manufacturing process is described.

Figure 15A:
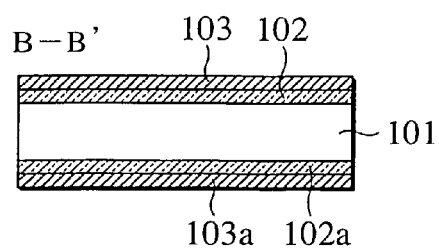
FIGS. 15A to 15H are sectional views of a cell of example 7 in the respective manufacturing steps.
Figure 16A:
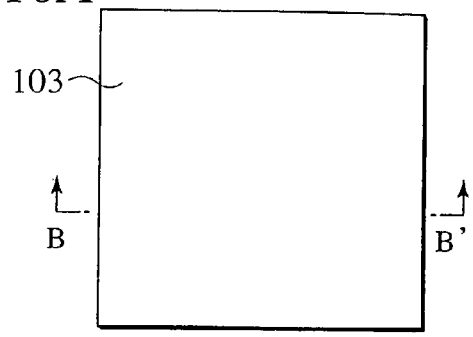
FIGS. 16A to 16H are plan views of the cell of example 7 in the respective manufacturing steps.

As shown in FIG. 15A, on both surfaces of the Si substrate, insulating and stress absorbing layers 102, for example, silicon oxide films are formed, each in a thickness of about 300 nm, by subjecting the Si substrate to heat treatment in oxidation atmosphere. Then, as a reinforcement layer 103, for example, a silicon nitride film is formed in a thickness of about 200 nm by a low pressure CVD method (FIGS. 15A and 16A).

Figure 15B:
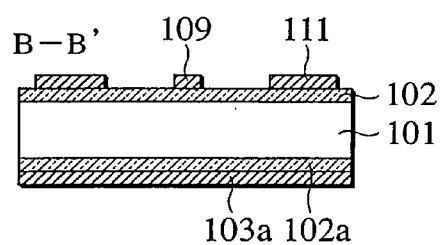
Figure 16B:
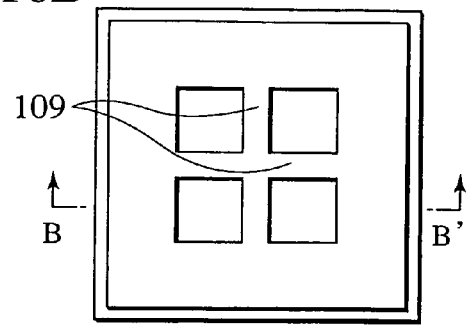

Subsequently, a desired region of the silicon nitride film (reinforcement layer) 103 on the surface is removed by photolithography and chemical dry etching using $CF_4+O_2$ gas to form an opening. This opening becomes a portion to function as a cell later. In this case, a beam-shaped reinforcement pattern 109 is left in the opening of the reinforcement layer 103. For example, as shown in FIG. 16B, a pattern is formed to divide the opening of the Si substrate, which is formed in a later step, into four regions. The number of divided regions may be 2 or more. In addition, in this case, the silicon nitride film of a portion not functioning as a reinforcement portion may be removed simultaneously (FIGS. 15B and 16B).

Figure 15C:
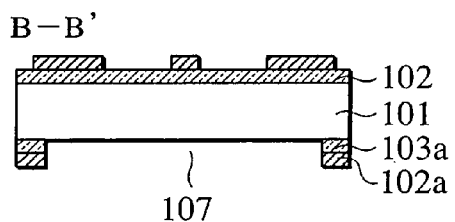
Figure 16C:
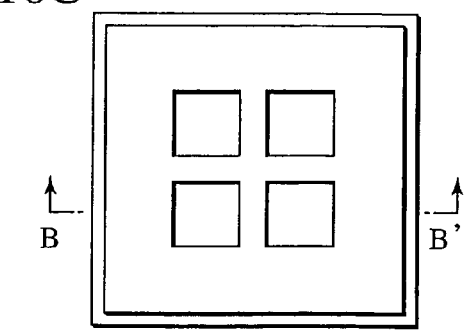

Specified regions of the silicon nitride film 103a and the silicon oxide film 102a on the lower surface of the Si substrate 101 are removed by photolithography and chemical dry etching using $CF_4+O_2$ and $CH_4+H_2$ gases, thus forming a silicon exposure region 107 (FIGS. 15C and 16C).

Figure 15D:
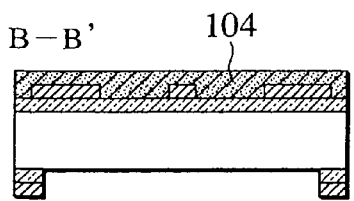
Figure 16D:
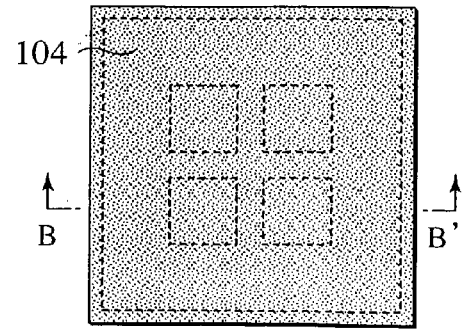

Then, an electrolyte layer 104, for example, YSZ, is formed in a thickness of about 2 μm by an RF sputtering method using an evaporation mask (FIGS. 15D and 16D).

Figure 15E:
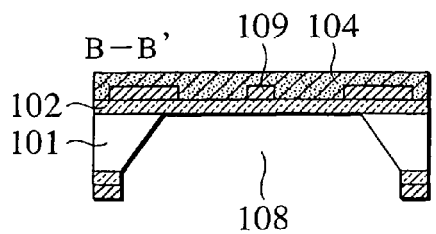
Figure 16E:
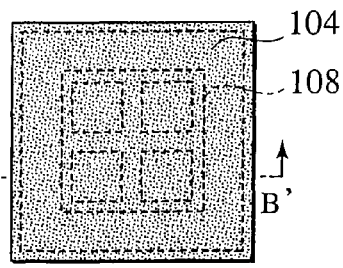

As shown in FIG. 16E, the Si substrate 101 is etched at a temperature of about 80?C. using silicon etching liquid, for example, hydrazine, thus forming an opening 108 on the Si substrate 101. Thus, on the surface of the Si substrate, formed is a diaphragm structure composed of the silicon oxide film 102 and the electrolyte layer 104, which are reinforced by a reinforcement pattern 109 having frame and beam portions formed of the silicon nitride film 103 (FIGS. 15E and 16E).

Figure 15F:
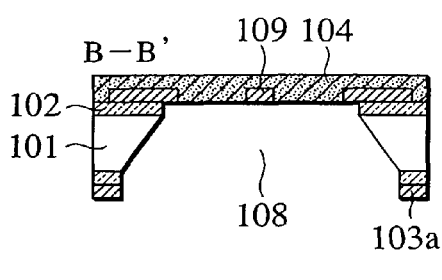
Figure 16F:
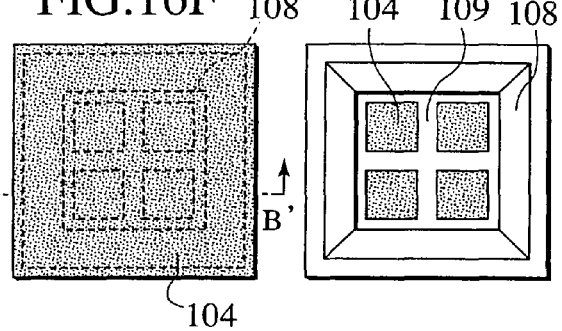

By chemical dry etching using $CF_4+H_2$ gas again, the silicon oxide film 102 is etched from the lower side of the Si substrate, thus exposing the lower surface of the electrolyte layer to the opening 108. Thus, a diaphragm is formed of the electrolyte layer 104 reinforced by the reinforcement pattern 109 (FIGS. 15F and 16F). FIG. 16FB is a bottom view for reference when the cell is seen from the bottom side. An edge of the frame-shaped pattern of the reinforcement layer protrudes to an inner side than an edge of the opening 108.

Figure 15G:
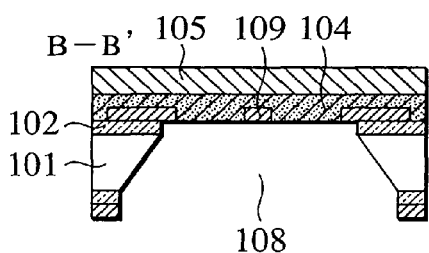
Figure 16G:
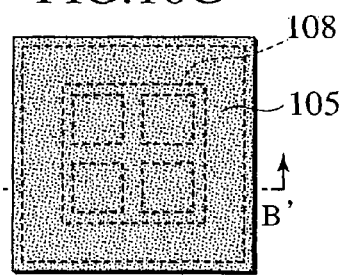

Then, LSM is deposited in a thickness of about 500 nm on the surface of the Si substrate to cover the electrolyte layer 104 by an RF sputtering method, using an evaporation mask, thus forming an upper electrode layer 105 (FIGS. 15G and 16G).

Figure 15H:
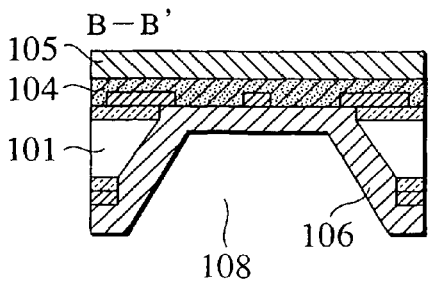
Figure 16H:
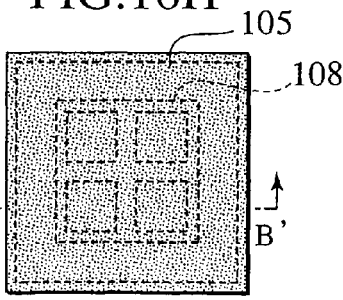

Then, an Ni film is deposited in a thickness of about 500 nm from the lower surface of the Si substrate 101 by use of an EB evaporation method, thus forming a lower electrode layer 106 to be brought into direct contact with the electrolyte layer 104 (FIGS. 15H and 16H).

In example 7, the reinforcement pattern 109 partitioning the opening 108 of the Si substrate into four is formed under the cell of the diaphragm structure. Thus, the structure of supporting the cell from the bottom by the beam-shaped reinforcement portion is provided, enabling a stronger reinforcement to be achieved. Therefore, the cell of a larger area can be formed.

In this example, the cross type reinforcement pattern is formed, and the opening 108 is divided into the four rectangular regions. However, a reinforcement pattern can be formed on the diagonal line of the opening 108. In addition, when the cell is enlarged, it is advantageous to insert beams in a lattice shape, and miniaturize each of the openings. The specific example of the frame-shaped and/or beam-shaped reinforcement pattern 109 formed in the opening 108 is shown in each of bottom views of FIGS. 26 to 29.

Example 8

The manufacturing method of the cell of example 8 is shown in FIGS. 17A to 17G and FIGS. 18A to 18G. FIGS. 17A to 17G and FIGS. 18A to 18G are partial sectional and plan views of the cell plate in respective manufacturing steps.

The cell of example 8 has a feature in that an insulating and stress absorbing layer functions also as a reinforcement layer. Hereinbelow, the manufacturing process is described.

First, as shown in FIG. 17A, insulating and stress absorbing/reinforcement layers 202, for example, silicon nitride films are deposited, each in a thickness of about 200 nm, on both surfaces of the Si substrate 201 by a low pressure CVD method (FIGS. 17A and 18A).

A specified region of the silicon nitride film (insulating and stress absorbing/reinforcement layer) 202 on the surface is removed by photolithography and chemical etching using $CF_4+O_2$ gas, thus forming an opening and a reinforcement pattern 209(202). This opening becomes a portion to function as a cell later (FIGS. 17B and 18B).

Then, a specified region of the silicon nitride film 202a on the lower surface of the Si substrate is removed by photolithography and chemical dry etching using $CF_4+O_2$ gas, thus forming a silicon exposure region 207 (FIGS. 17C and 18C).

An electrolyte layer 204 made of, for example, YSZ, is formed in a of about 2 μm by an RF sputtering method, using an evaporation mask (FIGS. 17D and 18D).

Silicon etching is performed at a temperature of about 80?C by using silicon etching liquid, for example, hydrazine, thus forming an opening 208 on the Si substrate 201. Thus, on the surface of the Si substrate 201, formed is a diaphragm structure composed of an electrolyte layer 204 reinforced by the reinforcement pattern 209 having the frame and beam portions formed of the silicon nitride film 202 (FIGS. 17E and 18E). FIG. 18EB is a bottom view for reference when the cell is seen from the bottom side.

Then, LSM is deposited in a thickness of about 500 nm on the surface of the electrolyte layer 204 by an RF sputtering method, using an evaporation mask, thus forming an upper electrode layer 205 (FIGS. 17F and 18F).

An Ni film is deposited in a thickness of about 500 nm from the lower surface of the Si substrate by using an EB evaporation method, thus forming a lower electrode layer 206 to be brought into direct contact with the lower surface of the electrolyte layer 204 (FIGS. 17G and 18G).

In example 8, the insulating and stress absorbing layer functions also as a reinforcement layer. Accordingly, without adding the step of forming a reinforcement layer, a reinforcement structure can be formed only by changing the pattern 209 of the insulating and stress absorbing layer.

Moreover, in example 8, the silicon nitride film is used for the insulating and stress absorbing/reinforcement layer. However, any materials can be used as long as they are insulators, and capable of physically reinforcing the electrolyte layer. For example, one can be selected from phosphosilicate glass (PSG), borophosphosilicate glass, alumina, titania, zirconia and MgO.

Example 9

The manufacturing method of the cell of example 9 is shown in FIGS. 19A to 19H and FIGS. 20A to 20H.

The cell of example 9 has a feature in that a reinforcement layer is formed between an electrolyte layer and an upper electrode layer. Hereinbelow, the manufacturing method of the cell of example 9 is described.

First, as shown in FIG. 19A, on both surfaces of the Si substrate 301, insulating and stress absorbing layers 302, for example, silicon oxide films are formed, each in a thickness of about 300 nm by subjecting the Si substrate to heat treatment in oxidation atmosphere (FIGS. 19A and 20A).

Then, an electrolyte layer 304 made of, for example, YSZ is formed in a thickness of about 2 μm by an RF sputtering method, using an evaporation mask. Subsequently, as a reinforcement layer 303, for example, a silicon nitride film is deposited in a thickness of about 200 nm by a low pressure CVD method (FIGS. 19B and 20B).

A specified region of the silicon nitride film (reinforcement layer) 303 is removed by a photolithography and chemical dry etching using $CF_4+O_2$ gas, thus forming an opening and a reinforcement pattern 309. This opening becomes a portion to function as a cell later. In this case, a portion of the silicon nitride film not functioning as a reinforcement portion may be removed simultaneously (FIGS. 19C and 20C).

Specified regions of the silicon oxide film 302a and the silicon nitride film 303a on the lower surface of the silicon substrate are removed by photolithography and chemical dry etching using $CF_4+O_2$ and $CH_4+H_2$ gases, thus forming a silicon exposure region 307 (FIGS. 19D and 20D).

Figure 19E:
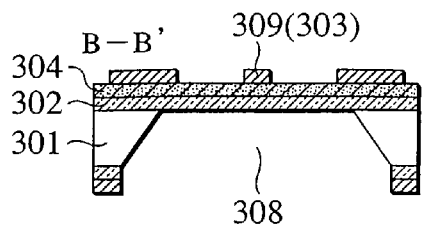
Figure 20E:
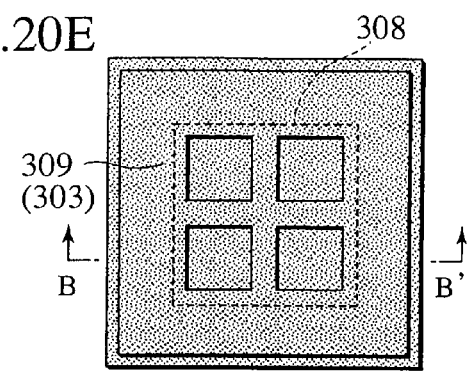

Then, as shown in FIG. 19E, the Si substrate 301 is etched at a temperature of about 80?C., by using silicon etching liquid, for example, hydrazine, thus forming an opening 308 on the Si substrate 301. Thus, on the surface of the Si substrate, formed is a diaphragm composed of a silicon oxide film (insulating and stress absorbing layer) 302 and an electrolyte layer 304, which are reinforced by the reinforcement pattern 309 having the frame and beam portions formed of the silicon nitride film (reinforcement layer 303 (FIGS. 19E and 20E).

Figure 19F:
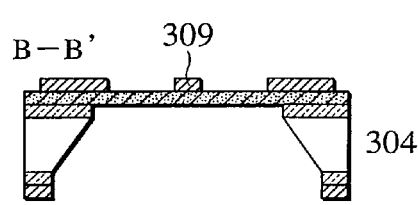
Figure 20F:
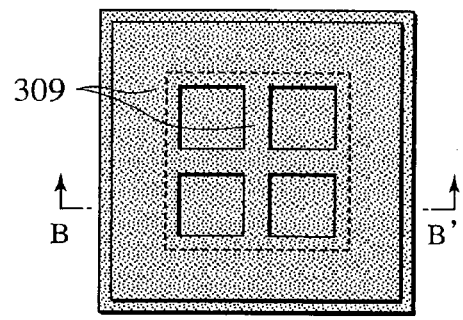

Etching is performed again from the lower surface of the Si substrate by chemical dry etching using $CF_4+H_2$ gas, and the silicon oxide film (insulating and stress absorbing layer) 302 in contact with the lower surface of the electrolyte layer 304 is removed to expose the lower surface of the electrolyte layer 304. Thus, a diaphragm is formed, which is composed of the electrolyte layer 304 reinforced by the reinforcement pattern 309 (FIGS. 19F and 20F).

Figure 19G:
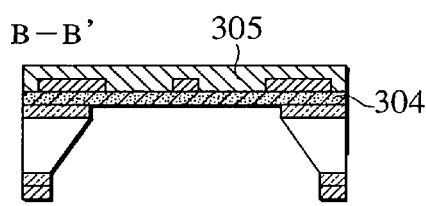
Figure 20G:
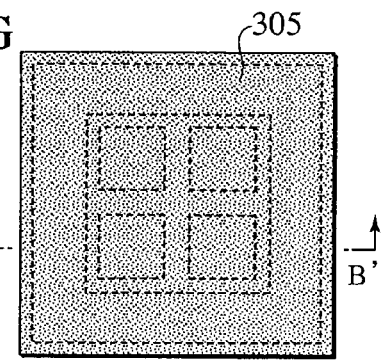

LSM is deposited in a thickness of about 500 nm on the surface of the Si substrate by an RF sputtering method, using an evaporation mask, so as to cover the electrolyte layer 304 and the reinforcement pattern 309, thus forming an upper electrode layer 305 (FIGS. 19G and 20G).

Figure 19H:
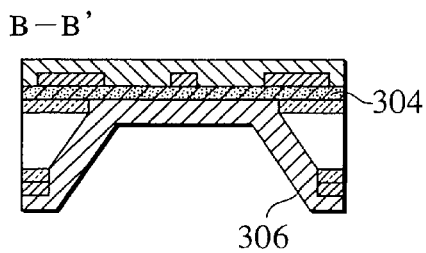
Figure 20H:
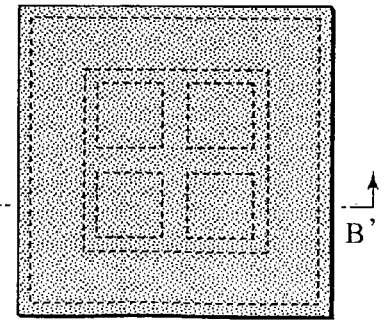

Then, an Ni film is deposited in a thickness of about 500 nm from the lower surface of the Si substrate by use of an EB evaporation method, thus forming a lower electrode layer 306 to be brought into direct contact with the lower surface of the electrolyte layer 304 (FIGS. 19H and 20H).

In example 9, the reinforcement layer 309(303) is formed between the electrolyte layer 304 and the upper electrode layer 305. Normally, a sputtering method or a CVD method is used for forming an electrolyte thin film. However, in such a method, if a stepped portion is present in the substrate, it is difficult to uniformly form an electrolyte layer in the side surface of the stepped portion similarly to the plane, and cracks easily occur in the film of the base of the stepped portion because of stress concentration or the like. Consequently, problems occur, including a reduction in reliability of the electrolyte layer, a reduction in performance caused by the thickening of the electrolyte layer for securing reliability, and so on.

In example 9, since the reinforcement layer 303(309) is formed between the electrolyte layer 304 and the upper electrode layer 305, the electrolyte layer 304 can be formed on the flat portion, and the highly reliable electrolyte layer 304 without any bending of the stepped portion can be achieved. Further, the electrolyte layer 304 can be reinforced from a relatively early time in the manufacturing process, making it possible to reduce various stresses applied onto the cell portion in the manufacturing step of chemical or washing treatment.

Moreover, in example 9, the silicon nitride film is used for the reinforcement film 303(309). However, the material of the reinforcement layer is not limited to such, and any materials can be used as long as they can physically reinforce the electrolyte layer. For example, mentioned are phosphosilicate glass (PSG), borophosphosilicate glass, alumina, titania, zirconia and MgO. Also glass containing at least one type of metal dispersed therein, the metal being selected from Si, Ti, Cr, Fe, Co, Ni, Zr, Mo, W and Ta; metal containing, as a main component, at least one type of metal element selected from Ti, Cr, Fe, Co, Ni, Zr, Mo, W and Ta; and any of stabilized zirconia and $CeO_2$ based solid solution containing at least one type of metal dispersed therein, the metal being selected from Si, Ti, Cr, Fe, Co, Ni, Zr, Mo, W and Ta are mentioned.

In this case, when glass having metal dispersed, or metal is used for the reinforcement layer 303, since the reinforcement layer 303 functions as an upper electrode layer 305, the cell can be reinforced without any reductions in the effective area of the electrolyte layer 304 caused by the addition of the reinforcement layer 303. In addition, when the stabilized zirconia or $CeO_2$ based solution having metal dispersed is used, since the reinforcement layer functions as an intermediate layer between the electrolyte layer 304 and the upper electrode layer 305, the cell can be reinforced without any reductions in the effective area of the electrolyte layer 304 caused by the addition of the reinforcement layer.

Example 10

The manufacturing method of the cell of example 10 is shown in FIGS. 21A to 21G and FIGS. 22A to 22G.

The cell of example 10 has a feature in that a reinforcement layer is formed on the upper electrode layer. Hereinbelow, the manufacturing method is described.

Figure 21A:
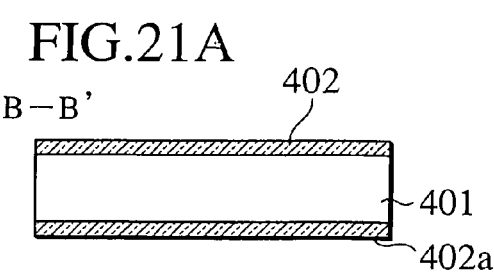
FIGS. 21A to 21G are sectional views of a cell of example 10 in the respective manufacturing steps.
Figure 22A:
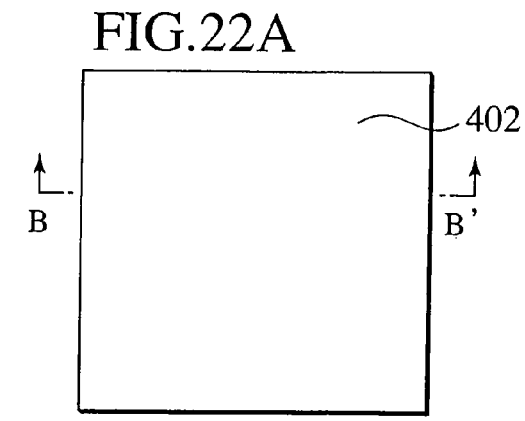
FIGS. 22A to 22G are plan views of the cell of example 10 in the respective manufacturing steps.

On both surfaces of the Si substrate 401, as insulation stress absorbing layers 402, for example, silicon nitride films are deposited, each in a thickness of 200 nm, by a low pressure CVD method (FIGS. 21A and 22A).

Figure 21B:
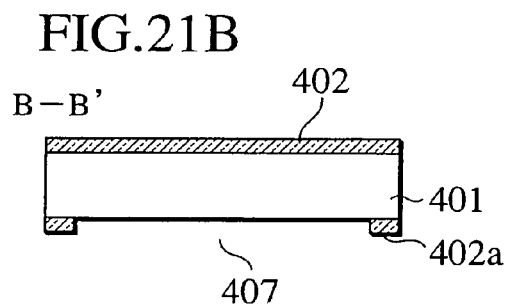
Figure 22B:
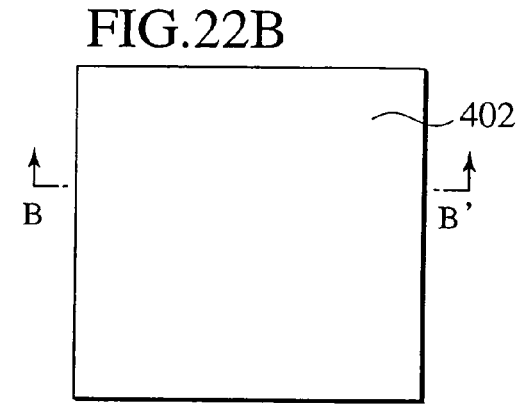

Then, a desired region of the silicon nitride film 402a on the lower surface of the Si substrate 401 is removed by photolithography and chemical dry etching using $CF_4+O_2$ gas, thus forming a silicon exposure region 407 (FIGS. 21B and 22B).

Figure 21C:
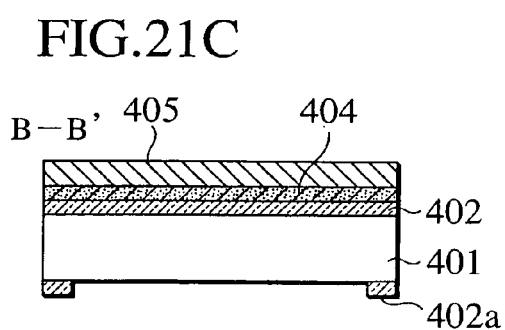
Figure 22C:
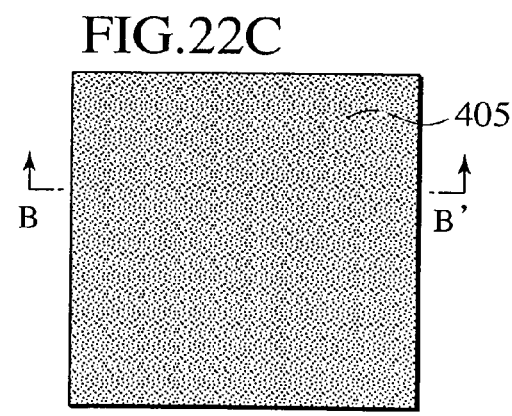

On the insulating and stress absorbing layer 402 on the surface side of the Si substrate 401, an electrolyte layer 404 made of, for example, YSZ is formed in a thickness of about 2 μm by an RF sputtering method, using an evaporation mask. Further, on the electrolyte layer 404, LSM is deposited in a thickness of about 500 nm as an upper electrode layer 405 by an RF sputtering method (FIGS. 21C and 22C).

Figure 21D:
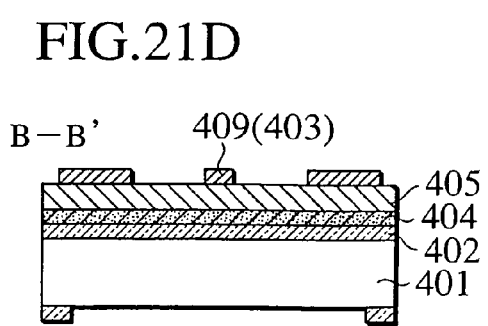
Figure 22D:
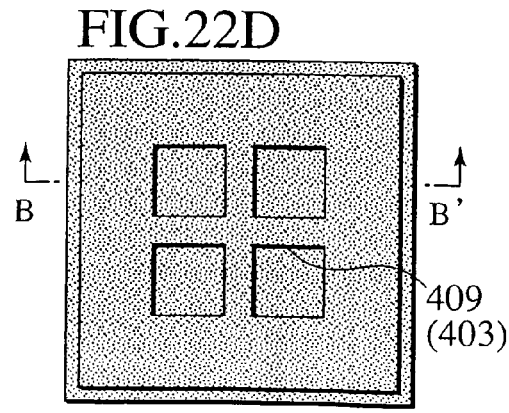

On the upper electrode layer 405, for example, a silicon nitride film is deposited in a thickness of about 1 μm as a reinforcement layer 403 by a plasma CVD method. Subsequently, the silicon nitride film (reinforcement layer) 403 is subjected to photolithography and chemical dry etching using $CF_4+O_2$ gas, thus forming an opening and a reinforcement pattern 409 having frame and beam portions. This opening later becomes a portion to function as a cell. In this case, the silicon nitride film of a portion not functioning as a reinforcement portion may simultaneously be removed (FIGS. 21D and 22D).

Figure 21E:
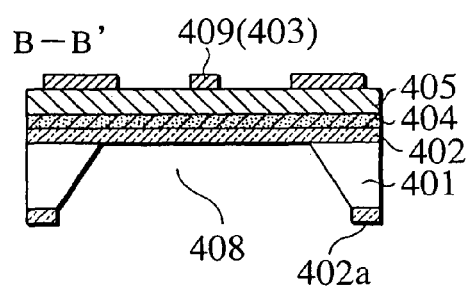
Figure 22E:
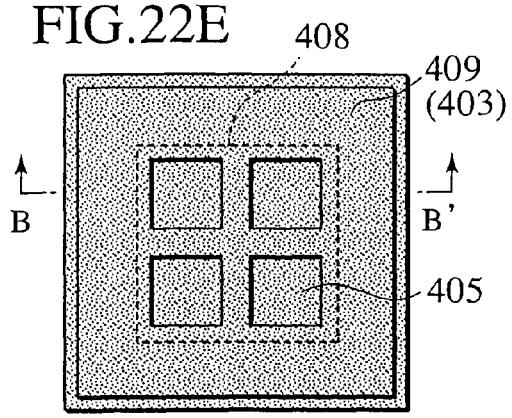

Then, the Si substrate 401 is etched at a temperature of about 80?C. by using silicon etching liquid, for example, hydrazine, thus forming an opening 408 in the Si substrate 401. Thus, the opening 408, formed is a diaphragm composed of the insulating and stress absorbing layer 402, the electrolyte layer 404 and the upper electrode layer 405, which are reinforced by the reinforcement pattern 409 (403) (FIGS. 21E and 22E).

Figure 21F:
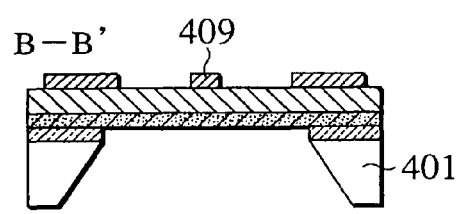
Figure 22F:
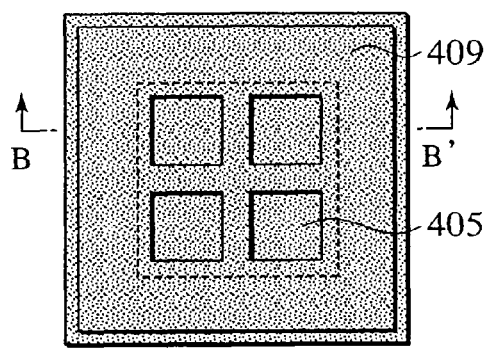

Etching is performed again by chemical dry etching using $CF_4+O_2$ gas, and the silicon nitride film (insulating and stress absorbing layer) 402a exposed in the opening is removed, thus exposing the lower surface of the electrolyte layer 404 (FIGS. 21F and 22F).

Figure 21G:
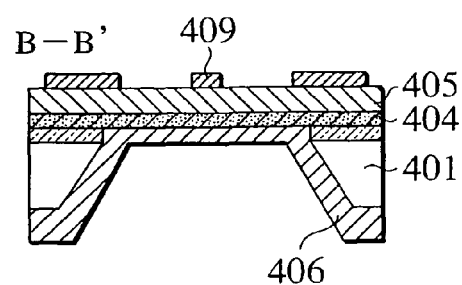
Figure 22G:
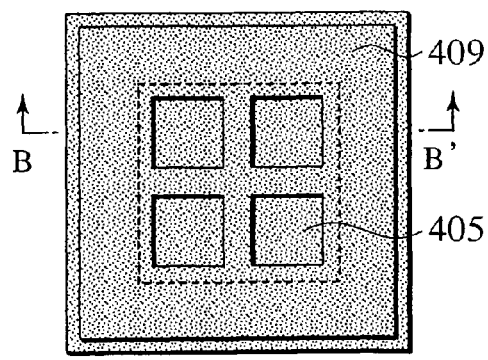

Then, an Ni film is deposited in a thickness of about 500 nm from the lower surface of the Si substrate 401 by using an EB evaporation method, thus forming a lower electrode layer 406 to be brought into direct contact with the lower surface of the electrolyte layer 404 (FIGS. 21G and 22G).

In example 10, since the reinforcement layer 403 is formed on the upper electrode layer 405, reinforcement can be achieved without reducing the area of an interface between the electrolyte layer 404 and the upper electrode layer 405, which affects power generation efficiency of the cell.

Moreover, in example 10, the silicon nitride film is used for the reinforcement layer 403. However, there is no limitation placed in this regard, and any materials can be used as long as they can physically reinforce the electrolyte layer. For example, mentioned are phosphosilicate glass (PSG), borophosphosilicate glass, alumina, titania, zirconia and MgO. Also glass containing at least one type of metal dispersed therein, the metal being selected from Si, Ti, Cr, Fe, Co, Ni, Zr, Mo, W and Ta; metal containing, as a main component, at least one type of metal element selected from Ti, Cr, Fe, Co, Ni, Zr, Mo, W and Ta; and any of stabilized zirconia and $CeO_2$ based solid solution containing at least one type of metal dispersed therein, the metal being selected from Si, Ti, Cr, Fe, Co, Ni, Zr, Mo, W and Ta.

In this case, when any one selected from glass having metal dispersed, metal, stabilized zirconia having metal dispersed, and $CeO_2$ based solid solution is used for the reinforcement layer 403, since the reinforcement layer 403 also functions as an electrode, the upper electrode layer 405 can be thinned. The transfer of fuel gas or air to the reaction interface can be facilitated, enhancing a power generation characteristic. In addition, since the reinforcement layer 403 functions as a current route, the loss of electricity in the current route can be reduced.

Example 11

The manufacturing method of the cell of example 11 is shown in FIGS. 23A to 23F and 24A to 24F.

The cell of example 11 has a feature in that a reinforcement layer is formed between an insulating and stress absorbing layer and a lower electrode layer. Hereinbelow, the manufacturing method thereof is described.

First, on both surfaces of the Si substrate 501, as insulating and stress absorbing layers 502 and 502a, for example, silicon oxide films are formed, each in a thickness of about 300 nm by subjecting the Si substrate 501 to heat treatment in oxidation atmosphere. Subsequently, as reinforcement layers 503 and 503a, for example, silicon nitride films are deposited, each in a thickness of about 200 nm, on the insulating and stress absorbing layers 502 and 502a by a low pressure CVD method (FIGS. 23A and 24A).

A specified region of the reinforcement layer 503 on the surface is removed by a photolithography and chemical dry etching using $CF_4+O_2$ gas, thus forming an opening and a reinforcement pattern 509. This opening becomes a portion to function as a cell later. Simultaneously, a portion of the silicon nitride film not functioning as a reinforcement portion may be removed. Specified regions of the silicon nitride film 503a and the silicon oxide film 502a on the lower surface of the substrate are removed by photolithography and chemical dry etching using $CF_4+O_2$ and $CH_4+H_2$ gases, thus forming a silicon exposure region 507 (FIGS. 23B and 24B).

The Si substrate 501 is etched at a temperature of about 80?C., by using silicon etching liquid, for example, hydrazine, thus forming an opening 508 on the Si substrate 501. Thus, on the surface of the Si substrate, formed is a diaphragm composed of an insulating and stress absorbing layer 502 reinforced by the reinforcement pattern 509 (FIGS. 23C and 24BC).

An Ni film is deposited in a thickness of about 500 nm on the reinforcement pattern 509 and the insulating and stress absorbing layer 502 by use of an EB evaporation method and an evaporation mask, thus forming a lower electrode layer 506 above the opening 508 (FIGS. 23D and 24D).

YSZ for the electrolyte layer 504 is formed in a thickness of about 2 μm in a specified region on the lower electrode layer 506 by an RF sputtering method, using an evaporation mask (FIGS. 23E and 24E).

Then, LSM is deposited in a thickness of about 500 nm on the surface of the Si substrate by an RF sputtering method, using an evaporation mask, thus forming an upper electrode layer 505 (FIGS. 23F and 24F).

The insulating and stress absorbing layer 502 is etched again from the lower surface of the Si substrate by chemical dry etching using $CF_4+H_2$ gas. Thus, a cell having a diaphragm structure can be formed, which is composed of the lower electrode layer 506/the electrolyte layer 504/the upper electrode layer 505 reinforced by the reinforcement pattern 509 formed in a beam shape (FIGS. 23G and 24G).

In example 11, since the reinforcement layer 503 is formed under the lower electrode layer 506, the electrolyte layer 504 can be reinforced from the initial stage of the manufacturing process.

According to the cell structure of example 11, in the step of the manufacturing process where chemical/washing treatment applies large stress on the thin film, various loads placed on the cell portion can be reduced. This cell structure is suitable for mass production.

Moreover, the reinforcement layer is formed in other than the interfaces between the upper electrode layer 505 and the electrolyte layer 504 and between the electrolyte layer 504 and the lower electrode layer 506. Accordingly, reinforcement can be achieved without reducing the area of interface, which affects the power generation efficiency of the cell.

In example 11, the silicon nitride film is used for the reinforcement layer 503. However, the material of the reinforcement layer is not limited to such, and any materials can be used as long as they can physically reinforce the electrolyte layer. For example, mentioned are phosphosilicate glass (PSG), borophosphosilicate glass, alumina, titania, zirconia and MgO. Also glass containing at least one type of metal dispersed therein, the metal being selected from Si, Ti, Cr, Fe, Co, Ni, Zr, Mo, W and Ta; metal containing, as a main component, at least one type of metal element selected from Ti, Cr, Fe, Co, Ni, Zr, Mo, W and Ta; and any of stabilized zirconia and $CeO_2$ based solid solution containing at least one type of metal dispersed therein, the metal being selected from Si, Ti, Cr, Fe, Co, Ni, Zr, Mo, W and Ta and mentioned.

In this case, when glass having metal dispersed, or metal is used for the reinforcement layer 503, since the reinforcement layer 503 also functions as an electrode, the lower electrode layer 506 can be thinned. Thus, the transfer of fuel gas or air to the reaction interface can be facilitated, improving a power generation characteristic. Moreover, since the reinforcement layer 503 functions as a current route, the loss of electricity in the current route can be reduced.

Figure 25A:
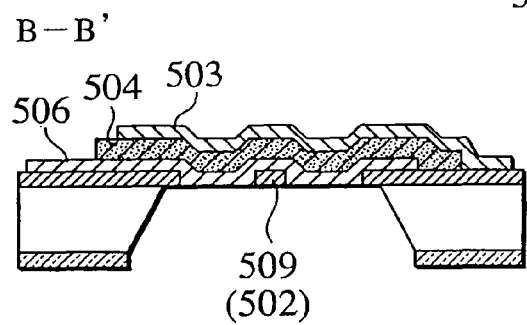
FIG. 25A is a sectional view of a cell, showing a modification example of example 11.
Figure 25B:
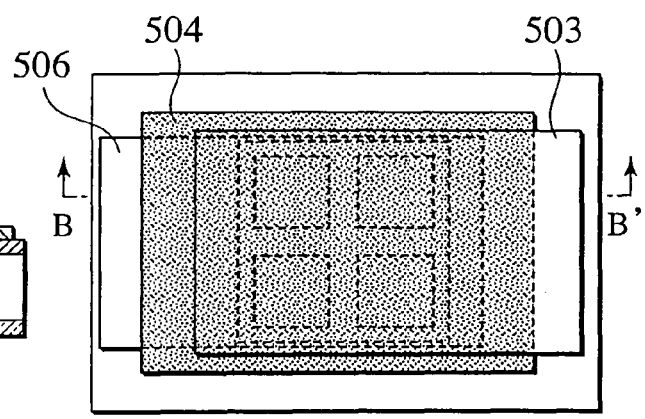
FIG. 25B is a plan view thereof.
Figure 26:
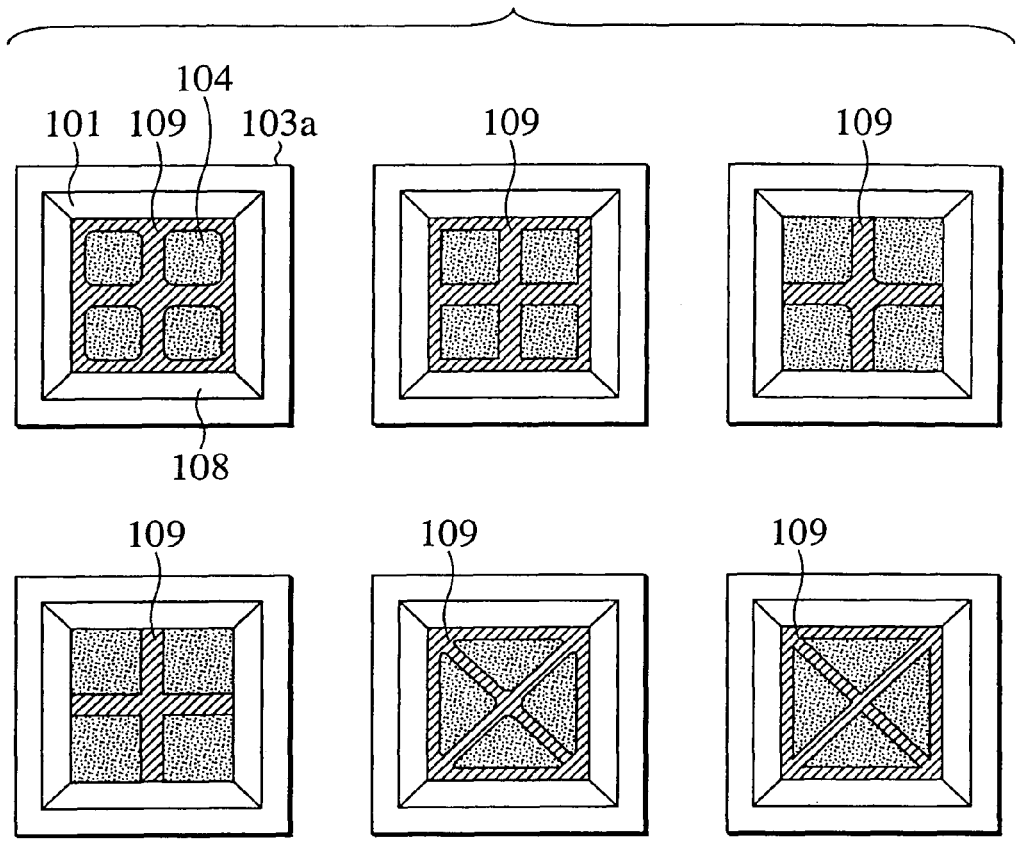
FIGS. 26 to 29 are bottom views of cells, showing examples of frame-shaped and/or beam-shaped patterns of a variety of reinforcement layers.
Figure 27:
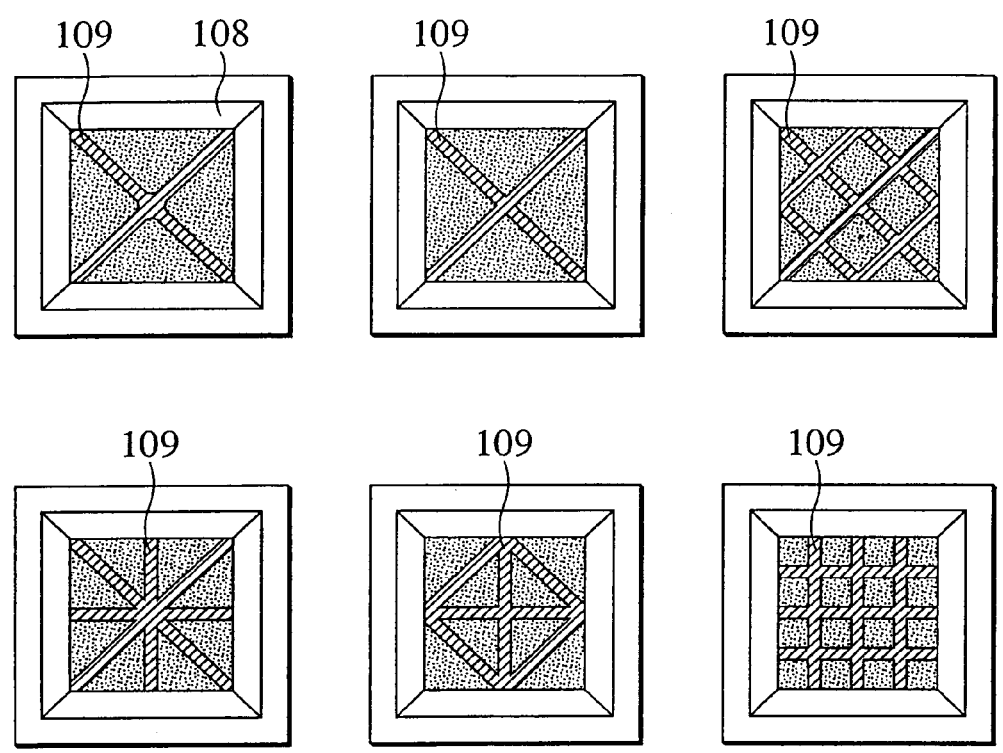
Figure 28:
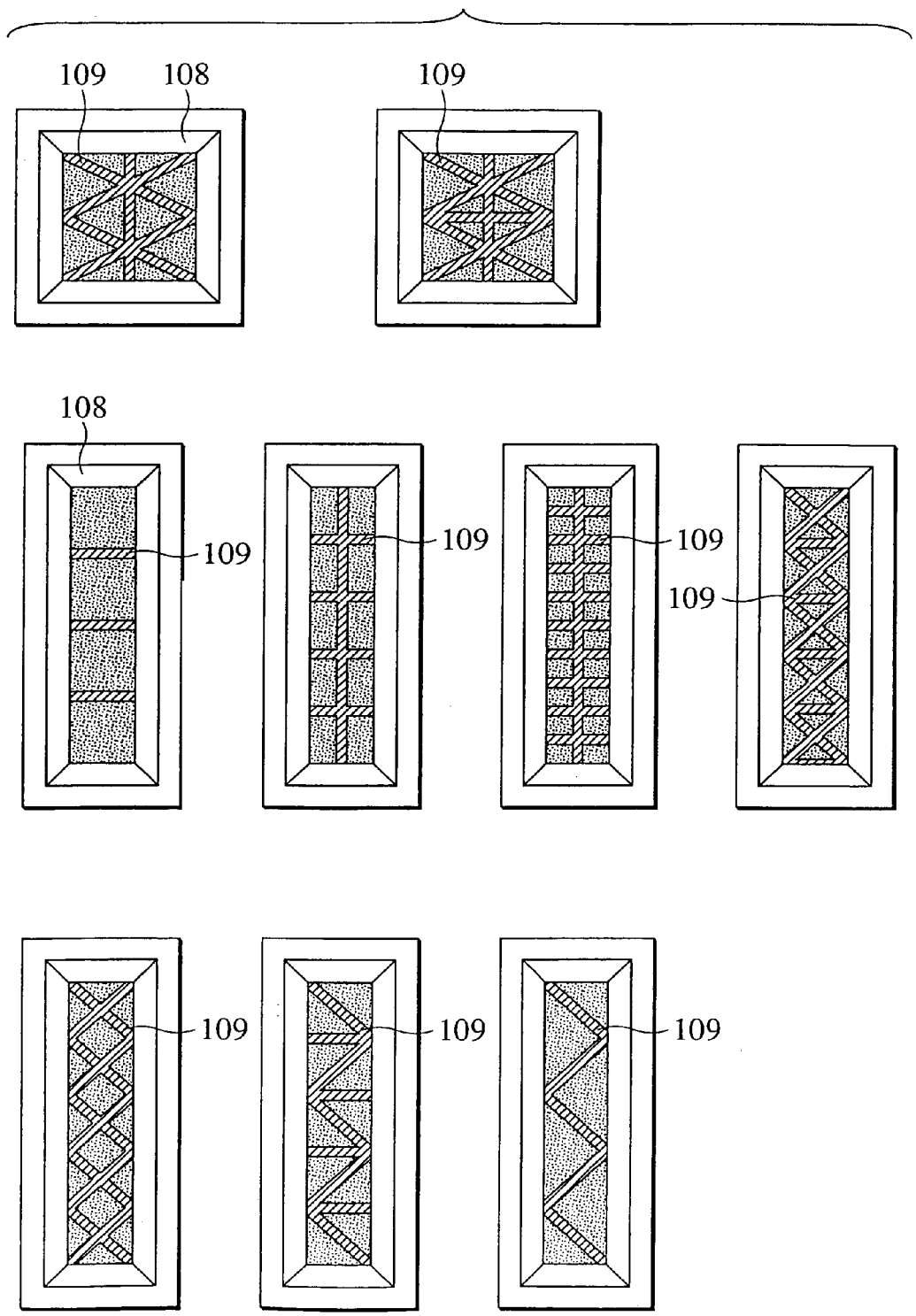
Figure 29:
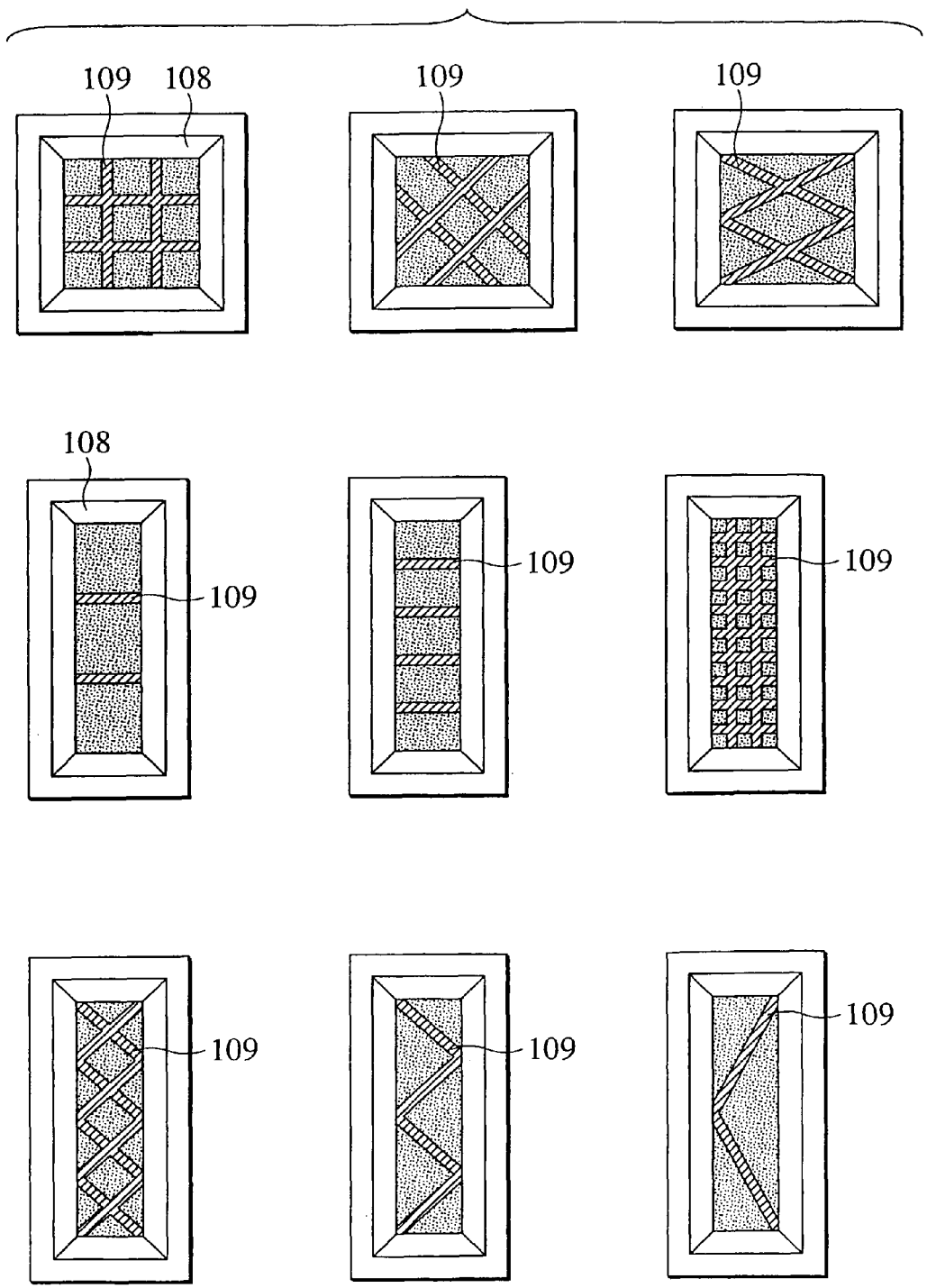

In addition, as shown in FIGS. 25A and 25B, if the reinforcement pattern 509 is formed of the insulating and stress absorbing layer 502, and adapted to the function of the reinforcement layer 503 also, a reinforcement structure can be formed only by changing the pattern of the insulating and stress absorbing layer 502 without adding the step of forming the reinforcement layer 503.

Any materials can be used for the insulating and stress absorbing/reinforcement layer, as long as they are insulators and capable of physically reinforcing the electrolyte layer. For example, one can be selected from a silicon nitride film, phosphosilicate glass (PSG), borophosphosilicate glass, alumina, titania, zirconia and MgO.

Example 12

The cell plate of example 12 is shown in FIGS. 30A to 30C. FIG. 30A is a perspective view showing the appearance of the cell plate, FIG. 30B is a sectional view taken on section line A-A', and FIG. 30C is an enlarged sectional view of a single cell 607 portion. The single cell constituting the cell plate of example 12 belongs to the third single cell of the present invention.

The cell plate has, for example, 5 times 5 pieces of cells 607, each having an opening of a square of about 5 mm on the Si substrate 601 of a square of 10 cm. Each cell 607 has the Si substrate 601, and the opening 608 of this Si substrate. On the upper surface of the Si substrate 601, an insulating and stress absorbing layer 602 is formed. In addition, an electrolyte layer 604 is formed to cover the opening 608, and an upper electrode layer 605 is formed on the insulating and stress absorbing layer 602 and the electrolyte layer 604. An opening formed in the insulating and stress absorbing layer 602 and the rectangular pattern of the electrolyte layer 604 are smaller in area than the opening 608 formed on the Si substrate 601. Meanwhile, on the bottom surface side of the Si substrate 601, besides the opening 608, left is a mask layer 602a formed of the same film as that of the insulating and stress absorbing layer, and a lower electrode layer 606 is formed to cover the opening 608 and the mask layer 602a. This lower electrode layer 606 is in direct contact with the electrolyte layer 604.

Hereinbelow, the manufacturing process of the cell of example 12 is described by referring to FIGS. 31A to 31F and FIGS. 32A to 32F.

Figure 31A:
FIGS. 31A to 31F are sectional views of a cell of example 12 in the respective manufacturing steps.
Figure 32A:
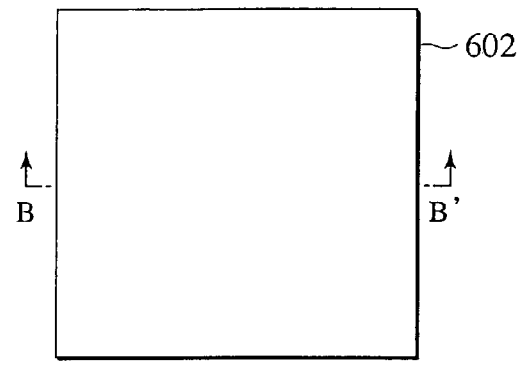
FIGS. 32A to 32F are plan views of the cell of example 12 in the respective manufacturing steps.

First, on both surfaces of the Si substrate 601, films, i.e., an insulating and stress absorbing layer 602 on the upper surface side (front surface side), and a mask layer 602a during silicon etching on the lower surface side (lower surface side), for example, silicon nitride films are deposited, each in a thickness of about 200 nm, by a low pressure CVD method (FIGS. 31A and 32A).

Figure 31B:
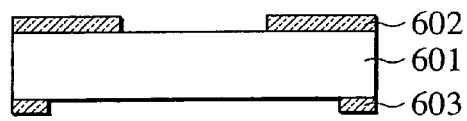
Figure 32B:
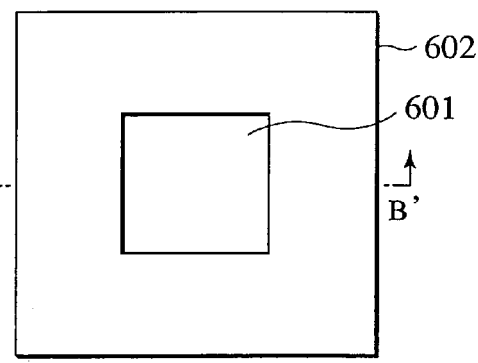

Then, a specified region of the insulating and stress absorbing layer 602 on the surface is removed by photolithography and chemical dry etching using $CF_4+O_2$ gas. Accordingly, in the insulating and stress absorbing layer 602, an opening narrower by several ?m to several hundred ?m than the opening 608 of the Si substrate formed in a later step. Subsequently, by a similar method, a desired region of the silicon nitride film on the lower surface of this substrate is removed, thus forming a mask layer 602a pattern to function as a mask for silicon etching (FIGS. 31B and 32B).

Figure 31C:
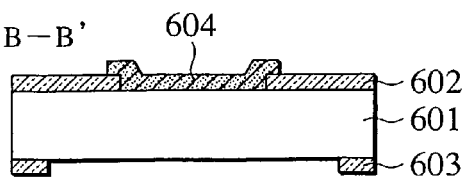
Figure 32C:
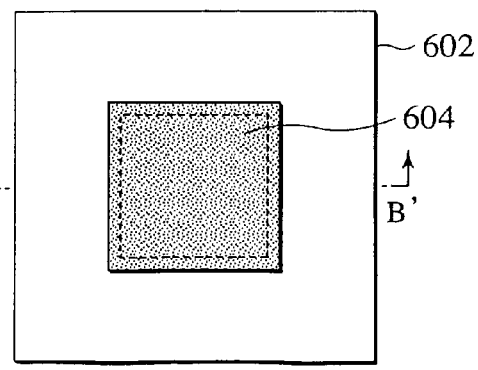

Then, an electrolyte layer 604 made of, for example, yttria stabilized zirconia (YSZ) is formed in a thickness of about 2 μm by an RF sputtering method, using an evaporation mask, so as to cover the opening of the insulating and stress absorbing layer 602 (FIGS. 31C and 32C).

Figure 31D:
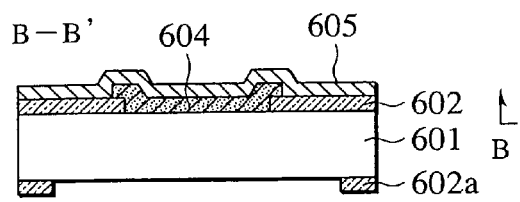
Figure 32D:
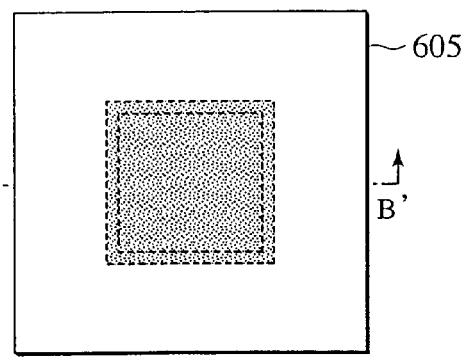

In addition, for example, LSM is deposited in a thickness of about 500 nm on the surface of the substrate by an RF sputtering method, using an evaporation mask, so as to cover the electrolyte layer 604, thus forming an upper electrode layer 605 (FIGS. 31D and 32D).

Figure 31E:
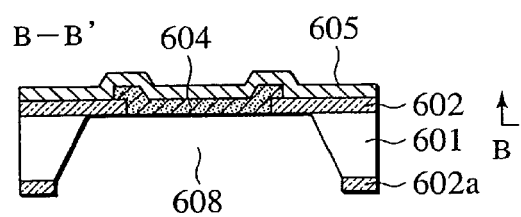
Figure 32E:
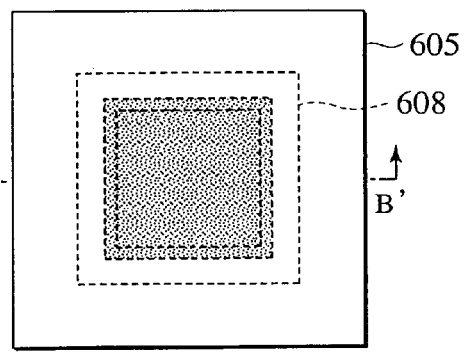

The Si substrate 601 is etched at a temperature of about 80?C. by using silicon etching liquid, for example, hydrazine, thus forming an opening 608 in the Si substrate 601. Thus, in the opening 608, formed is a diaphragm composed of the electrolyte layer 604, the periphery of the opening frame being reinforced by the insulating and stress absorbing layer 602 (FIGS. 31E and 32E).

Figure 31F:
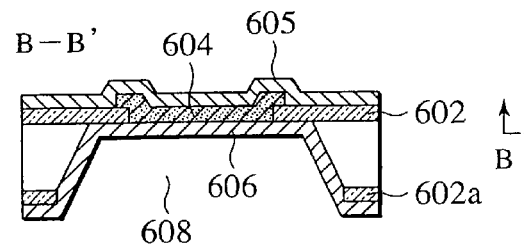
Figure 32F:
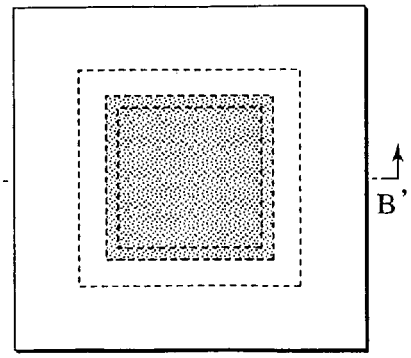

Then, an Ni film is deposited in a thickness of about 500 nm from the lower surface of the Si substrate 601 by using an EB evaporation method, thus forming a lower electrode layer 606 to be brought into direct contact with the lower surface of the electrolyte layer 604 (FIGS. 31F and 32F).

In the cell of example 12, the area of the electrolyte layer 604 is smaller than that of the opening 608, and the electrolyte layer 604 is formed inside the opening 608. A distance from the end of the electrolyte layer 604 to the opening 608 exerts a stress absorbing effect similar to that when the insulating and stress absorbing layer is formed thick. In other words, in this structure, since the electrolyte layer 604 is not directly formed on the Si substrate 601, compared with the structure of the three laminated layers, i.e., the electrolyte layer, the insulating and stress absorbing layer and the Si substrate, the generation of thermal stress caused by a difference in thermal expansion coefficients between the Si substrate 601 and the electrolyte layer 604 can be suppressed. Hence, the partial exfoliation or cracking of the electrolyte layer 604 caused by a temperature change at the start/stop time of the fuel cell can be reduced more, making it possible to provide the cell plate of much higher reliability.

In example 12, the insulating and stress absorbing layer 603 and the lower surface mask layer 603a are made of similar films. However, films of different kinds may be formed for these layers. In addition, the silicon nitride film is used for the insulating and stress absorbing layer 602. However, there is no limitation placed in this regard, and any materials can be used as long as they can provide physical insulation. For example, one can be selected for use from silicon nitride, phosphosilicate glass (PSG), borophosphosilicate glass (BPSG), alumina, titania, zircornia and magnesium, or one mainly containing an optional mixture thereof.

Example 13

The cell plate of example 13 is shown in FIGS. 33A to 33C. FIG. 33A is a perspective view showing the appearance of the cell plate, FIG. 33B is a sectional view taken on section line A-A', and FIG. 33C is an enlarged sectional view of the cell.

The cell of example 13 can be manufactured by using a process similar to that of example 12. However, it is different in that the insulating and stress absorbing layer 602 has a plurality of openings, and the electrolyte layers 604 separated for the respective openings are formed not to overlap the Si substrate. In other words, a plurality of cells are formed in each opening 608 of the Si substrate.

The cell plate of example 13 has four openings of about 40 mm in the Si substrate 601 of a square of 10 cm. On the opening 608, an insulating and stress absorbing layer 602 having 3 times 3 pieces of openings, each having a square of 10 mm. In each opening, the region of an electrolyte layer 4 of a square of 12 mm is formed. Further, on the surface of the substrate, an upper electrode layer 605 is formed, and a lower electrode layer 606 is formed on the lower surface of the opening 608 so as to directly contact the lower surface of the electrolyte layer 604.

The manufacturing process of the cell of example 13 is shown in FIGS. 34A to 34F and FIGS. 35A to 35F. As for conditions on materials and film thickness, the conditions of example 12 can be used.

Figure 34A:
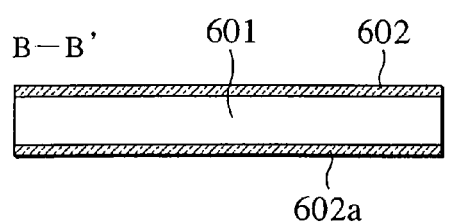
FIGS. 34A to 34F are sectional views of a cell of example 13 in the respective manufacturing steps.
Figure 35A:
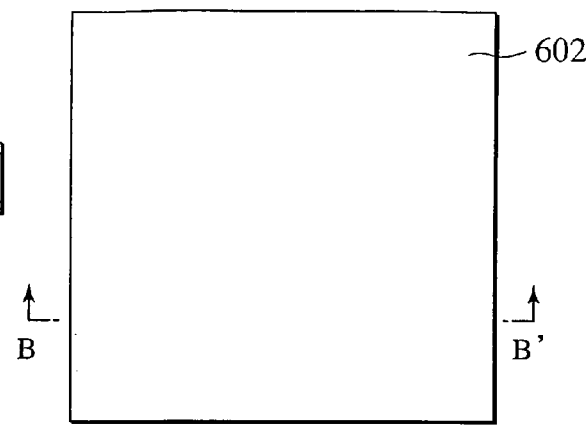
FIGS. 35A to 35F are plan views of the cell of example 13 in the respective manufacturing steps.

First, on both surfaces of the Si substrate 601, films, i.e., an insulating and stress absorbing layer 602 on the upper surface side, and a mask layer 602a during silicon etching on the lower surface side, for example, silicon nitride films, are deposited (FIGS. 34A and 35A).

Figure 34B:
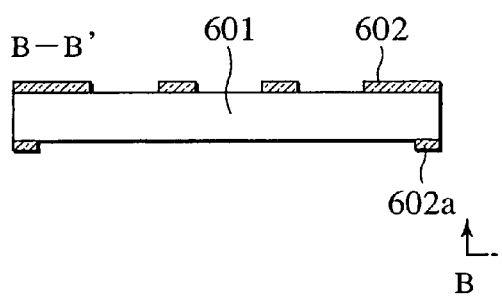
Figure 35B:
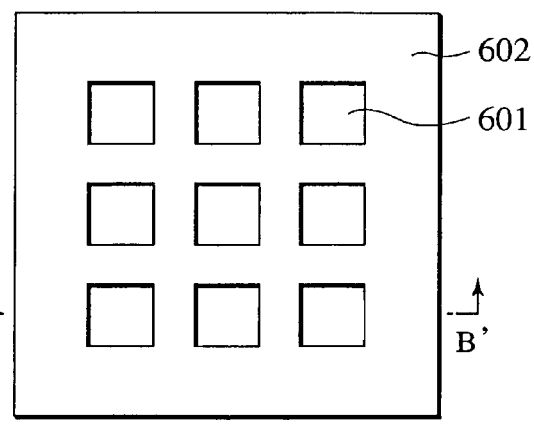

Then, a specified region of the insulating and stress absorbing layer 602 on the surface is removed by etching. Accordingly, in the insulating and stress absorbing layer 602, 3 times 3 pieces of openings, each having a square of 10 mm, are formed in the opening 608 of the Si substrate formed in a later step. Subsequently, by a similar method, a desired region of the silicon nitride film of the lower surface of this substrate is removed, thus forming a mask layer 602a pattern to function as a mask for etching the Si substrate (FIGS. 34B and 35B).

Figure 34C:
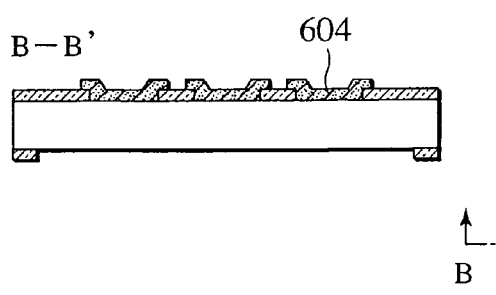
Figure 35C:
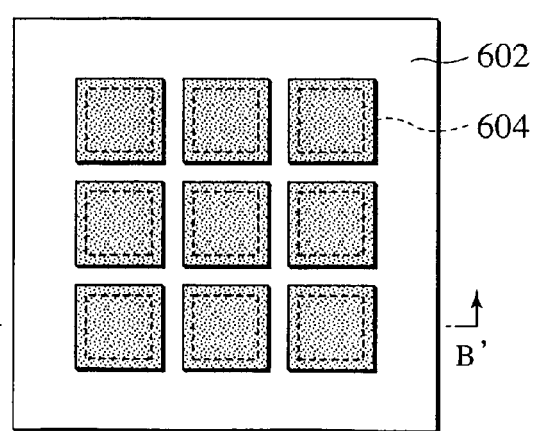

Then, an electrolyte layer 604 pattern is formed on each opening of the insulating and stress absorbing layer 602 (FIGS. 34C and 35C).

Figure 34D:
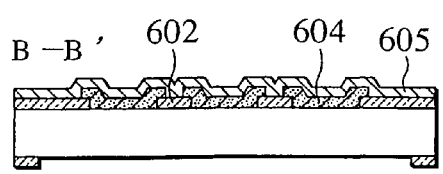
Figure 35D:
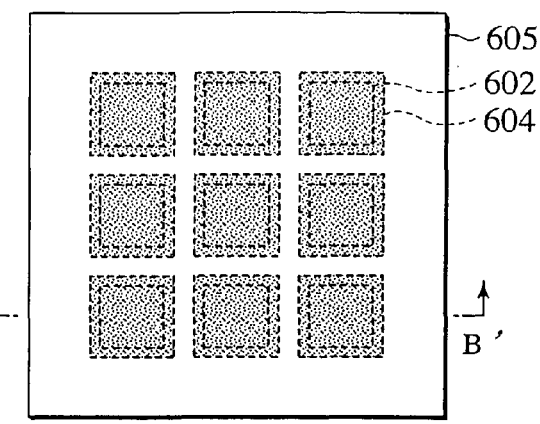

In addition, an upper electrode layer 605 is deposited on the surface of the substrate (FIGS. 34D and 35D).

Figure 34E:
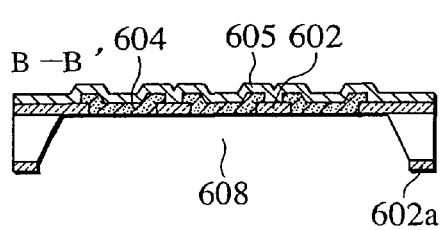
Figure 35E:
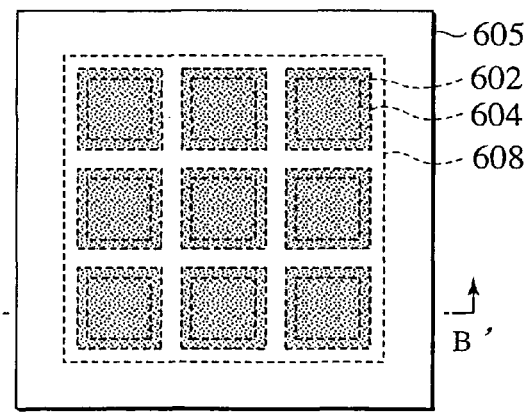

Then, by using the mask layer 602a pattern as a mask, the Si substrate 601 is etched, thus forming an opening 608 in the Si substrate 601. On the opening 608, a diaphragm is formed, which is composed of the pattern of the insulating and stress absorbing layer 602 and the plural regions of electrolyte layers 604 thereby supported (FIGS. 34E and 35E).

Figure 34F:
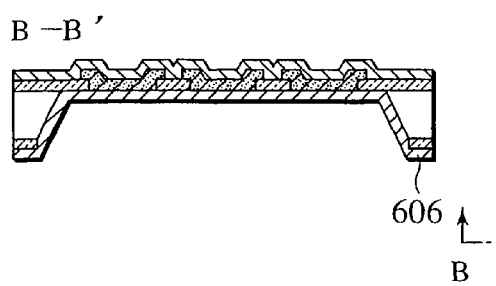
Figure 35F:
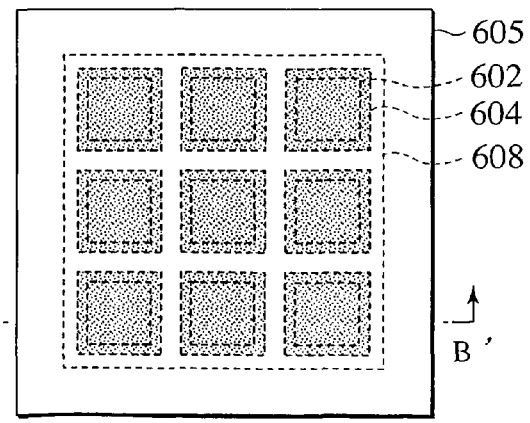

Then, a lower electrode layer 606 is formed from the lower surface of the Si substrate 601 (FIGS. 34F and 35F).

In the cell plate of example 13, the insulating and stress absorbing layer 602 having the plurality of openings is formed with respect to one opening of the Si substrate 601, and the electrolyte layer 604 divided into small areas is provided thereon. Hence, similarly to example 12, since the electrolyte layer 604 and the Si substrate 601 greatly different in thermal expansion coefficients are separately disposed, the generation of thermal stress can be reduced.

The area of each region of the electrolyte layer 604 is difficult to enlarge in consideration of a relation with the difference between thermal expansion coefficients of the Si substrate 601 and the electrolyte layer 604 and the strength of the electrolyte layer 604. Accordingly the area of each region of the electrolyte layer 604 is small. When one electrolyte layer 604 region is formed for one opening 608 of the Si substrate 601, a slope portion of a plane (111) is formed by anisotropic etching. This slope portion is never effectively used by the cell, and thus it is unnecessary. For example, in the case of a standard wafer thickness of 625 μm with respect to the opening (100 mm²) of a square of 10 mm, the slope portion becomes even 16.6 mm², greatly reducing area utilization efficiency. However, in example 13, the ratio of this portion (area) can be set very small, making it possible to increase area utilization efficiency.

Further, since all the cell portions contributing power generation reaction are formed on the thin film of the insulating and stress absorbing layer 602, temperature uniformity is high in the insulating and stress absorbing layer 602, and a temperature gradient is difficult to occur in the insulating and stress absorbing layer 602. Therefore, internally generated stress is limited.

In addition, in the structure of example 13, the large size of the opening 608 enables the cell plate to be reduced in weight, and a thermal capacity of the cell plate to be reduced. Therefore, the quantity of heat necessary for reaching a specified temperature is saved to be small, quickening temperature elevation. In other words, cell starting performance is improved. When the cell plates are stacked, a good effect such as the difficulty of temperature distribution is obtained.

Example 14

Figure 36A:
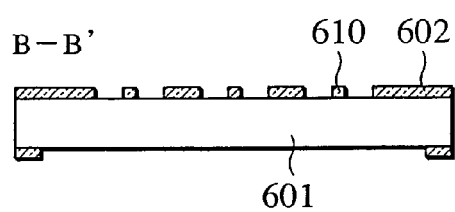
FIGS. 36A and 36B are sectional views of a cell of example 14 in a manufacturing process and on completion, respectively.
Figure 37A:
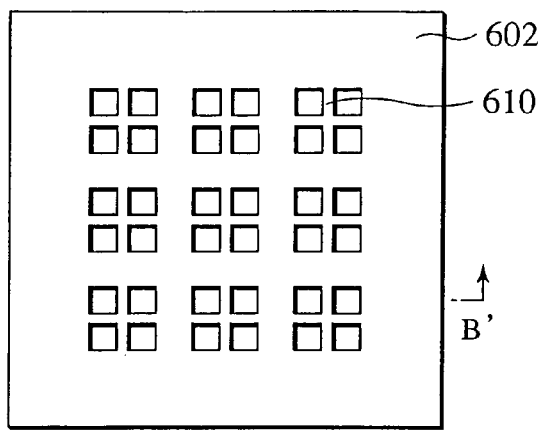
FIGS. 37A and 37B are plan views of the cell of example 14 in the manufacturing process and on completion, respectively.
Figure 36B:
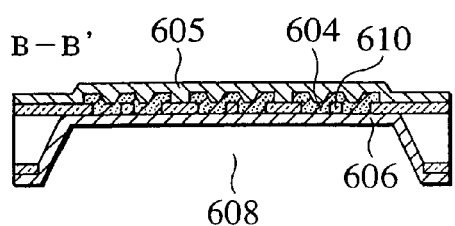
Figure 37B:
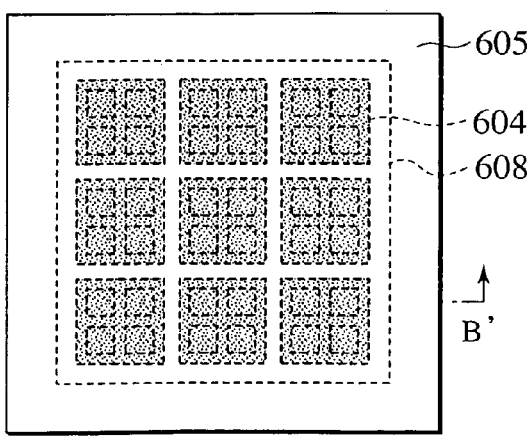

FIG. 36A is a partial sectional view of the cell plate of example 14 in progress of the manufacturing process, and FIG. 37A is a partial plan view of the cell plate corresponding to the sectional view. FIG. 36B is a partial sectional view of the cell plate of example 14 when completed and FIG. 37B is a partial plan view of the cell plate corresponding to the sectional view.

The cell plate of example 14 is basically similar to that of example 13 for a structure and a manufacturing method. However, the pattern of the insulating and stress absorbing layer 602 is different. Specifically, as shown in FIGS. 36A and 37A, in the cell plate of example 14, a reinforcement pattern 610 having a beam function is provided in the opening of the insulating and stress absorbing layer 602.

The cell plate of example 14 has an advantage similar to that of example 13, and supports the electrolyte layer 604 by the reinforcement pattern 610 composed of the insulating and stress absorbing layer 602 under the electrolyte layer 604. Thus, the breakage of the electrolyte layer 604 can be more effectively prevented, making it possible to enhance reliability more.

Example 15

Figure 38A:
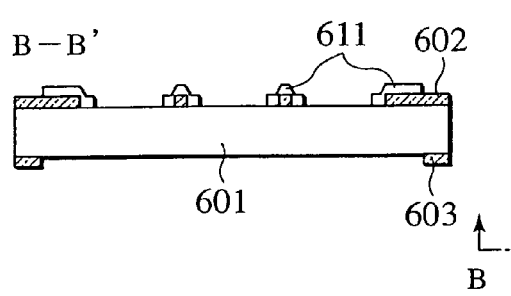
FIGS. 38A and 38B are sectional views of a cell of example 15 in a manufacturing process and on completion, respectively.
Figure 39A:
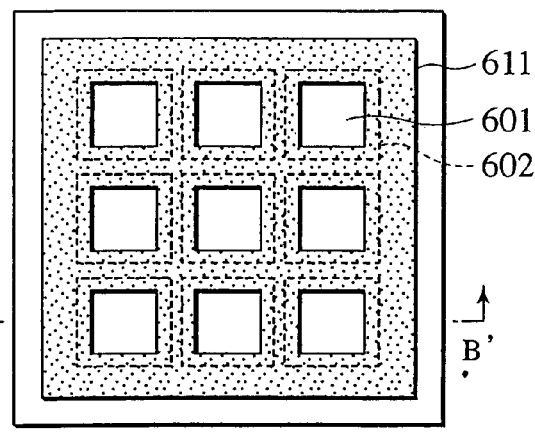
FIGS. 39A and 39B are plan views of the cell of example 15 in the manufacturing process and on completion, respectively.
Figure 38B:
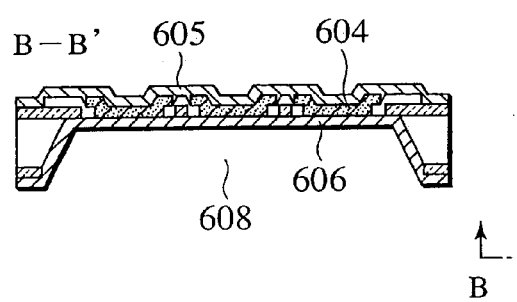
Figure 39B:
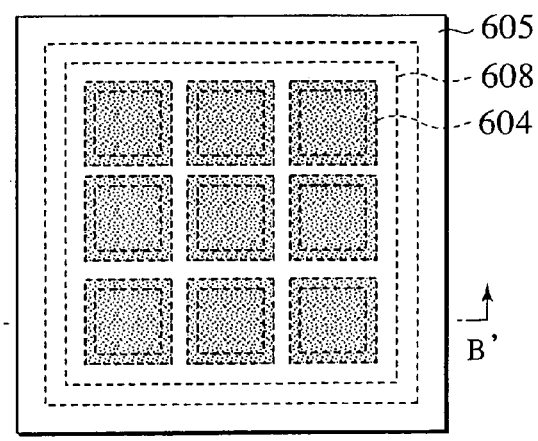

FIG. 38A is a partial sectional view of the cell plate of example 15 in progress of the manufacturing process and FIG. 39A is a partial plan view of the cell plate corresponding to the sectional view. FIG. 38B is a partial sectional view of the cell plate of example 15 when completed, and FIG. 39B is a partial plan view of the cell plate corresponding to the sectional view.

The cell plate of example 15 has a feature in that an insulating and stress absorbing layer is composed of a plurality of layers.

As shown in FIGS. 38A and 39A, after a first insulating and stress absorbing layer 602 is deposited and patterned, a second insulating and stress absorbing layer 611 is deposited, and a pattern is formed of the second insulating and stress absorbing layer 611 to cover the pattern of the first insulating and stress absorbing layer.

In example 15, a thermal expansion coefficient is gradually changed by interposing the plurality of stress absorbing layers between the Si substrate 602 and the electrolyte layer 604. Thus, stress absorption is made more efficient, making it possible to enhance the reliability of the cell plate.

Example 16

Figure 40A:
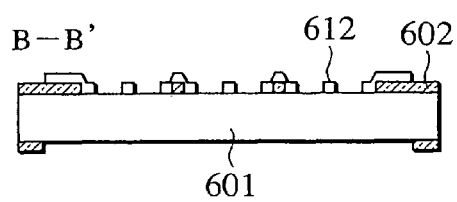
FIGS. 40A and 40B are sectional views of a cell of example 16 in a manufacturing process and on completion, respectively.
Figure 41A:
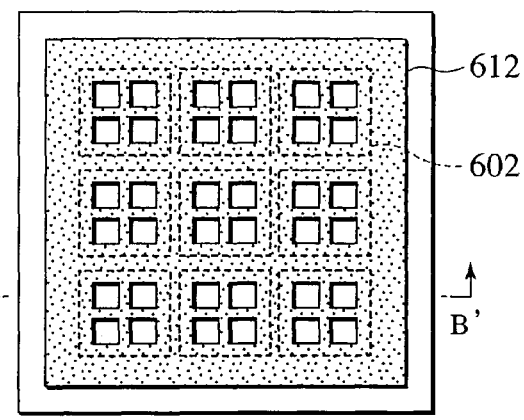
FIGS. 41A and 41B are plan views of the cell of example 16 in the manufacturing process and on completion, respectively.
Figure 40B:
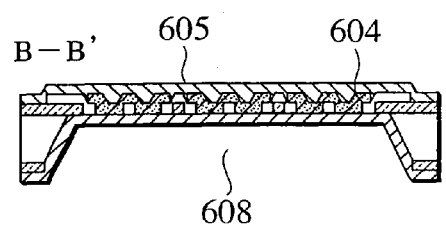
Figure 41B:
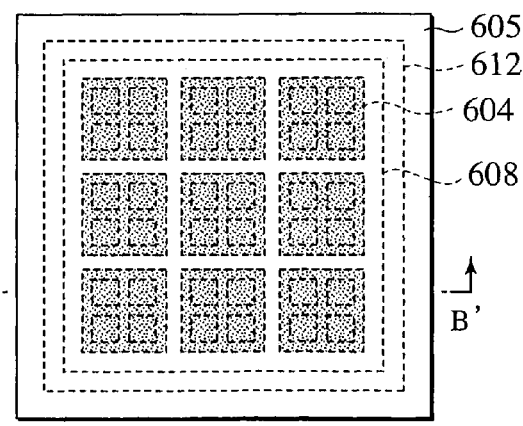

FIG. 40A is a partial sectional view of the cell plate of example 16 in the progress of the manufacturing process, and FIG. 41A is a partial plan view of the cell plate corresponding to the sectional view. FIG. 40B is a partial sectional view of the cell plate of example 16 when completed, and FIG. 41B is a partial plan view of the cell plate corresponding to the sectional view.

In the cell structure of example 16, similarly to the cell structure of example 15, an insulating and stress absorbing layer is composed of a plurality of layers. An opening pattern is formed of a first insulating and stress absorbing layer 602. The opening pattern of the first insulating and stress absorbing layer 602 is covered with a second stress absorbing structure layer 612, and a beam-shaped reinforcement pattern is formed in the opening.

Similarly to example 15, a thermal expansion coefficient is gradually changed by providing a plurality of stress absorbing layers between the Si substrate 601 and the electrolyte layer 602, thereby reducing stress, and a beam-shaped stress absorbing layer 612 is formed under the electrolyte layer 604. Thus, since the beam-shaped stress absorbing layer 12 supports the electrolyte layer 604 from below, the breakage of the electrolyte layer 604 can be prevented more effectively, further improving reliability.

Example 17

FIGS. 42A to 42F and FIGS. 43A to 43F are partial sectional and partial plan views of the cell plate of example 17 in respective manufacturing steps.

Figure 42A:
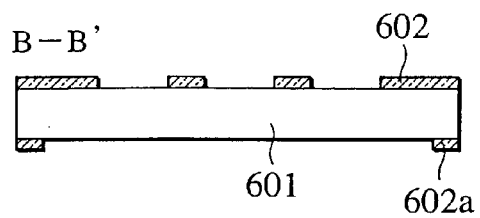
FIGS. 42A to 42F are sectional views of a cell of example 17 in the respective manufacturing steps.
Figure 43A:
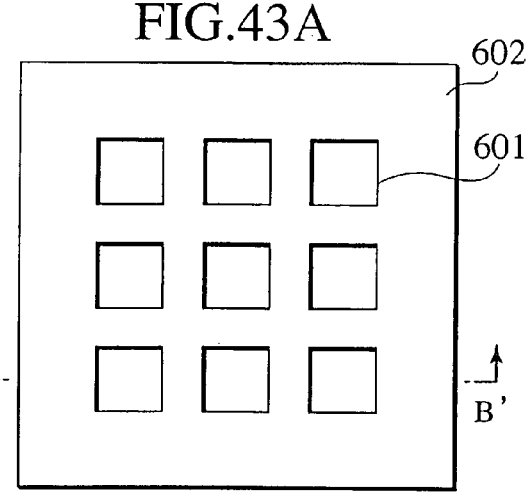
FIGS. 43A to 43F are plan views of the cell of example 17 in the respective manufacturing steps.

The manufacturing method of the cell of example 17 is briefly described. First, as shown in FIGS. 42A and 43A, an opening pattern of the insulating and stress absorbing layer 602 is formed on the Si substrate 601. In separate step, a mask layer 602a is formed on the lower surface of the Si substrate.

Figure 42B:
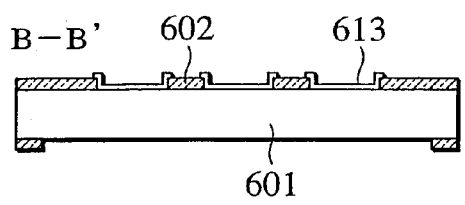
Figure 43B:
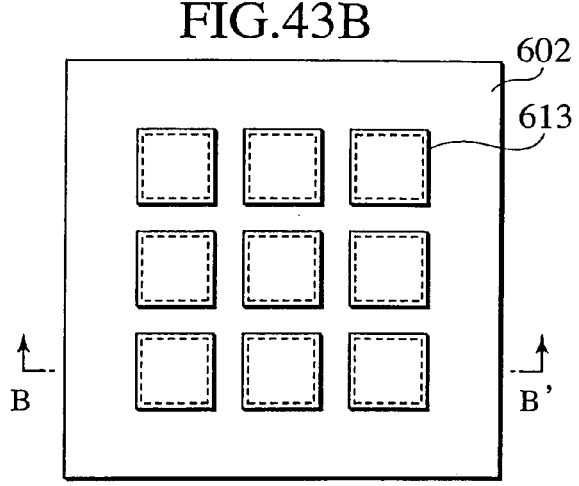

Then, a first lower electrode layer 613 is formed to cover each opening of the stress-absorbing layer 602 on the upper surface of the substrate (FIGS. 42B and 43B).

Figure 42C:
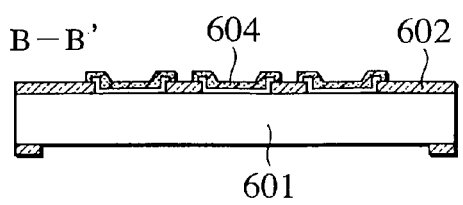
Figure 43C:
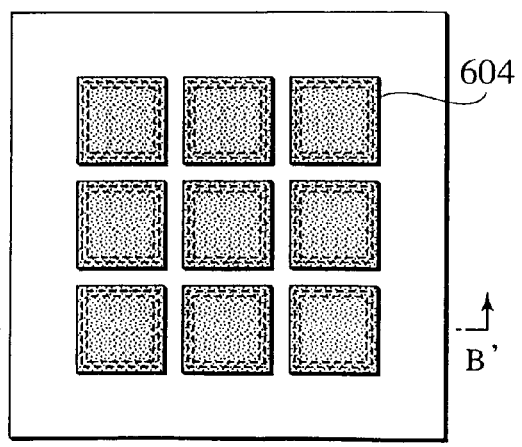
Figure 42D:
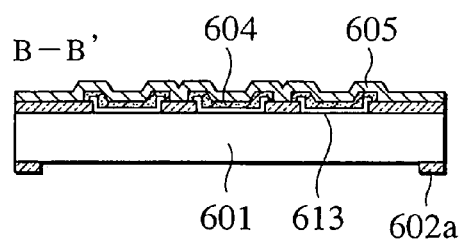
Figure 43D:
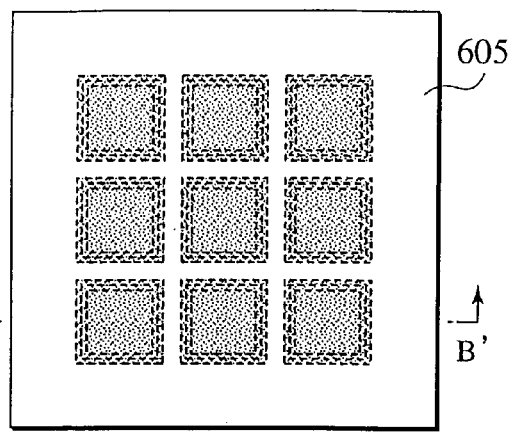

An electrolyte layer 604 is formed on the lower electrode layer 613 (FIGS. 42C and 43C). Subsequently, an upper electrode layer 605 is formed on the full surface of the substrate (FIGS. 42D and 43D). Then, the Si substrate 601 is etched by using the mask layer 602a as an etching mask, thus forming an opening 608 (FIGS. 42E and 43E).

Figure 42E:
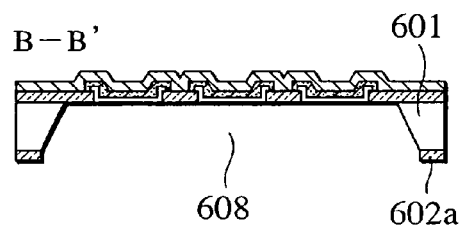
Figure 43E:
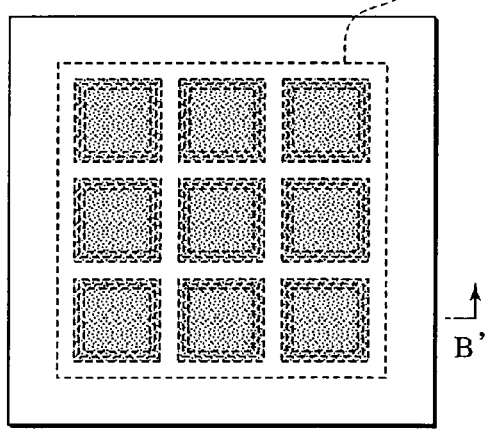
Figure 42F:
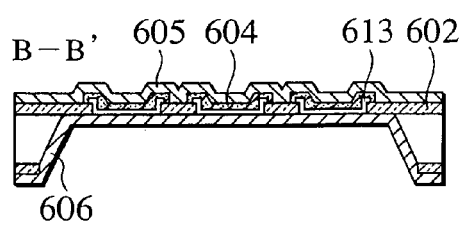
Figure 43F:
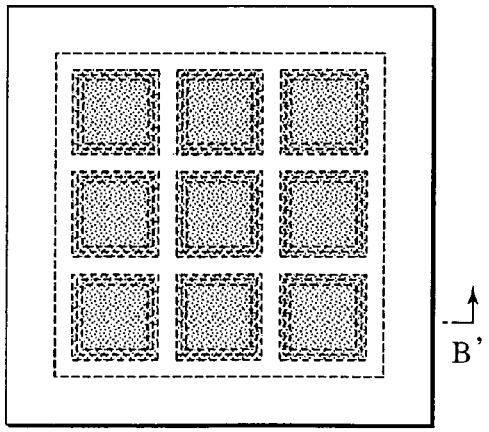

Further, the full lower surface of the Si substrate is covered with a second lower electrode layer 606 (FIGS. 42E and 43E). The first lower electrode layer 613 formed on the upper surface of the Si substrate is brought into direct contact with the lower electrode layer 606.

According to the cell structure of example 17, since the first lower electrode layer 613 is formed on the upper surface of the substrate, the electrolyte layer 604 can be supported by this first lower electrode layer 613. Therefore, the breakage of the electrolyte layer can be effectively prevented during the manufacturing process, improving the reliability of the cell more.

In the cell structure of example 17, the insulating and stress absorbing layer 602 has an opening pattern similar to that of example 13. However, the shape and the structure of the insulating and stress absorbing layer are not limited to such. Similarly to examples 14 to 16, the insulating and stress absorbing layer may be composed of a plurality of layers.

Example 18

Figure 45A:
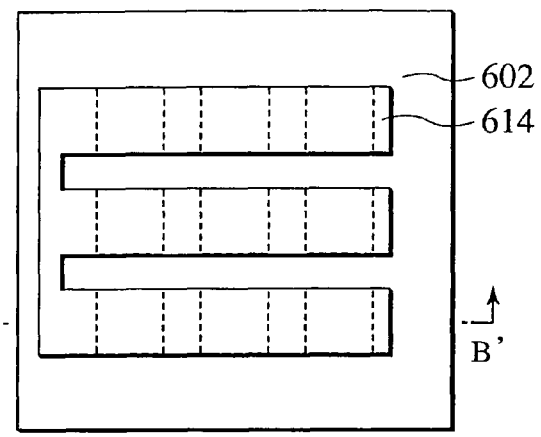
FIGS. 45A and 45B are plan views of the cell of example 18 in the manufacturing process and on completion, respectively.
Figure 45B:
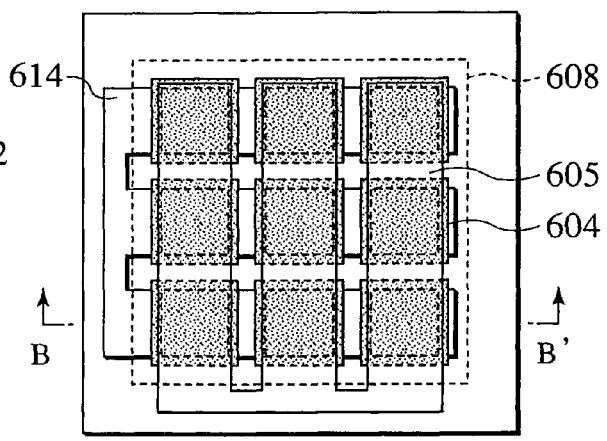

FIG. 44A is a partial sectional view of the cell plate of example 18 in the progress of the manufacturing process. FIG. 45A is a partial plan view of the cell plate corresponding to the sectional view. FIG. 44B is a partial sectional view of the cell plate of example 18 when completed. FIG. 45B is a partial plan view of the cell plate corresponding to the sectional view.

For the cell of example 18, as shown in FIGS. 44A and 45A, an opening pattern of a stress absorbing layer 602 is formed on the upper surface of the Si substrate 601, and then a lower electrode layer 614 pattern is formed to cover each opening pattern. Subsequently, as shown in FIGS. 44B and 45B, an upper electrode layer 605 is formed on the lower electrode layer 614 of the opening.

In example 18, different from example 17, a lower electrode layer 606 is not deposited from the lower surface of the Si substrate 601.

In example 18, a lower electrode layer 614 is formed on the upper surface of the Si substrate 601, and an electrolyte layer 604 is formed on this lower electrode layer 614. Accordingly, since the electrolyte layer 604 is supported by the lower electrode layer 614, breakage is effectively prevented during the manufacturing process, improving reliability more. In addition, by disposing the lower and upper electrode layers 614 and 605 to cross each other in the portion of the electrolyte layer 604 (opening portion of the stress absorbing layer 602), both electrodes can be drawn out for electrical connection on the upper surface of the Si substrate 601.

Apparently, also in examples 12 to 18, a reinforcement layer like that shown in examples 7 to 11 can be inserted.

Example 19

Figure 46A:
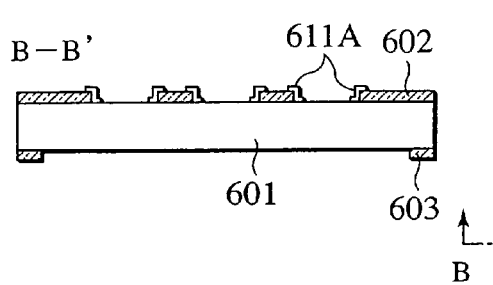
FIGS. 46A and 46B are sectional views of a cell of example 19 in a manufacturing process and on completion, respectively.
Figure 47A:
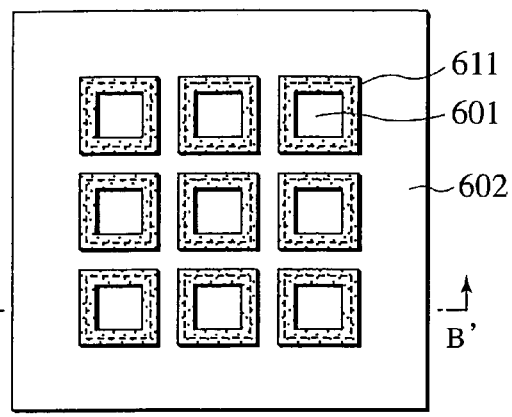
FIGS. 47A and 47B are plan views of the cell of example 19 in the manufacturing process and on completion, respectively.
Figure 46B:
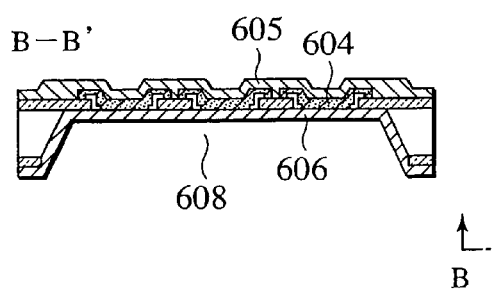
Figure 47B:
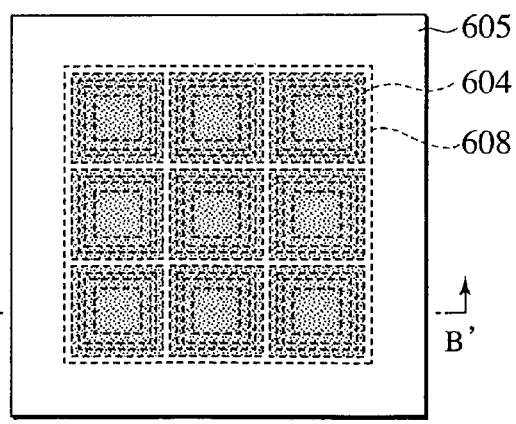

FIG. 46A is a partial sectional view of the cell plate of example 19 in the midway of the manufacturing process. FIG. 47A is a partial plan view of the cell plate corresponding to the sectional view. FIG. 46B is a partial sectional view of the cell plate of example 19 when completed. FIG. 47B is a partial plan view of the cell plate corresponding to the sectional view.

The cell plate of example 19 is a modified example of example 15. In the cell plate of example 19, a second stress absorbing layer 611A is provided on the first insulating and stress absorbing layer 602. However, an insulation property is not necessary for the second stress absorbing layer 611A.

In example 19, the first insulating and stress absorbing layer 602 is deposited and patterned, and then a second stress absorbing layer 611A is deposited and patterned. Since a film having no insulation property is used for the second stress absorbing layer 611A, the second stress absorbing layer 611A is covered with the electrolyte layer 604 so as to prevent the short-circuiting of the upper and lower electrode layers 605 and 606.

Also for the cell plate of example 19, since a thermal expansion coefficient is gradually changed by interposing a plurality of stress absorbing layers between the Si substrate 601 and the electrolyte layer 604, stress absorption can be effectively achieved.

Any materials can be used for the second stress absorbing layer 611A, as long as they can physically reinforce the electrolyte layer 604. For example, mentioned are phosphosilicate glass (PSG), borophosphosilicate glass, alumina, titania, zirconia and MgO. Also glass containing at least one type of metal dispersed therein, the metal being selected from Si, Ti, Cr, Fe, Co, Ni, Zr, Mo, W and Ta; metal containing, as a main component, at least one type of metal element selected from Ti, Cr, Fe, Co, Ni, Zr, Mo, W and Ta; and any of stabilized zirconia and $CeO_2$ based solid solution containing at least one type of metal dispersed therein, the metal being selected from Si, Ti, Cr, Fe, Co, Ni, Zr, Mo, W and Ta are mentioned.

In this case, when glass having metal dispersed, or metal is used for the stress absorbing layer, since this layer also functions as a lower electrode layer, stress absorption can be carried out without any reductions in the effective area of the electrolyte layer caused by the addition of the stress absorbing layer. In this case, an insulator can be formed of the electrolyte layer 604 as shown in FIG. 42.

When the stabilized zirconia or $CeO_2$ based solid solution having metal dispersed is used, since the stress absorbing layer functions as an intermediate layer between the electrolyte layer and the lower electrode layer, stress absorption can be achieved without any reductions in the effective area of the electrolyte layer caused by the addition of the stress absorbing layer.

Moreover, the materials for the electrolyte layer and the upper and lower electrode layers are not limited to those taken up in the example.

Example 20

Figure 48A:
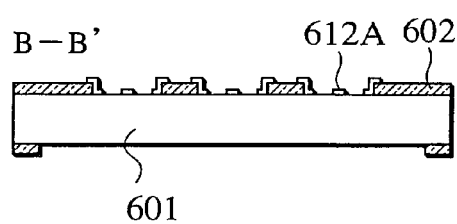
FIGS. 48A and 48B are sectional views of a cell of example 20 in a manufacturing process and on completion, respectively.
Figure 49A:
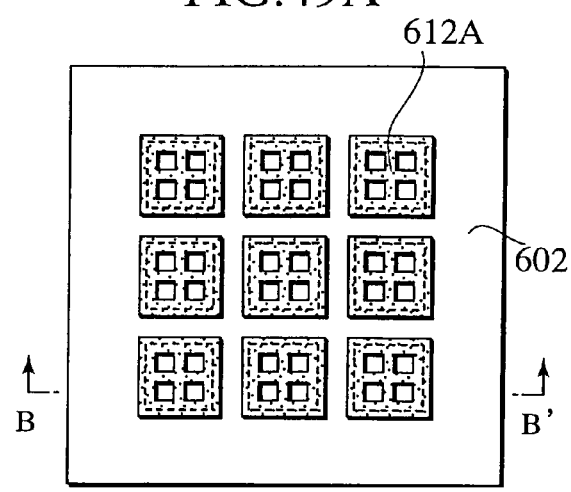
FIGS. 49A and 49B are plan views of the cell of example 20 in the manufacturing process and on completion, respectively.
Figure 48B:
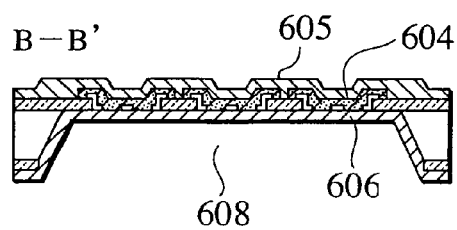
Figure 49B:
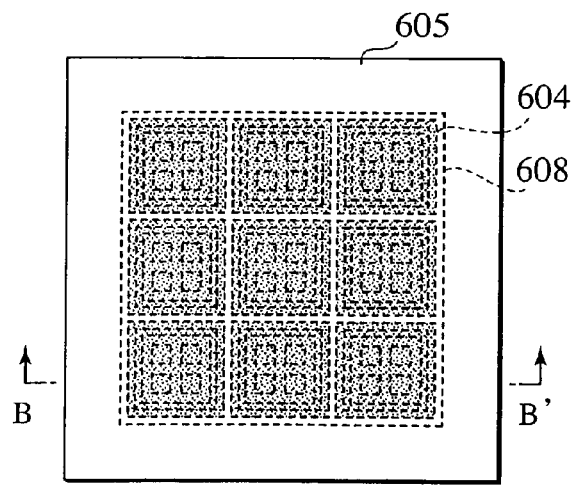

FIG. 48A is a partial sectional view of the cell plate of example 20 in the progress of the manufacturing process. FIG. 49A is a partial plan view of the cell plate corresponding to the sectional view. FIG. 48B is a partial sectional view of the cell plate of example 20 when completed. FIG. 49B is a partial plan view of the cell plate corresponding to the sectional view.

Example 20 is a modified example of example 16. The cell plate of example 20 has a second stress absorbing layer 612A on the first insulating and stress absorbing layer 602. However, no insulation property is necessary for the second stress absorbing layer 612A.

In example 20, the first insulating and stress absorbing layer 602 is deposited and patterned, and then the second stress absorbing layer 612A is deposited and patterned. Since a film having no insulation property is used for the second stress absorbing layer 612A, the second stress absorbing layer 612A is covered with the electrolyte layer 604 so as to prevent the short-circuiting of the upper and lower electrode layers 605 and 606.

For the second stress absorbing layer 612A, a material similar to that for the second stress absorbing layer 611A of example 19 can be used.

As described above, according to the present invention, since a specified substrate is used, and the layered structure is employed and so on, in which a particular insulating and stress absorbing layer having the insulation property and the stress absorption function and a specified reinforcement layer are formed, provided are the single cell and the cell plate for the solid oxide fuel cell, in which the film resistance of the electrolyte layer is small, the area of the power generation portion can be sufficiently secured, and the reliability on the use frequently performing the start/stop is high, moreover, provided are the method of manufacturing the same and the solid oxide fuel cell using the single cell.

Moreover, according to the present invention, provided can be the single cell and the cell plate for the solid oxide fuel cell, in which the area of the substrate openings educing the power generation function is large, the generation power output density is high, the breakage due to the local heating is unlikely to occur, and the reliability is high, and the method of manufacturing the same, moreover, provided is the solid oxide fuel cell using the single cell.

The entire contents of Japanese Patent Applications P2000-360353 (filed: Nov. 27, 2000) and P2001-111102 (filed: Apr. 10, 2001) are incorporated herein by reference. Although the inventions have been described above by reference to certain embodiments of the inventions, the inventions are not limited to the embodiments described above. Modifications and variations of the embodiments described above will occur to those skilled in the art, in light of the above teachings.

The scope of the inventions is defined with reference to the following claims.

INDUSTRIAL APPLICABILITY

The single cell and the cell plate of the present invention can be used for the solid oxide fuel cell. Moreover, this solid oxide fuel cell can be used as a small-sized generator, and can be used as a power source for a mobile body such as a variety of portable equipment, a vehicle or a ship.

The invention claimed is:

1. A single cell for a solid oxide fuel cell, comprising:
   a substrate having an opening penetrating from an upper surface thereof to a lower surface thereof;
   an insulating and stress absorbing layer formed on at least an outer periphery of the opening on the upper surface of the substrate;
   a lower electrode layer formed on the insulating and stress absorbing layer and covering the opening;
   a solid electrolyte layer formed on the lower electrode layer;
   an upper electrode layer formed on the electrolyte layer; and
   a reinforcement layer formed on the upper surface of the substrate, or above the substrate and above a part of the opening, and having at least any one pattern of a frame-shaped pattern covering a frame of the opening and a beam-shaped pattern crossing the opening.

2. The single cell according to claim 1, wherein an area of the opening is S0, an area of the reinforcement layer in a region of the opening is S22, and a substantial area of the opening is S0–S22, the following relation is satisfied:

$S22/(S0-S22) \leq 5.$

3. The single cell according to claim 1, wherein the beam-shaped pattern of the reinforcement layer passes above a center of the opening.

4. The single cell according to claim 1, wherein the reinforcement layer has a synthetic pattern composed of the frame-shaped pattern and the beam-shaped pattern, and this synthetic pattern divides the opening approximately equally.

5. The single cell according to claim 1, wherein a thickness of the reinforcement layer is 100 nm to 100 μm.

6. The single cell according to claim 1, wherein the reinforcement layer is disposed at one of following positions (1) to (5):
   (1) between the substrate and the insulating and stress absorbing layer;
   (2) between the insulating and stress absorbing layer and the lower electrode layer;
   (3) between the solid electrolyte layer and the lower electrode layer;
   (4) between the solid electrolyte layer and the upper electrode layer; and
   (5) on the upper electrode layer.

7. The single cell according to claim 6, wherein the reinforcement layer is disposed (1) between the substrate and the insulating and stress absorbing layer and is made of an insulating material.

8. The single cell according to claim 6,
wherein the reinforcement layer is disposed (2) between the insulating and stress absorbing layer and the lower electrode layer and is made of one of an insulating material and an electrode material.

9. The single cell according to claim 6,
wherein the reinforcement layer is disposed (3) between the solid electrolyte layer and the lower electrode layer and is made of one of a solid electrolyte material and an electrode material.

10. The single cell according to claim 6,
wherein the reinforcement layer is disposed (4) between the solid electrolyte layer and the upper electrode layer and is made of one of a solid electrolyte material and an electrode material.

11. The single cell according to claim 6,
wherein the reinforcement layer is disposed (5) on the upper electrode layer and is made of an electrode material.

12. The single cell according to claim 1,
wherein the substrate is a silicon wafer.

13. The single cell according to claim 1,
wherein the insulating and stress absorbing layer contains at least one type of material selected from the group consisting of silicon oxide, silicon nitride, phosphosilicate glass, borophosphosilicate glass, alumina, titania, zirconia and magnesia.

14. The single cell according to claim 1,
wherein the reinforcement layer contains at least one type of material selected from the group consisting of: silicon nitride; phosphosilicate glass (PSG); borophosphosilicate glass; alumina; titania; zirconia; MgO; glass containing at least one type of metal selected from Si, Ti, Cr, Fe, Co, Ni, Zr, Mo, W and Ta dispersed therein; metal containing, as a main component, at least one type of metal element selected from Ti, Cr, Fe, Co, Ni, Zr, Mo, W and Ta; and stabilized zirconia or a $CeO_2$ based solid solution containing at least one type of metal selected from Si, Ti, Cr, Fe, Co, Ni, Zr, Mo, W and Ta dispersed therein.

15. A cell plate for a solid oxide fuel cell comprising:
a common substrate; and
a plurality of the single cells according to claim 1, the single cells being arrayed two-dimensionally on the common substrate.

16. The cell plate according to claim 15,
wherein one of a solid electrolyte layer forming region, an upper electrode layer forming region and a lower electrode layer forming region is divided into two or more of independent regions on the common substrate.

17. The cell plate according to claim 15,
wherein a reinforcement layer forming region is divided into two or more regions on the common substrate.

18. A solid fuel cell comprising:
one or more of the cell plates according to claim 15; and
one of more plate-shaped separators, each having a fuel gas passage on one surface thereof and an oxygen containing gas passage on the other surface thereof,
wherein the cell plates and the separators are alternately stacked.

19. A solid fuel cell according to claim 17,
wherein one of a solid electrolyte layer forming region, an upper electrode layer forming region and a lower electrode layer forming region is divided into two or more of independent regions on the common substrate.

20. A solid fuel cell according to claim 18,
wherein one of a solid electrolyte layer forming region, an upper electrode layer forming region and a lower electrode layer forming region is divided into two or more of independent regions on the common substrate.

* * * * *